US012415193B2

(12) United States Patent
Ghavami-Nasr et al.

(10) Patent No.: US 12,415,193 B2
(45) Date of Patent: Sep. 16, 2025

(54) FLUID DISPENSING

(71) Applicant: THE SALFORD VALVE COMPANY LIMITED, Yorkshire (GB)

(72) Inventors: Ghasem Ghavami-Nasr, York (GB); Peter Shaw, York (GB)

(73) Assignee: THE SALFORD VALVE COMPANY LIMITED, Yorkshire (GB)

( * ) Notice: Subject to any disclaimer, the term of this patent is extended or adjusted under 35 U.S.C. 154(b) by 0 days.

(21) Appl. No.: 18/834,766

(22) PCT Filed: Jan. 18, 2024

(86) PCT No.: PCT/GB2024/050133
§ 371 (c)(1),
(2) Date: Jul. 31, 2024

(87) PCT Pub. No.: WO2024/153935
PCT Pub. Date: Jul. 25, 2024

(65) Prior Publication Data

US 2025/0114809 A1 Apr. 10, 2025

(30) Foreign Application Priority Data

Jan. 20, 2023 (GB) ..................................... 2300898

(51) Int. Cl.
*B05B 7/04* (2006.01)

(52) U.S. Cl.
CPC ................................. *B05B 7/0483* (2013.01)

(58) Field of Classification Search
CPC ..... B05B 7/0483; B05B 7/0491; B65D 83/36; B65D 83/14; B65D 83/48; B65D 83/44; B65D 49/02
See application file for complete search history.

(56) References Cited

U.S. PATENT DOCUMENTS 3,893,596 A 7/1975 Beres et al.

FOREIGN PATENT DOCUMENTS

AU 2015270286 A1 12/2016
EP 3746376 A1 12/2020
WO WO-2019150084 A1 * 8/2019 ............. B65D 83/36

OTHER PUBLICATIONS

International Search Report and Written Opinion dated Apr. 10. 2024 issued in corresponding PCT application.

* cited by examiner

*Primary Examiner* — Steven M Cernoch
(74) *Attorney, Agent, or Firm* — Husch Blackwell LLP

(57) ABSTRACT

A fluid dispensing apparatus includes a housing member inner wall partly surrounding an inner chamber region, an inner fluid port in fluid communication with an open region; a fluid communication passageway disposed outside the inner chamber region and in fluid communication with the open region; a wall fluid port fluidly connecting a fluid communication region and the inner chamber region; and a closure element selectively limiting fluid flow through the inner fluid port; the housing member connected to a valve assembly including an elongate valve stem with a respective stem axis and a stem housing, the stem housing having a stem housing fluid communication region in fluid communication with the fluid communication passageway and connectable to an inner stem channel, the stem housing having a gas communication region fluidly connectable to the inner stem channel so that a fluid and a gas are mixable in the inner stem channel.

20 Claims, 38 Drawing Sheets

Upright (1) Figure 3a 45-degree (2) Figure 3b

Horizontal (3) Figure 3c 135-degree (4) Figure 3d

Upside Down (5) Figure 3e

Upside Down (5) Figure 3f 45-degree (4) Figure 3g

Horizontal (3) Figure 3h 135-degree (2) Figure 3i

Upright (1) Figure 3j

FLUID DISPENSING

CROSS REFERENCES

This application is a U.S. National Phase Application of International Application No. PCT/GB2024/050133 filed Jan. 18, 2024, which claims the priority of GB Patent Application No. 2300898.0 filed Jan. 20, 2023, the entire disclosure of each of which are hereby incorporated by reference.

TECHNICAL FIELD

The present disclosure relates to a method and apparatus for dispensing fluid and, more particularly, a fluid dispensing device that includes a valve arrangement which selectively controls fluid flow through the device and incudes actuatable valve stem that is operable to dispense liquid fluid mixed with propellant gas in a variety of different orientations.

BACKGROUND

From time to time there is a requirement to dispense fluid from a container. For example, many healthcare products such as deodorants, hairsprays, suncreams and the like are provided to a consumer as fluids in containers. Examples of other such products that may be provided in such a manner are cooking products, cleaning products, painting products, and the like. In use there is sometimes a need to dispense the fluid contained within these containers to a desired location, for example on the human body.

Conventional fluid dispensing devices, such as an aerosol can, automatic wall or floor-mounted dispenser unit or the like, often contain a pressurised fluid to be dispensed. Such devices sometimes comprise a stem valve assembly located at an upper portion of a can or other such container for dispensing an amount of fluid product from the can. A stem valve assembly used in such devices may include a stem housing, an elongate stem movable within the stem housing between a valve open and valve closed position, and an actuator for moving the stem. The actuator is sometimes attached to the stem via a simple interference fit. The actuator may include a nozzle for dispensing fluid in a predetermined pattern from the can or other fluid container when the actuator is operated manually or automatically. The actuator sometimes selectively operates the stem valve assembly to allow discharge of the fluid as a spray from the nozzle by means of a propellant provided within the can/container.

Often these products are provided to consumers in the form or aerosols which contain the desired fluid along with a propellent, that is often a gas, in a can or other such container under pressure. Upon activation of a valve system, a mixture of the fluid and propellant is dispensed from the can as a spray.

Many conventional fluid dispensing devices need to be arranged substantially upright in order to dispense the desired fluid. Operating such devices in other orientations, for example an inverted orientation, may cause the device to dispense gas propellant only which may drain the aerosol container of propellant. This may result in some fluid in the can being unable to be dispensed due to a lack of propellant. Such fluid in the container is thus wasted.

Furthermore, some conventional fluid dispensing devices may contain complex valve components. Manufacturing such complex components, for example via moulding or extrusion or the like, can cause imperfections known generally as flash. For example, excess material can remain on inner surfaces of complex valve components which may reduce the efficiency of the valve component or may prevent the valve component from operating in a desired manner.

It is an aim of the present disclosure to at least partly mitigate one or more of the above-mentioned problems.

SUMMARY

It is an aim of certain embodiments of the present disclosure to provide a valve arrangement for a fluid dispensing device that is able to dispense fluid in a variety of orientations and that suffers reduced risk of manufacturing defects due to a generally symmetrical design.

It is an aim of certain embodiments of the present disclosure to provide a valve arrangement for a fluid dispensing device that is operable when the fluid dispensing device is inverted.

It is an aim of certain embodiments of the present disclosure to provide a valve arrangement that is generally symmetrical about a primary stem axis on which a valve stem is arranged.

According to a first aspect of the present disclosure there is provided apparatus for dispensing fluid, comprising: at least one inner wall of a housing member that at least partly surrounds an inner chamber region that is disposed within a main body portion of the housing member, an inner fluid port being disposed at a first end region of the inner chamber region and in fluid communication with an open region of the housing member disposed at a first end region of the housing member; at least one fluid communication passageway disposed within the main body portion and comprising a first end of the fluid communication passageway proximate to the open region, and a remaining end of the fluid communication passageway, proximate to a further end of the housing member, that is spaced apart from the first end of the housing member, the fluid communication passageway being disposed radially outside the inner chamber region and being in fluid communication with the open region; at least one wall fluid port extending through the inner wall and through an outer surface of the housing member to fluidly connect a fluid communication region located outside of the housing body and the inner chamber region; a closure element disposed in, and movable within, the inner chamber region to selectively limit fluid flow through the inner fluid port; wherein the housing member is connected to, or is integrally formed with, a valve assembly that includes an elongate valve stem associated with a respective stem axis and a stem housing that radially surrounds at least a portion of the valve stem, the stem housing comprising at least one stem housing fluid communication region that is in fluid communication with the fluid communication passageway and is fluidly connectable to an inner stem channel disposed along at least a portion of the valve stem, the stem housing further comprising at least one gas communication region that is fluidly connectable to the inner stem channel so that at least one fluid and at least one gas are mixable in the stem channel.

Aptly, the valve stem comprises a fluid inlet port in fluid communication with the stem channel and selectively connectable with the stem housing fluid communication region, and a gas inlet port in fluid communication with the stem channel and selectively connectable with the gas fluid communication region, the fluid inlet port being disposed to be fluidly connected with the stem housing fluid communication region at the same time as the gas fluid port is fluidly with the gas fluid communication region to provide a fine spay in the stem channel by two fluid atomisation.

Aptly, the apparatus further comprises a valve seat region disposed within the inner chamber region proximate to the first fluid port, the closure element being locatable against the valve seat region for preventing fluid flow through the inner fluid port when the housing member is disposed in a first orientation.

Aptly, the apparatus further comprises a closure element support region disposed at a further end region of the inner chamber region that is spaced apart from the first end region of the inner chamber region, the closure element being locatable against the closure element support region to permit fluid flow through the inner fluid port when the housing member is disposed in a further orientation.

Aptly, the housing member is a single body piece that optionally comprises a single moulded body piece.

Aptly, the closure element has a maximum width that is smaller than a maximum width of a region of the inner chamber region in which the closure element is movable in operation.

Aptly, the closure element has a maximum width that is smaller than a maximum width of a region of the inner chamber region between the valve seat region and the closure element support region.

Aptly, the housing member is connected to the valve assembly at a further end region of the housing member that is spaced apart from the first end of the housing member.

Aptly, the inner chamber region, the inner fluid port and the open mouth are disposed on the stem axis and optionally are substantially symmetrical along the stem axis.

Aptly, the wall fluid port is oriented along an axis that is substantially perpendicular to the stem axis.

Aptly, the at least one wall fluid port comprises a pair of wall fluid ports arranged at substantially opposite sides of the housing member.

Aptly, the apparatus further comprises a first fluid flow path extends from the open region, through the fluid communication passageway, through the stem housing fluid communication region and into the stem channel via a stem fluid port, the stem channel optionally extending along the stem axis.

Aptly, the first fluid path is operable for fluid flow when the housing member is disposed in the first orientation that optionally comprises the open region facing in a substantially downward direction.

Aptly, the apparatus further comprises at least one gas pathway that is at least partly disposed between the housing member and a mounting cup through which the valve stem extends so that, in the first orientation, gas can pass through the gas inlet, into the gas communication region, and into a stem gas port via that in the valve stem to mix with fluid in the stem channel.

Aptly, the apparatus further comprises a further fluid flow path that extends from the fluid communication region to the inner chamber region via the wall fluid port and, via the inner fluid port from the inner chamber region through the fluid communication passageway and into the inner stem channel via a stem fluid inlet.

Aptly, the further fluid path is operable for fluid flow when the housing member is disposed in the further orientation that optionally comprises the open region facing in a substantially upward direction.

Aptly, in a first valve stem position the stem fluid port is closed to prevent fluid flow into the stem channel to thereby block the first fluid flow path or the further fluid flow path, and in a further valve stem position the stem fluid port is open to permit fluid flow into the stem channel to thereby permit fluid flow through the first fluid flow path or the further fluid flow path.

Aptly, the first valve stem position is an equilibrium position, and the further valve stem position is a position in which the valve stem is urged towards the housing member along the stem axis.

Aptly, the apparatus further comprises at least one biasing element that urges the valve stem towards the first valve stem position.

Aptly, the apparatus further comprises, a dip-tube comprising a first end region disposed in the open region and a further end region that is spaced apart from the housing body.

Aptly the apparatus further comprises a sloped wall region of the inner wall that is offset from an axis that touches the radially innermost part of the sloped wall region and is parallel with the stem axis so that the sloped wall region makes an angle of 10 degrees or less with the axis.

Aptly, the housing member comprises an open mouth region at the terminal end of the open region that is at the first end of the housing member, and a neck region that includes a channel disposed between the open mouth region and the main body portion.

Aptly, the valve seat region comprises an annular abutment surface for abutting against the closure element that is oblique relative to the stem axis and optionally makes a valve seat angle with the stem axis that is between 30 degrees and 50 degrees.

Aptly, the valve seat angle is around 45 degrees or 48 degrees.

According to a second aspect of the present disclosure, there is provided a fluid dispensing device, comprising: at least one inner wall of a housing member that at least partly surrounds an inner chamber region that is disposed within a main body portion of the housing member, an inner fluid port being disposed at a first end region of the inner chamber region and in fluid communication with an open region of the housing member disposed at a first end region of the housing member; at least one fluid communication passageway disposed within the main body portion and comprising a first end of the fluid communication passageway proximate to the open region, and a remaining end of the fluid communication passageway, proximate to a further end of the housing member, that is spaced apart from the first end of the housing member, the fluid communication passageway being disposed radially outside the inner chamber region and being in fluid communication with the open region; at least one wall fluid port extending through the inner wall and through an outer surface of the housing member to fluidly connect a fluid communication region located outside of the housing body and the inner chamber region; a closure element disposed in, and movable within, the inner chamber region to selectively limit fluid flow through the inner fluid port; and a canister that is connected to a valve assembly via a mounting cup through which the valve stem extends and that comprises at least one fluid to be dispensed and at least one propellant that optionally is a gas; wherein the housing member is connected to, or is integrally formed with, the valve assembly that includes an elongate valve stem associated with a respective stem axis and a stem housing that radially surrounds at least a portion of the valve stem, the stem housing comprising at least one stem housing fluid communication region that is in fluid communication with the fluid communication passageway and is fluidly connectable to an inner stem channel disposed along at least a portion of the valve stem, the stem housing further comprising at least one gas communication region that is fluidly connectable to the inner stem channel so that at least one fluid and at least one gas are mixable in the stem channel.

According to a third aspect of the present disclosure there is provided a method for dispensing fluid, comprising the steps of: providing a fluid at a first end of a fluid communication passageway disposed within a main body portion of a housing member and proximate an open region that is located at a first end region of the housing member; and transporting the fluid from the from the first end of the fluid communication passageway to a further end of the fluid communication passageway located at a further end region of the housing member that is spaced apart from the first end region; transporting the fluid from the further end of the fluid communication passageway end to a stem housing fluid communication region that is located in a stem housing that surrounds at least a portion of a valve stem that is associated with a stem axis; providing at least one gas at a gas communication region that is fluidly connectable to an inner stem channel that extends along at least a portion of the valve stem and is connectable to the stem housing fluid communication region; and transporting the fluid from the first end of the fluid communication passageway to the further end of the fluid communication passageway includes transporting the fluid, via the fluid communication passageway, radially outside an inner chamber region that is at least partly surrounded by at least one inner wall of the housing member that is located in the main body portion.

Aptly, the method further comprises the steps of: fluidly connecting the stem housing fluid communication region to the inner stem channel and simultaneously fluidly connecting the gas communication region to the inner stem channel.

Aptly, the method further comprises the steps of: mixing the fluid and the gas in the inner stem channel.

Aptly, the method further comprises the steps of: providing a fine spray in the inner stem channel that is a mixture of the fluid and the gas by two fluid atomisation.

Aptly, the method further comprises the steps of: in a first mode of operation, prior to providing the fluid at the first end of the fluid communication passageway, urging a closure element disposed within the inner chamber region against a valve seat region that is located proximate to a first end region of the inner chamber region to thereby prevent fluid flow through an inner fluid port that is in fluid communication with the open region and is disposed proximate to the first end region of the inner chamber region; providing the fluid at the open region; and transporting the fluid from the open region to the first end of the fluid communication passageway.

Aptly, the method further comprises the steps of: orienting the housing member in a substantially upright configuration to locate the open region at a substantially downward position relative to the further end region, and simultaneously moving the closure element against the valve seat region.

Aptly, the method further comprises the steps of: in a further mode of operation, prior to providing the fluid at the first passage end, urging a closure member disposed within the inner chamber region against a closure member support region that is disposed at a further end region of the inner chamber region that is spaced apart from an inner fluid port disposed proximate to a first end region of the inner chamber region to thereby permit fluid flow through the inner fluid port; via at least one wall fluid port extending through the inner wall and through an outer surface of the housing member, transporting fluid from a fluid communication region that outside of the housing member to the inner chamber region; and transporting fluid from the first fluid communication region to the first passage end via the inner fluid port.

Aptly, the method further comprises the steps of: orienting the housing member in a substantially inverted configuration to locate the open region at a substantially upward position relative to the further end region, and simultaneously urging the closure element against the closure element support region.

Aptly, the method further comprises the steps of: transporting, via the stem housing fluid communication region, the fluid from the further passage end at least partly around a valve assembly that is connected to the further end region of the housing member and comprises the valve stem and the stem housing; and transporting the fluid into the inner stem channel via at least one stem fluid port.

Aptly, the method further comprises the steps of: prior to transporting the fluid into the inner stem channel, urging the valve stem away from an equilibrium position to thereby open the stem fluid inlet of the valve stem optionally by urging the valve stem towards the housing member.

Certain embodiments of the present disclosure provide a valve assembly for a fluid dispensing device that can be operated in a number of orientations of the device include an inverted orientation and an upright orientation.

Certain embodiments of the present disclosure provide a valve system for a fluid dispensing device that is generally symmetrical about a primary stem axis.

Certain embodiments of the present disclosure provide a valve assembly for a fluid dispensing device that suffers reduced risk of manufacturing defects.

Certain embodiments of the present disclosure provide a valve assembly for a fluid dispensing device that can continuously dispense fluid while being rotated by 180 degrees.

Certain embodiments of the present disclosure provide a valve assembly for a fluid dispensing device that is operable in a variety of different orientations and that can dispense fluid as a fine spray by two fluid atomisation with gas propellant.

These and other aspects are merely illustrative of the innumerable aspects associated with the present disclosure and should not be deemed as limiting in any manner. These and other aspects, features, and advantages of the present disclosure will become apparent from the following detailed description when taken in conjunction with the referenced drawings.

BRIEF DESCRIPTION OF THE DRAWINGS

Reference is now made more particularly to the drawings, which illustrate the best presently known mode of carrying out the present disclosure and wherein similar reference characters indicate the same parts throughout the views.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Figure 1:
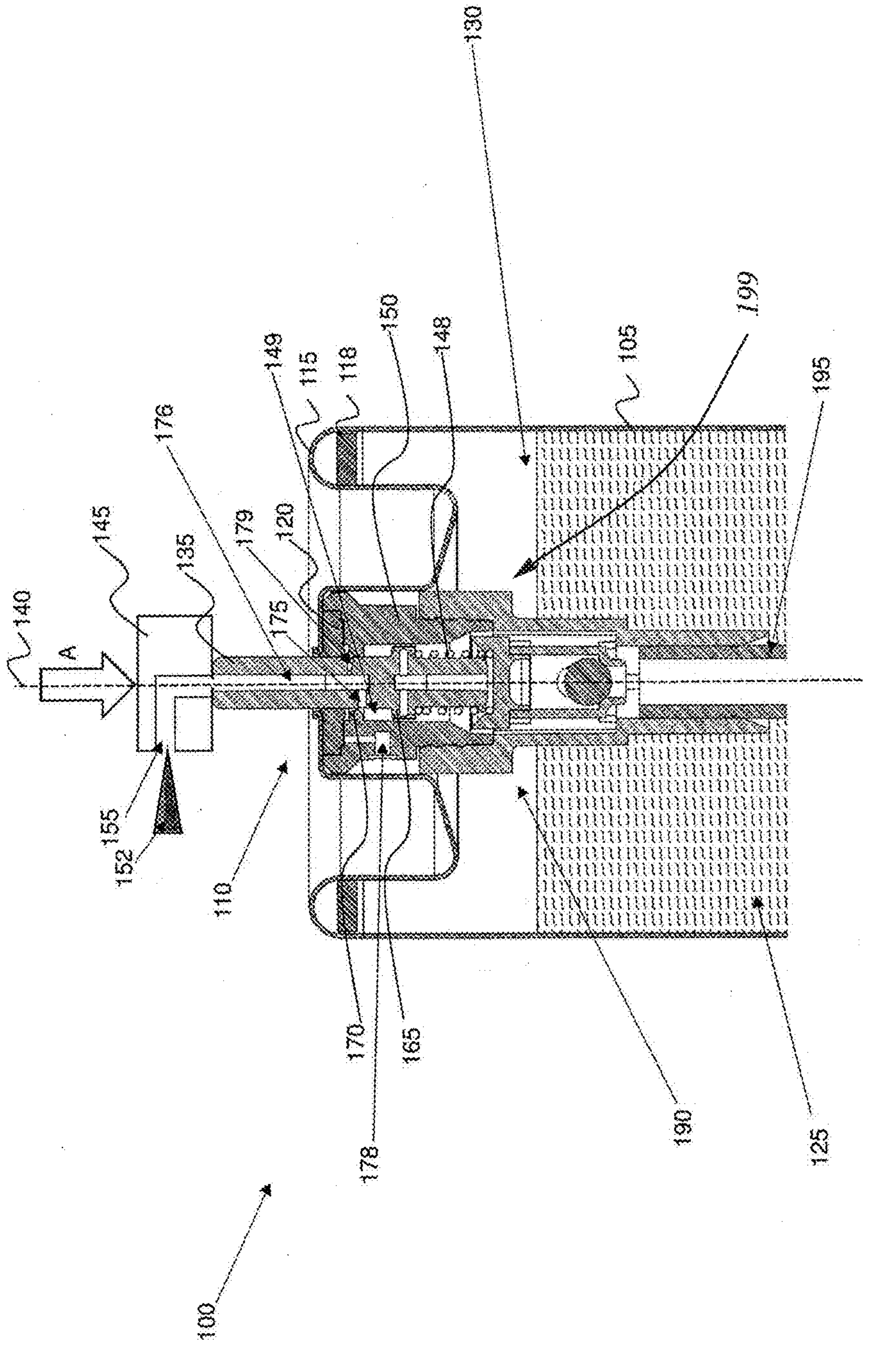
FIG. 1 illustrates a partial section of a fluid flow device.

FIG. 1 illustrates a fluid dispensing device 100 in an "open" mode of operation. The fluid dispensing device may, for example, be an aerosol spray device such as an aerosol can which provides fluid to be dispensed as a mist of particles. It will be appreciated that the can is an example of a container. Only a partial section of such a can is illustrated in FIG. 1. It will be appreciated that other fluid dispensing devices which do not emit fluid as an aerosol may also be provided, for example devices emitting creams, gels, foams or the like. The fluid dispensing device 100 comprises a rigid container 105 onto which is mounted a stem valve assembly 110. The stem valve assembly 110 is held in a central position at the top of the container 105 by way of a mounting cup 115. The mounting cup 115 is selectively crimped around the edges of the rigid container 105 and around a region of the stem valve assembly 110 to thereby hermetically seal the container. The fluid dispensing device 100 of FIG. 1 also includes an outer sealing gasket 118 and inner sealing gasket 120 provided in the regions proximate the crimped regions of the mounting cup 115 to support the sealing provided by the crimping process. Alternatively, the fluid dispensing device may not include an outer and/or inner sealing gasket. Alternatively, the fluid dispensing device may include additional sealing gaskets. The inner and outer sealing gaskets of FIG. 1 are made from a polymeric material. Alternatively, any other suitable material may be used to make the inner and outer sealing gaskets. It will be appreciated that alternative methods for providing a sealing engagement may be used in place of crimping, for example interference fits, liquid sealants and the like. It will be appreciated that the container 105 may be made from a metallic material. Aptly the container 105 may be made from an alloy material, for example aluminium. The container 105 may be made from any other suitable material. It will be appreciated that the mounting cup 115 may be made from a metallic material. Aptly the mounting cup 115 may be made from an alloy material, for example aluminium. The mounting cup 115 may be made from any other suitable material.

A fluid reservoir 125 is provided within the sealed container and generally comprises a quantity of liquid (product) to be dispensed. It will be understood that the liquid in the fluid reservoir is an example of a fluid to be dispensed. Any liquid component is free to move in the container and will adopt a surface level due to gravitational effects. It will be appreciated that the surface level adopted by the liquid component in the container 105 will be dependent on the orientation of the fluid dispensing device 100 and any given time. The fluid reservoir 125 may be dispensed from the device (when in the "open" mode of operation as is shown in FIG. 1) by using a propellant contained within a head space 130 of the sealed container which "forces" the product to exit the container. The propellant may be a compressed gas such as carbon dioxide, nitrogen, air or the like. Mixtures of two or more gases may also be used as the propellant. It will be understood that according to certain embodiments of the present disclosure, the propellant may have some solubility with the fluid reservoir 125 and therefore upon dispersal of liquid product from the fluid reservoir, some propellant held as a liquid may also be dispersed. The gas in the head space may, for example, be at an initial pressure of 5 to 20 bar depending on the type of container in use. The initial pressure may, for example, be 9 to 12 bar. The initial pressure may, for example, be around 8 bar. Higher pressure cans, for example, cans with an initial pressure of 18 bar or higher, could of course instead be utilised.

The stem valve assembly 110 comprises an elongate valve stem 135 which can be moved in a reciprocating fashion along a primary stem axis 140 (represented by the broken line in FIG. 1) upon pressing and releasing of an actuator 145 mounted to the valve stem. It will be understood that the elongate valve stem 135 sits in a first, closed position when no force is provided on the actuator and is held in this position by a resilient member 148 that is a spring in the system shown in FIG. 1. Alternatively, any other suitable resilient member could instead be utilised. It will be understood that the spring 148 is an example of a biasing element. Any other suitable biasing element could alternatively be utilised. When the elongate valve stem 135 is in a closed position, corresponding to a closed mode of operation of the fluid dispensing device 105, fluid is not able to communicate from a stem valve assembly fluid communication region 149 that is located in a stem valve assembly housing 150, to a dispense nozzle 155 of the actuator 145. It will be appreciated that the stem valve assembly housing is an example of a stem housing. In use, the actuator 145 may be pressed downwards (towards the stem valve assembly housing 150) as represented by the arrow A in FIG. 1, and therefore selectively urged along the primary stem axis 140 to thereby overcome the force on the valve stem provided by the spring 148, and thereby urge the elongate valve stem 135 into the open position shown in FIG. 1. When the elongate valve stem 135 is in the open position, fluid is able to communicate between the stem valve assembly fluid communication region 149 and the dispense nozzle 150, thereby producing an external aerosol spray 152 which may be provided to a target. It will be appreciated that, in the closed position, the valve stem is pushed in an upwards direction (relative to the position shown in FIG. 1) away from the stem valve assembly housing 150 so that a greater proportion of the valve stem protrudes out of the can through the mounting cup 115.

As indicated above, the stem valve assembly 110 includes a stem valve assembly housing 150 which at least partly houses the elongate valve stem 135 and spring 148. In the closed position of the valve stem 135, wherein the spring 148 urges the valve stem upwards (in the viewpoint provided by FIG. 1), a projecting shoulder 165 of the valve stem 135 abuts against an inwardly projecting lip 170 of the stem valve assembly housing 150 of the stem valve assembly 110 to thereby sealingly engage the valve stem. That is to say, in the "closed" position of the fluid dispensing device, the projecting shoulder 165 of the valve stem 135 abuts against the inwardly projecting lip 170 of the stem valve assembly housing 170 so that an effective seal is provided between the projecting shoulder 165 and the lip 170. It will be understood that the inner sealing gasket 120, when used, also contributes to sealingly engaging the valve stem 135. It will be appreciated that certain embodiments of the present disclosure are usable with other conventional valve assemblies/actuators.

It will be appreciated that the valve stem 135 may be manufactured from a metallic material, for example an alloy material that may be aluminium. It will be appreciated that the stem 135 may be manufactured from a polymeric material, for example a plastic material. It will be appreciated that the stem valve assembly housing 150 may be manufactured from a polymeric material, for example a plastic material. It will be understood that the stem valve assembly housing 150 may be manufactured by moulding or the like. It will be understood that the stem valve assembly housing may be manufactured by extrusion or the like.

Upon pressing the actuator 145 and bringing the valve stem into the open position, as shown in FIG. 1, the projecting shoulder 165 disengages from the inwardly projecting lip 170 and a stem fluid inlet port 175 of the valve stem moves to a location within the stem valve assembly housing 155 beneath the inwardly projecting lip 170. This enables fluid communication between the stem valve assembly fluid communication region 149 and the stem fluid inlet 175 so that fluid located in the stem valve assembly fluid communication region 149 can pass into the stem fluid inlet. This thus allows fluid located in the stem valve assembly fluid communication region to travel into an inner stem channel 176 that extends at least partly through the stem along the primary stem axis and between the stem fluid inlet 175 and is in fluid communication with the stem fluid inlet 175. As shown in FIG. 1, the stem fluid inlet 175 (that is a stem fluid inlet port 175) is disposed on a side of the valve stem 135. As will be discussed in more detail below, a gas flow passageway 178 is provided in the stem valve assembly housing 150 to facilitate fluid communication with a stem gas inlet 179 in the valve stem when the valve stem is in the open position. This facilitates entry of gas into the stem channel 176 via the stem gas port 179 when the stem is in the open position. Thus, when the stem is in the open position, liquid to be dispensed and propellant gas can mix in the stem channel. This will be discussed in more detail below. As shown in FIG. 1, the stem gas inlet 179 is disposed on a side region of the valve stem 135 that is substantially opposite to the stem fluid inlet 175. Alternatively the stem gas inlet 179 may be located at any other suitable position on the valve stem 135.

The fluid dispensing device of FIG. 1 also includes a fluid flow valve assembly 190 that is arranged below (from the viewpoint provided in FIG. 1) the stem valve assembly. As will be discussed below, the fluid flow valve assembly 190 permits fluid dispensing from the fluid dispensing device 100 in a variety of orientations of the fluid dispensing device 100. As shown in FIG. 1, a dip-tube 195 is connected to an end of the fluid flow valve assembly 190 that faces downwards in the viewpoint provided in FIG. 1.

It will be understood that the fluid flow valve assembly 190 is locatable in fluid communication with the fluid reservoir 125 when the can is upright (as shown in FIG. 1) due to the connected between the dip-tube 195 and the fluid flow valve assembly 190. It will be understood that when the fluid dispensing device 100 is tipped with respect to the primary stem axis 140, the dip tube 195 may no longer be in fluid communication with the fluid reservoir 125. As will be discussed below, when tipped the fluid flow valve assembly 190 provides an alternative fluid pathway in which fluid may still be communicated to the dispense nozzle 150.

It will be appreciated that the stem valve assembly 150, the fluid flow valve assembly 190, the dip tube 195, and the mounting cup 115 together form a valve arrangement 199 of the fluid dispensing device 100.

Figure 2:
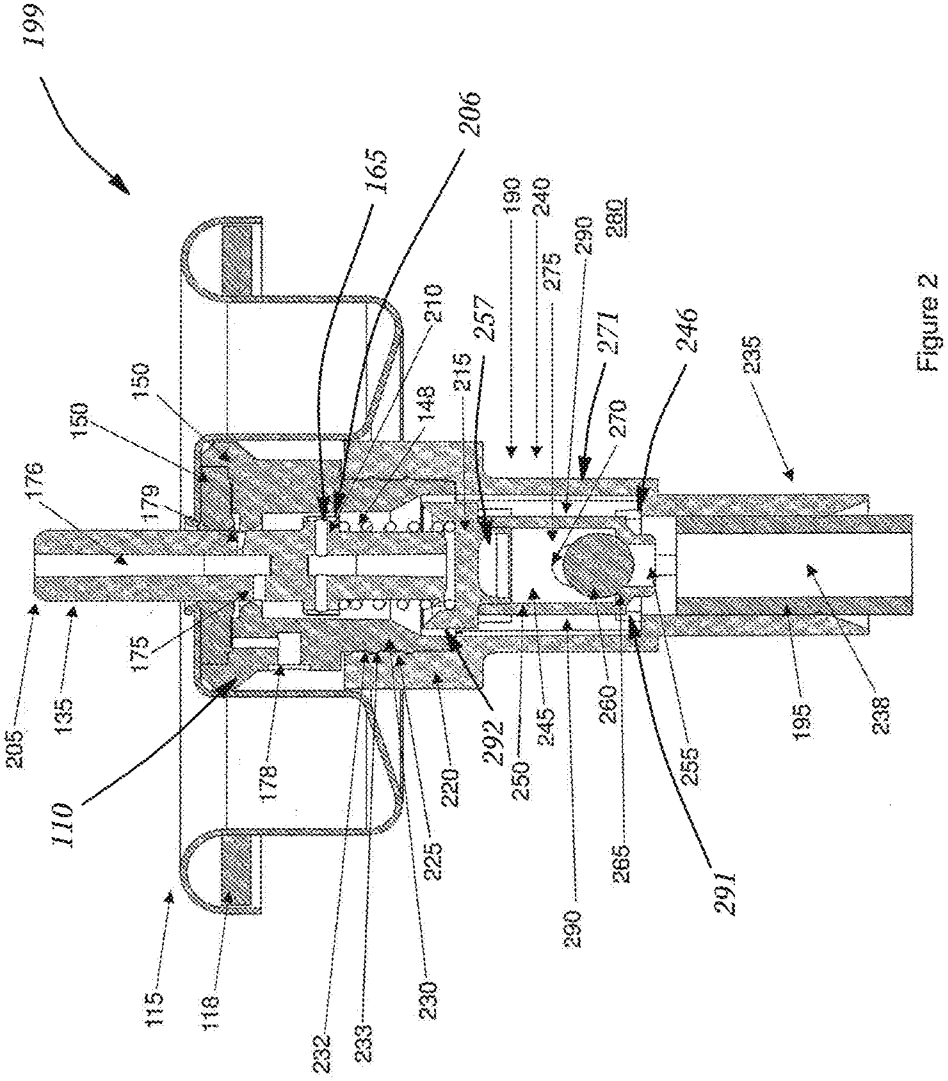
FIG. 2 illustrates a valve arrangement of the fluid dispensing device in cross section.
Figure 3:
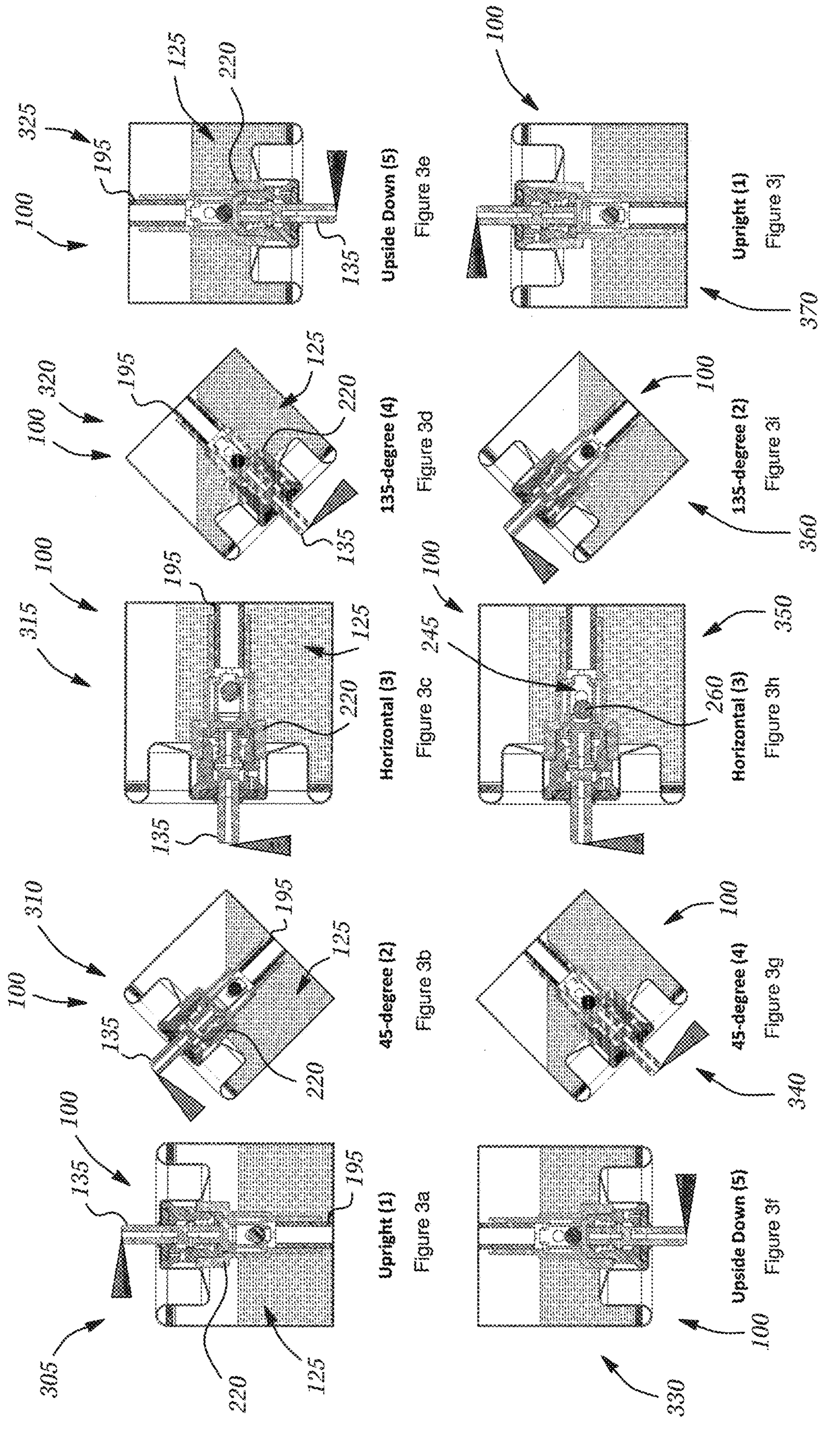
FIG. 3*a* illustrates an upright orientation of the fluid dispensing device.
FIG. 3*b* illustrates the fluid dispensing device rotated away from the upright orientation by 45 degrees.
FIG. 3*c* illustrates the fluid dispensing device rotated away from the upright orientation by 90 degrees.
FIG. 3*d* illustrates the fluid dispensing device rotated away from the upright orientation by 135 degrees.
FIG. 3*e* illustrates the fluid dispensing device rotated away from the upright orientation by 180 degrees and in an inverted orientation.
FIG. 3*f* illustrates the fluid dispensing device in an inverted orientation.
FIG. 3*g* illustrates the fluid dispensing device rotated away from the inverted orientation by 45 degrees.
FIG. 3*h* illustrates the fluid dispensing device rotated away from the inverted orientation by 90 degrees.
FIG. 3*i* illustrates the fluid dispensing device rotated away from the inverted orientation by 135 degrees.
FIG. 3*j* illustrates the fluid dispensing device rotated away from the inverted orientation by 180 degrees and in an upright orientation.

FIG. 2 illustrates a cross sectional view of the valve arrangement 199 of the fluid dispensing device 100 of FIG. 1 in more detail. As discussed with respect to FIG. 1, the valve arrangement includes a stem valve assembly 110. The stem valve assembly 110 includes a valve stem 135, a portion of which is arranged in the stem valve assembly housing 150. The stem 135 includes a stem channel 176, that is an internal channel, that extends along at least a part of the valve stem 135, at least from the stem fluid inlet 175 to a terminal end of the stem 205. As shown in FIG. 2, the inner stem channel 176 extends from a position slightly past the stem fluid inlet 175 to a terminal end 205 of the stem 135. From the perspective shown in FIG. 2, the terminal end 205 of the stem 135 is the upward most end of the stem. That is to say that the terminal end 205 of the stem 135 is the end of the stem most distal to, and facing away from, the stem valve assembly housing 150. As shown in FIG. 2, the inner stem channel extends only partly through the valve stem and is arranged along the primary stem axis 140 (shown in FIG. 1). Alternatively, the inners stem channel 176 may extend wholly through the stem 135.

As indicated in FIG. 2 a portion of the stem that is located in the stem valve assembly housing 150 includes a flared-out stem region 210 beneath which an end of the spring 148 is arranged. It will be appreciated that the flared-out stem region 210 includes the projecting shoulder 165 of the stem 135. The flared-out stem region 210 includes a spring abutment surface 206 that abuts against an end of the spring 148 and against which the spring 148 can impart a biasing force to urge the stem 135 towards the "closed" position which corresponds with the position of the stem 135 when the fluid dispensing device is in a "closed" mode of operation. As shown in FIG. 2, the remaining end of the spring 148 sits in a spring seat 215 that is located proximate to a lowermost region the stem valve assembly housing 150 from the viewpoint shown in FIG. 2. The spring seat 215 of FIG. 2 is a separate component to the stem valve assembly housing 150. That is to say that the spring seat 215 is not integrally formed with the stem valve assembly housing 150. Aptly the spring seat 215 may be integrally formed with the stem valve assembly housing 150.

As noted with respect to FIG. 1, the stem valve assembly housing 150 of FIG. 2 includes a gas flow passageway 178 to permit gas flow into the stem valve assembly housing 150 and the stem has a stem gas inlet 179 when the stem 135 is in an open position which corresponds to a position of the stem 135 when the fluid dispensing device is disposed in an "open" mode of operation. Thus the gas flow passageway 178 (along with the stem gas inlet 179) permits gas within the stem valve assembly to enter into the inner stem channel 176 when the stem 135 is disposed in an open position (or open mode of operation). Gas flow through the stem valve assembly 110 will be discussed in more detail below.

As is shown in FIG. 2, and as already discussed with respect to FIG. 1, the valve arrangement also includes an inner sealing gasket 120 that is arranged around the stem 135 at the top (from the perspective shown in FIG. 2) of the stem valve assembly housing 135, within the housing.

As was discussed with respect to FIG. 1, a mounting cup 115 is crimped around the stem valve assembly housing 150. An outer sealing gasket 118 is arranged on an inner surface of at the outer circumference of the mounting cup 115 where the mounting cup 115 is connected to the can to thereby seal the interface between the mounting cup 115 and the can.

As discussed with respect to FIG. 1, a fluid flow valve assembly 190 is also included in the valve arrangement 199. As shown in FIG. 2, the fluid flow valve assembly 190 includes a fluid flow valve housing 220 that is an example of a housing member. The fluid flow valve housing 220 is located underneath, from the perspective shown in FIG. 2, and is connected to the stem valve assembly housing 150. An open mouth region 225 of the of the fluid flow valve housing 220 is secured around a retaining portion 230 of the stem valve assembly housing 150 that is located at a lower end (from the view shown in FIG. 2). The retaining portion 230 of the stem valve assembly housing 150 includes three circumferential ridges 232 that extend radially outwardly from the stem valve assembly housing 150 outer surface at the retaining portion 230. One, two, or any other suitable number of ridges may of course alternatively be included. The ridges 232 each cooperate with a corresponding groove 233 in the inner surface of the open mouth region 225 of the fluid flow valve housing 220 and thus the stem valve assembly housing 150 and the fluid flow valve housing 220 are secured by a combination of an interference fit and the cooperation between the cooperating grooves 233 and ridges 232. In the valve arrangement 199 shown in FIG. 2, the stem valve assembly housing 150 and the fluid flow valve assembly 220 housing are two distinct units. That is to say that the stem valve assembly housing 150 and the fluid flow valve assembly housing 220 are manufactured separately and are subsequently connected as described above. The stem valve assembly housing 150 and the fluid flow valve assembly housing 220 could of course be a single unit that is integrally formed. It will be appreciated that that other appropriate securing methods, such as use of screw threads alongside corresponding screws and the like, may be used to secure the stem valve assembly housing 150 to the fluid flow valve housing 220.

At a remaining end of the fluid flow valve assembly housing 220 is an open region 235. As shown in FIG. 2, this end of the fluid flow valve assembly housing 220 is substantially opposite to the end of the fluid flow valve assembly housing 220 that includes the open mouth region 225. That is to say that the end of the fluid flow valve assembly housing 220 that includes the open region 235 is spaced apart from and is substantially parallel with the end of the fluid flow valve assembly housing 220 that includes the open mouth region 225. It will be appreciated that the end of the fluid flow valve assembly housing 220 that includes the open region 235 is an example of a first end of the fluid flow valve assembly housing and is thus an example of a first end of a housing member. It will also be understood that the end of the fluid flow valve assembly housing 220 that includes the open mouth region 225 is an example of a further end of the fluid flow valve assembly housing and thus is also an example of a further end of a housing member. As is shown FIG. 2, the open region 235 includes an elongate neck region that includes an open-ended channel 243, that is to say the open-ended channel 243 is a channel that is open at the first end of the fluid flow valve housing 220. An end region of the dip-tube 195 is arranged in the open-ended channel 243 so that the dip-tube 195 is secured to the fluid flow valve assembly housing 220 via an interference fit.

It will be appreciated that by having separate parts enables (for example separate stem valve assembly housing 150, dip-tube 195, fluid flow valve housing 220 and mounting cup 215) such components to be retrofitted to certain fluid dispensing devices.

FIG. 2 also shown how the open region 235 of the fluid flow valve assembly housing 220 extends from a main body portion 240 of the fluid flow valve assembly housing. The main body potion 240 of the fluid flow valve assembly housing 220 is a widened region of the fluid flow assembly housing 220 relative to the open region 235. The main body portion 240 includes an inner chamber region 245. The inner chamber region 245 is partially surrounded by a generally cylindrical inner wall 250 of the fluid flow valve assembly housing 220. The inner chamber region 245 is thus generally cylindrical. It will be understood that the inner chamber region 245 may be of any other suitable shape and therefore any suitable number of inner walls may at least partly surround the inner chamber region 245. As shown in FIG. 2, at a lower-most end of the inner chamber region 245 (from the viewpoint provided by FIG. 2), that is an example of a first end region 246 of the inner chamber region 245, that is most proximate to the open region 235 of the fluid flow valve housing 220, an inner fluid port 255 is located. The inner fluid port 255 is in fluid communication with the open region 235 of the fluid flow valve housing 220. A sealing ball 260, that is an example of a closure element, is located in the inner chamber region 245. It will be appreciated that the sealing ball 260 is movable in the inner chamber region 245. The sealing ball may be manufactured from polymeric material or metallic material or composite material or the like. For example, the sealing ball 260 may be plastic or rubber or the like. It will be appreciated that any other suitable closure element may instead be utilised, for example a plate shaped closure element or a cylindrical closure element or a cube shaped closure element or the like.

As shown in FIG. 2, the inner chamber region 245 is both longer and wider than a diameter of the sealing ball 260 and thus the sealing ball 260 is movable both laterally and longitudinally in the inner chamber region 245. That is to say that the sealing ball 260 is movable in three dimensions in the inner chamber region 245 including in an up and down motion (from the perspective view shown in FIG. 2) and in a side to side motion (from the perspective view shown in FIG. 2). As shown in FIG. 2, the sealing ball 260 is able to sit against a valve seat 265 or collar (that is an example of a valve seat region) to fluidly disconnect the inner fluid port and the inner chamber region 245. It will be appreciated that the sealing ball 260 is freely movable towards and away from the valve seat 265 in the inner chamber region 245. It will be understood that the valve seat 265 is located proximate to the first end region 246 of the inner chamber region 245 and proximate to the inner fluid port 255.

As illustrated in FIG. 2, the top of the inner chamber region 245 (from the perspective view shown in FIG. 2), that is an example of a further end region 257 of the inner chamber region 245, is provided by the spring seat 215. It will be understood that the spring seat 215 is a separate unit with respect to the fluid flow valve housing 220 (that includes the inner wall 250) and sits on top of the cylindrical inner wall 250. It will be appreciated that the further end region 257 of the inner chamber region 245 is a remaining end of the inner chamber region 245 that is spaced apart from the first end region 246 of the inner chamber region 245.

The inner wall 250 if the fluid flow valve housing 220 includes two wall fluid ports 270 that are side ports disposed in the cylindrical inner wall 250. Only one of these ports 270 is illustrated in FIG. 2 and extends into the page in the perspective view shown in FIG. 2. It will be appreciated that the remaining port 270 extends out of the page, in the perspective view shown in FIG. 2, but is not illustrated in the cross sectional view of FIG. 2. Alternatively, one, three, four or any other suitable number of wall fluid ports 270 can be utilised. The wall fluid ports fluidly connect the inner chamber region 245 (that includes an inner chamber fluid communication region 275) with a fluid communication region 280 that is arranged external to the fluid flow valve housing 220 and within the can. The wall fluid ports 270 each extends through the inner surface 250 of the fluid flow valve housing 220 and through an outer surface 271 of the fluid flow valve housing.

As can also be seen in FIG. 2, the main body portion 240 of the fluid flow valve inner housing includes two fluid communication passageways 290 on opposed sides of the inner chamber region 245 that extend around the inner chamber region 245 and are in fluid communication with the open region 235 of the fluid flow valve housing 220. That is to say that the fluid communication passageways 290 are arranged radially outside of the inner chamber region 245 and are spaced apart from the inner chamber region 245 within then fluid flow valve housing 220. It will be understood that the fluid communication passageways 290 each include a first end 291 that is located proximate to the open region 235 of the fluid flow valve housing 220 and a further end 292 that is located proximate to the open mouth region 225 of the fluid flow valve housing 220. The fluid communication passageways 290 thus extend from the open region 235 to the open mouth region 225 through the fluid flow valve housing 220 and thus fluidly connect the open region 235 and open mouth region 225.

The fluid flow valve housing 220 of FIG. 2 is a single unit. That is to say the fluid flow valve housing 220 is formed as a single body, optionally via a moulding process.

It will be understood that the fluid flow valve housing 220 and the stem valve assembly housing 150 are substantially symmetrical around the stem axis (with the exception of certain ports such as the gas flow passageway, the fluid wall fluid ports and the fluid communication pathways) However a planar slice through the stem valve assembly housing and the fluid flow valve assembly housing across the page of the viewpoint shown in FIG. 2 yields two symmetrical portions of the stem valve assembly housing and the fluid flow valve assembly housing. That is to say that the stem valve assembly housing and the fluid flow valve assembly housing each are a single unit, formed as single bodies, that each include substantially symmetrical half portions.

FIG. 3*a* to FIG. 3*j* illustrate a variety of orientations of the fluid dispensing device 100 of FIG. 1, in cross section, that may be utilised in operation of the fluid dispensing device 100. FIGS. 3*a* to 3*e* illustrate how the fluid dispensing device 100 can be tilted, in an anticlockwise direction, from an upright orientation to an invented orientation in use while maintaining a substantially constant spray of fluid. FIGS. 3*f* to 3*j* illustrate how the fluid dispensing device 100 can be tilted, in an anticlockwise direction, from an invented orientation to an upright orientation while maintaining a substantially constant spray of fluid.

FIG. 3*a* illustrates the fluid dispensing device 100 of FIG. 1 in an upwards or upright orientation 305. It will be appreciated that the upright orientation is the same orientation as illustrated in FIG. 1. FIG. 3*a* helps illustrate how the fluid reservoir 125 settles and adopts a surface level that is substantially perpendicular to the primary stem axis 140 (shown in FIG. 1) when the fluid dispensing device is in an upright orientation. FIG. 3*a* also helps illustrate how the stem 135 extends along an stem axis that is parallel with (and extends along) the primary stem axis 140 shown in FIG. 1 when the fluid dispensing device is disposed in an upright orientation. FIG. 3*a* also helps illustrate how the dip-tube 195 is arranged such that an end of the dip-tube 195 not connected to the fluid flow valve housing 220 is disposed in the fluid reservoir when the fluid dispensing device 100 is arranged in an upright orientation.

FIG. 3*b* illustrates the fluid dispensing device 100 of FIG. 1 tilted in diagonal, but still substantially upright, orientation 310 away from the upright position 305 of FIG. 3*a* in an anticlockwise direction. It will be understood that the orientation 310 shown in FIG. 3*b* is a 45 degree rotation of the fluid dispensing device 100 away from the upright orientation 305 of FIG. 1 in an anticlockwise direction. It will thus be understood that the stem 135 extends along an axis, that is a stem axis, that is at 45 degrees with respect to the primary stem axis 140 shown in FIG. 1 when the fluid dispensing device is in the orientation 310 of FIG. 3*b*. As shown in FIG. 3*b*, the fluid reservoir 125 settles so that a surface level of the reservoir is oblique to the axis along which the stem 135 extends. It will be understood that the surface of the fluid reservoirs settles via gravity and thus will always be substantially perpendicular to the primary stem axis 140 shown in FIG. 1. As shown in FIG. 3*b*, the dip-tube 195 is arranged such that an end of the dip-tube 195 not connected to the fluid flow valve housing 220 is disposed in the fluid reservoir 125 in the orientation of FIG. 3*b*.

FIG. 3*c* illustrates the fluid dispensing device 100 tilted from an upright orientation 305 in an anticlockwise direction to be in a substantially lateral orientation 315. It will be understood that the orientation 315 shown in FIG. 3*c* is a 90 degree rotation of the fluid dispensing device 100 away from the upright orientation 305 of FIG. 1 in an anticlockwise direction. It will thus be understood that the stem 135 extends along an axis, that is a stem axis, that is at 90 degrees with respect to the primary stem axis 140 shown in FIG. 1 when the fluid dispensing device 100 is in the orientation 310 of FIG. 3*c*. As shown in FIG. 3*c*, the fluid reservoir 125 settles so that a surface level of the reservoir is substantially parallel the axis along which the stem 135 extends. As shown in FIG. 3*c*, the dip-tube 195 is arranged such that an end of the dip-tube 195 not connected to the fluid flow valve housing 220 is disposed in the fluid reservoir 125 in the orientation of FIG. 3*c*.

FIG. 3*d* illustrates the fluid dispensing device tilted in a diagonal, but substantially inverted, orientation 325 away from an upright 305 orientation in an anticlockwise direction. It will be understood that the orientation 325 shown in FIG. 3*d* is a 135 degree rotation of the fluid dispensing device 100 away from the upright orientation 305 of FIG. 1 in an anticlockwise direction. It will thus be understood that the stem 135 extends along an axis, that is a stem axis, that is at 135 degrees with respect to the primary stem axis 140 shown in FIG. 1 when the fluid dispensing device 100 is in the orientation 310 of FIG. 3*d*. As shown in FIG. 3*d*, the fluid reservoir 125 settles so that a surface level of the reservoir is oblique to the axis along which the stem 135 extends. As shown in FIG. 3*d*, the dip-tube 195 is arranged such that an end of the dip-tube 195 not connected to the fluid flow valve housing 220 is disposed outside of fluid reservoir 125 in the orientation of FIG. 3*d*.

FIG. 3*e* illustrates the fluid dispensing device 100 in an inverted orientation 325. It will be appreciated that the inverted orientation 325 is an orientation that is rotated by 180 degrees from the upright orientation shown in FIG. 3*a*. It will thus be understood that the stem 135 extends along an axis, that is a stem axis, that is at 180 degrees with respect to the primary stem axis 140 shown in FIG. 1 when the fluid dispensing device 100 is in the orientation 310 of FIG. 3*d*. That is to say that the stem extends along the primary stem axis 140 shown in FIG. 1 but points in the opposite direction (downwards) compared with the upright orientation 305 (shown in FIGS. 1 and 3*a*). As shown in FIG. 3*d*, the fluid reservoir 125 settles so that a surface level of the reservoir is substantially perpendicular to the axis along which the stem 135 extends. As shown in FIG. 3*s*, the dip-tube 195 is arranged such that an end of the dip-tube 195 not connected to the fluid flow valve housing 220 is disposed outside of the fluid reservoir 125 in the orientation of FIG. 3*d*.

FIGS. 3*f* to 3*j* illustrate the orientation of the fluid dispensing device 100 when the fluid dispensing device 100 is tilted from the inverted position 325 shown in FIG. 3*e* to the upright position illustrated in FIG. 3*a* 305.

FIG. 3*f* illustrates the fluid dispensing device in an inverted orientation 330. It will be appreciated that the inverted orientation 330 is an orientation that is rotated by 180 degrees from the upright orientation shown in FIG. 3*a* 305. It will be appreciated that the orientation 330 shown in FIG. 3*f* is substantially the same as the invented orientation 325 discussed with respect to FIG. 3*e*.

FIG. 3*g* illustrates the fluid dispensing device 100 in a tilted, but substantially downward facing, orientation 340 that is a 45 degree rotation from the inverted orientation 330 shown in FIG. 3*f*. It will be appreciated that the orientation 340 shown in FIG. 3*g* is substantially the same orientation 320 discussed with respect to FIG. 3*d*.

FIG. 3*h* illustrates the fluid dispensing device in a substantially sideways or lateral orientation 350 that is a 90 degree rotation from the inverted orientation 330 shown in FIG. 3*f*. It will be appreciated that the orientation 350 shown in FIG. 3*f* is substantially the same as the orientation 315 discussed with respect to FIG. 3*h*. It is noted however that the sealing ball 260 is disposed in a different position in the inner chamber region 245 relative to the orientation 315 shown in FIG. 3*c*.

FIG. 3*i* illustrates the fluid dispensing device in a tilted, but substantially upward facing, orientation 360, that is a 135 degree rotation from the inverted orientation 330 shown in FIG. 3*f*. It will be appreciated that the orientation 360 shown in FIG. 3*i* is substantially the same as the orientation 315 discussed with respect to FIG. 3*b*.

FIG. 3*f* illustrates the fluid dispensing device in an upright orientation 370 that is a 180 degree rotation from the inverted orientation 330 shown in FIG. 3*f*, and is the substantially same orientation as is discussed with respect to FIG. 3*a*.

Figure 4:
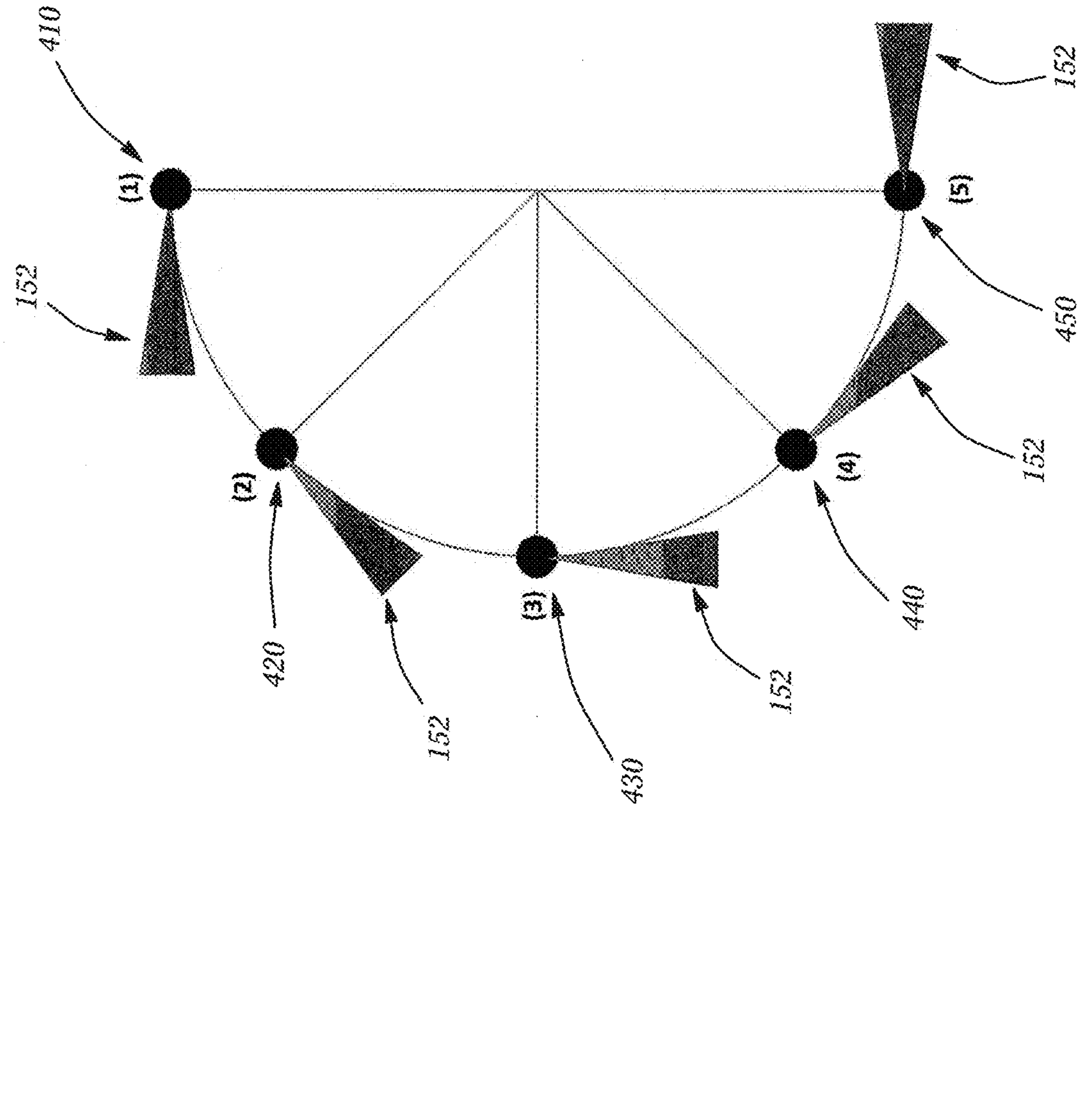
FIG. 4 illustrates the direction of fluid spray in the orientations of the fluid dispensing device illustrated in FIGS. 3*a* to 3*j;*

FIG. 4 illustrates the direction of fluid spray 152 from the fluid dispensing device 100 of FIG. 1 when the fluid dispensing device 100 disposed in the orientations shown in FIGS. 3*a* to 3*j*. Direction 1 410 corresponds to the orientations 305, 370 discussed with respect to FIGS. 3*a* and 3*j*. Direction 2 420 corresponds to the orientations 310, 360 discussed with respect to FIGS. 3*b* and 3*i*. Direction 3 430 corresponds to the orientations 315, 350 discussed with respect to FIGS. 3*c* and 3*h*. Direction 4 440 corresponds to the orientations 320, 340 discussed with respect to FIGS. 3*d* and 3*g*. Direction 4 450 corresponds to the orientations 325, 330 discussed with respect to FIGS. 3*e* and 3*f*.

Figure 5A:
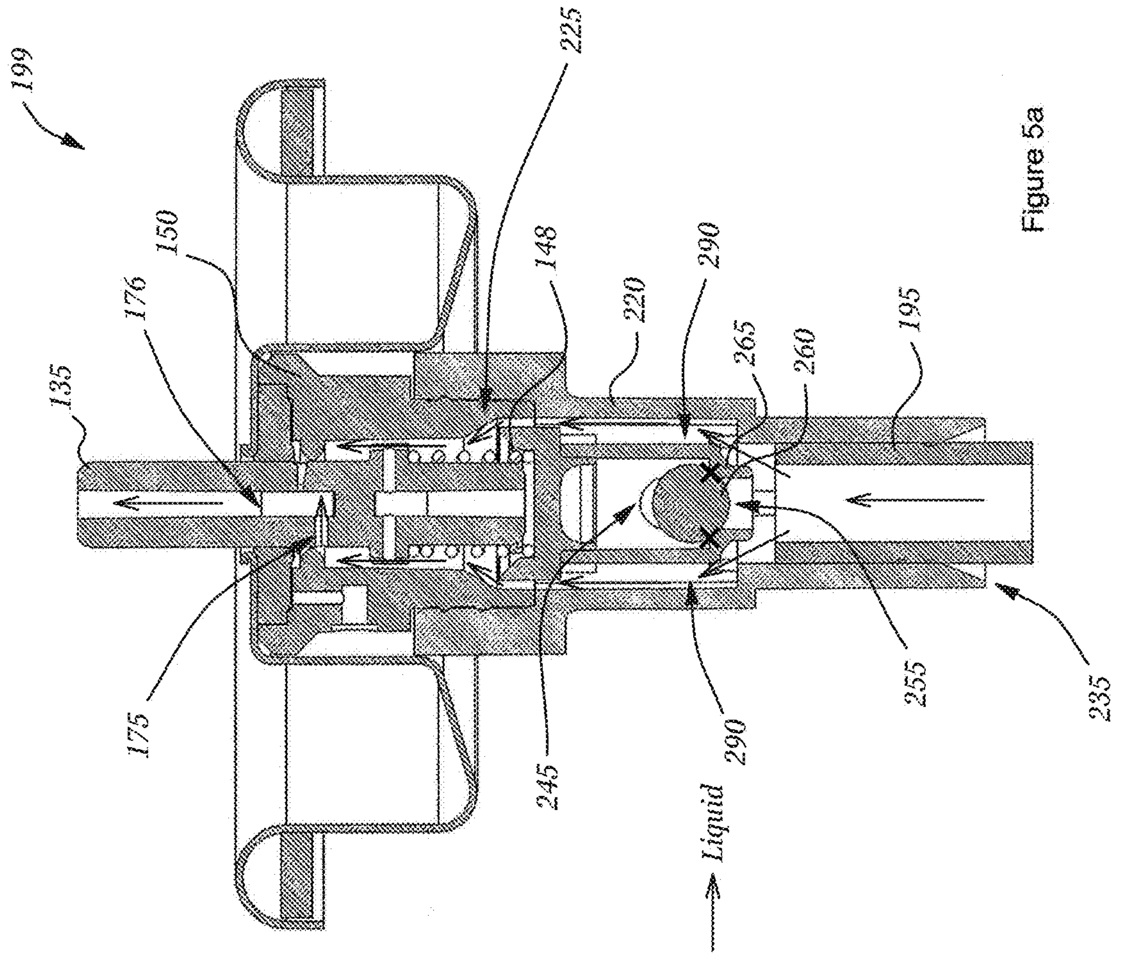
FIG. 5*a* illustrates liquid fluid flow through the valve arrangement when the fluid dispensing device is in the orientation shown in FIGS. 3*a* and 3*j;*

FIG. 5*a* illustrates the valve arrangement 199 of FIG. 2 in cross section when the fluid dispensing device 100 is oriented in the substantially upright orientation 305, 370 of FIG. 3*a* and FIG. 3*j*. In particular, FIG. 5*a* illustrates how liquid, that is a fluid to be dispensed initially disposed in the fluid reservoir, can flow through the valve arrangement when the fluid dispensing device is arranged in a substantially upright orientation 305, 370. The arrows in FIG. 5*a* illustrate liquid flow through the valve arrangement 199. It will be understood that the upright orientation 305, 370 of the fluid dispensing device 100 (and thus of the valve arrangement 199) is an example of a first mode of operation of the fluid dispensing device 100 and valve arrangement 199. It will be understood that when the fluid dispensing device 100 is arranged in an upright orientation 305, 370, the remaining end of the dip-tube 195 that is not secured in the open region 235 of the fluid flow valve housing 220 is arranged proximate to the bottom of the can of the fluid dispensing device 100 and is thus arranged in the fluid reservoir 125 (should there be sufficient fluid remaining in the can for fluid dispensing). It will be understood that the gas propellent arranged in the headspace 130 above the fluid reservoir 125 is pressurised and thus pushes downwards on the fluid reservoir 125. This pressure acting on the fluid reservoir 125 acts to urge the liquid up through the dip-tube 195 and into the open region 135 of the fluid flow valve housing 220 (through the dip-tube 195 that is arranged in the open region 135).

As illustrated in FIG. 5*a*, the sealing ball 260 is arranged on the valve seat 265 when the fluid dispensing device 100 is arranged in a substantially upright orientation 305, 370. It will be appreciated that the sealing ball 260 is arranged on the valve seat 265 by gravity. The sealing ball 260 thus prevents liquid at the open region 235 of the fluid flow valve assembly 220 from entering the inner chamber region 245 via the inner fluid port 255. That is to say that the inner chamber region 245 and the open region 235 are fluidly disconnected by the sealing ball 260. Liquid is instead forced around, into, and through the two fluid communication passageways 290 and thus the fluid travels around the inner chamber region 245. Liquid thus travels from the open region 235 of the fluid flow valve housing 220 to the open mouth region 225 via the fluid communication passageways 290. The liquid is thus forced from the open mouth region 225 up into a stem valve assembly fluid communication region 149 (that is a stem housing fluid communication region) of the stem valve assembly housing 150. As shown in FIG. 5*a*, the stem valve assembly fluid communication region 148 extends around the valve stem 135.

It will be understood that when the stem 135 is in a closed position, the stem shoulder 165 is urged into abutment with the inner lip 170 of the stem valve assembly housing 150 by the spring 148. The stem shoulder 165 and inner lip 170 thus form a seal and prevent liquid from flowing into the stem fluid inlet 175 of the stem 135. However, when the stem 135 is depressed and moved (or urged against the biasing force provided by the spring 148) into an open position as shown in FIG. 5*a*, the stem shoulder 165 is axially separated from the inner lip 170 and the stem fluid inlet 175 is arranged below the inner lip 170 (from the viewpoint illustrated in FIG. 5*a*). As is illustrated in FIG. 5*a*, liquid is urged from the stem valve assembly fluid communication region 225 through the stem fluid inlet 175 and into the stem channel 176 to be sprayed out of the fluid dispensing device 100 when mixed with propellant.

Figure 5B:
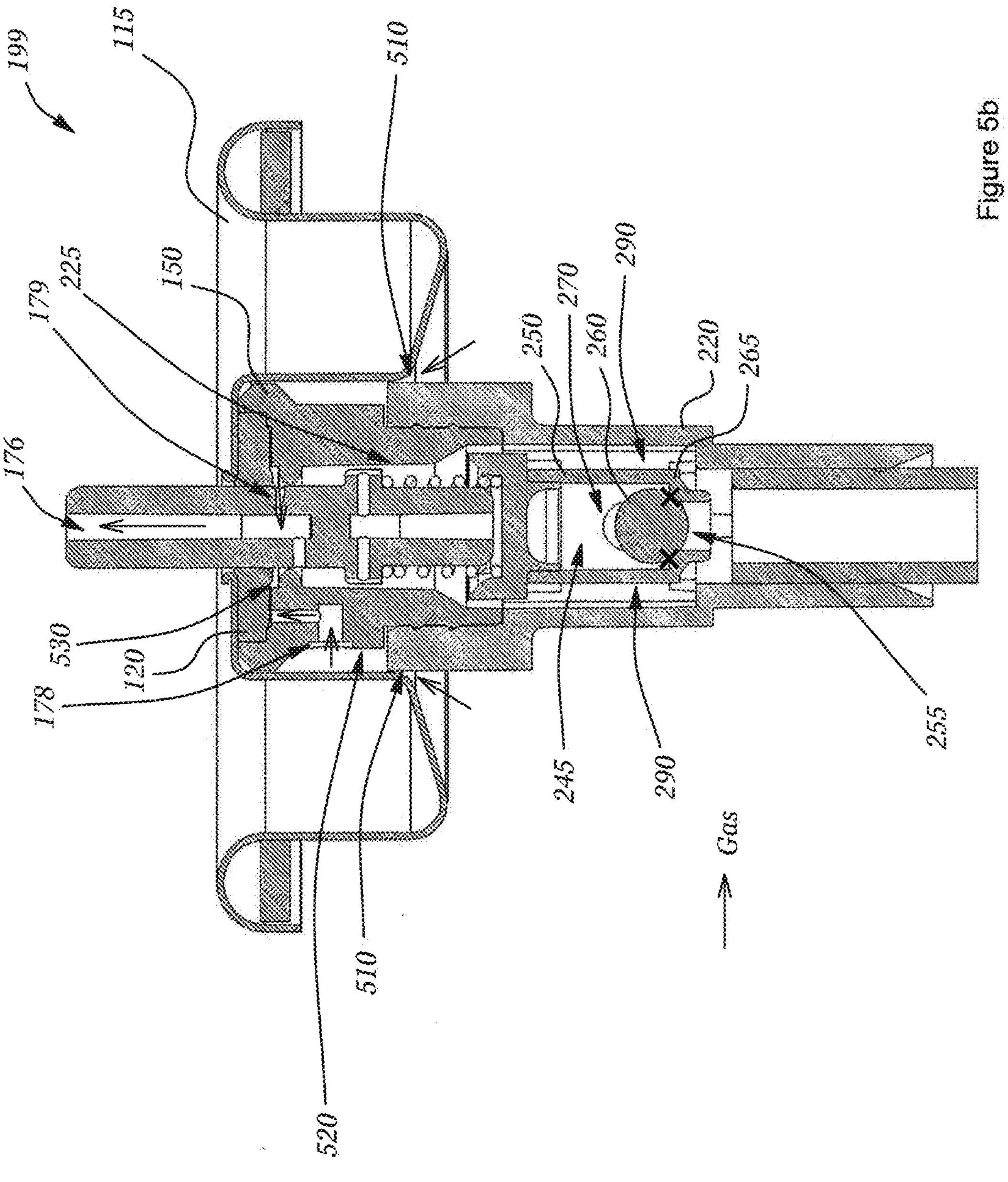
FIG. 5*b* illustrates gas flow through the valve arrangement when the fluid dispensing device is in the orientation shown in FIGS. 3*a* and 3*j;*

FIG. 5*b* illustrates gas flow through the valve arrangement 199 on FIG. 5*a* when the fluid dispensing device 100 is in the upright configuration 305, 370 of FIGS. 3*a* and 3*j*. FIG. 5*b* illustrates the valve arrangement 199 in cross section. As shown in FIG. 5*b*, gas propellant in the can headspace 130 above the fluid reservoir 125 passes through a gas inlet region 510 between an inner surface of mounting cup 115 and the outer surface of the fluid flow valve housing 220 at the open mouth region 225 of said housing. The gas passes, via the gas inlet region 510 into a gas communication region 520 located between the inner surface of the mounting cup 115 and an outer surface of the stem valve assembly housing 150. The gas can then pass from the gas communication region 520 into the gas flow passageway 178 of the stem valve assembly housing 150, from the gas flow passageway 178 to a gas flow region 530 beneath the inner sealing gasket 120 and radially around the stem 135. When the stem 135 is in the closed position, the stem gas inlet 179 of the stem 135 is located at or above the inner sealing gasket 120 and thus the inner sealing gasket 120 prevents gas flow from the gas flow region 530 beneath the inner sealing gasket 120 into the stem gas inlet 179. When the stem 135 is depressed and in an open position, as illustrated in FIG. 5*a*, the stem gas inlet 179 is moved to be located beneath the inner sealing gasket 120 and thus gas propellant can flow into the stem channel 176 via the stem gas inlet 179.

It will be understood that liquid fluid and gas propellent enter the stem channel 176 simultaneously when the stem 135 is depressed, or urged towards the stem valve assembly housing 150, to be in an open position. Two fluid atomisation thus occurs in the stem channel 176 when the liquid fluid and the gas propellant mix. That is to say, mixture between the high-pressure gas propellant and the liquid fluid to be dispensed results in the fluid being separated into fine droplets that is essentially is in a gas phase (or at least is substantially similar to being in a gas phase) which are propelled upwards though the stem channel 176 and out of the fluid dispensing device 100 via the nozzle 155 as a fine spray. The stem channel 176 is thus an example of a two fluid atomisation region. It will be appreciated that when the stem 135 is depressed into the open position, the stem fluid inlet 175 allows fluid to flow into the stem channel 176 at the same time as the stem gas inlet 179 allows gas to flow into the stem channel 176 to allow two fluid atomisation to occur.

It will be understood that, when the fluid dispensing device 100 is in an upright orientation 305, 370, the wall fluid ports 270 located in the inner wall 250 of the fluid flow valve housing 220 are located within the headspace region 130 of the can and thus pressurised propellant gas can pass from the headspace 130 into the inner chamber region 245. The sealing ball 260, which sits on the valve seat 265 and thus blocks fluid flow from the inner chamber region 245 through the inner fluid port 255 (effectively closing the inner fluid port 255), thus prevents flow of gas propellant from the headspace into the liquid flow path through the fluid flow valve housing 220 and the stem valve assembly housing 150. That is to say, gas from the headspace 130, which may, via the wall fluid ports 270, pass into the inner chamber region 245 cannot pass through the inner fluid port 255 and towards (or into) the fluid communication passageways 290 due to the sealing ball 260 abutting against the valve seat 265. Aptly the sealing ball 160 may be sized to prevent or limit propellant gas entering into the inner chamber region 245 via the wall fluid ports 270 when the sealing ball 260 is disposed against the valve seat 265. The sealing ball 260 thus helps prevent or limit air surge and the like wherein pressurised gas rushes through the liquid flow path of the valve arrangement 199 so that, when actuated, the fluid dispensing device only dispenses, and thus wastes, propellant gas. Furthermore, any high-pressure gas located in the inner chamber region 245 (from the headspace 130 via the wall side ports 170) may impart a pressure on the sealing ball 260, urging the sealing ball 160 against the valve seat 265 and may increase the fluid sealing effect of the sealing ball 160 against the valve seat 265.

Figure 6:
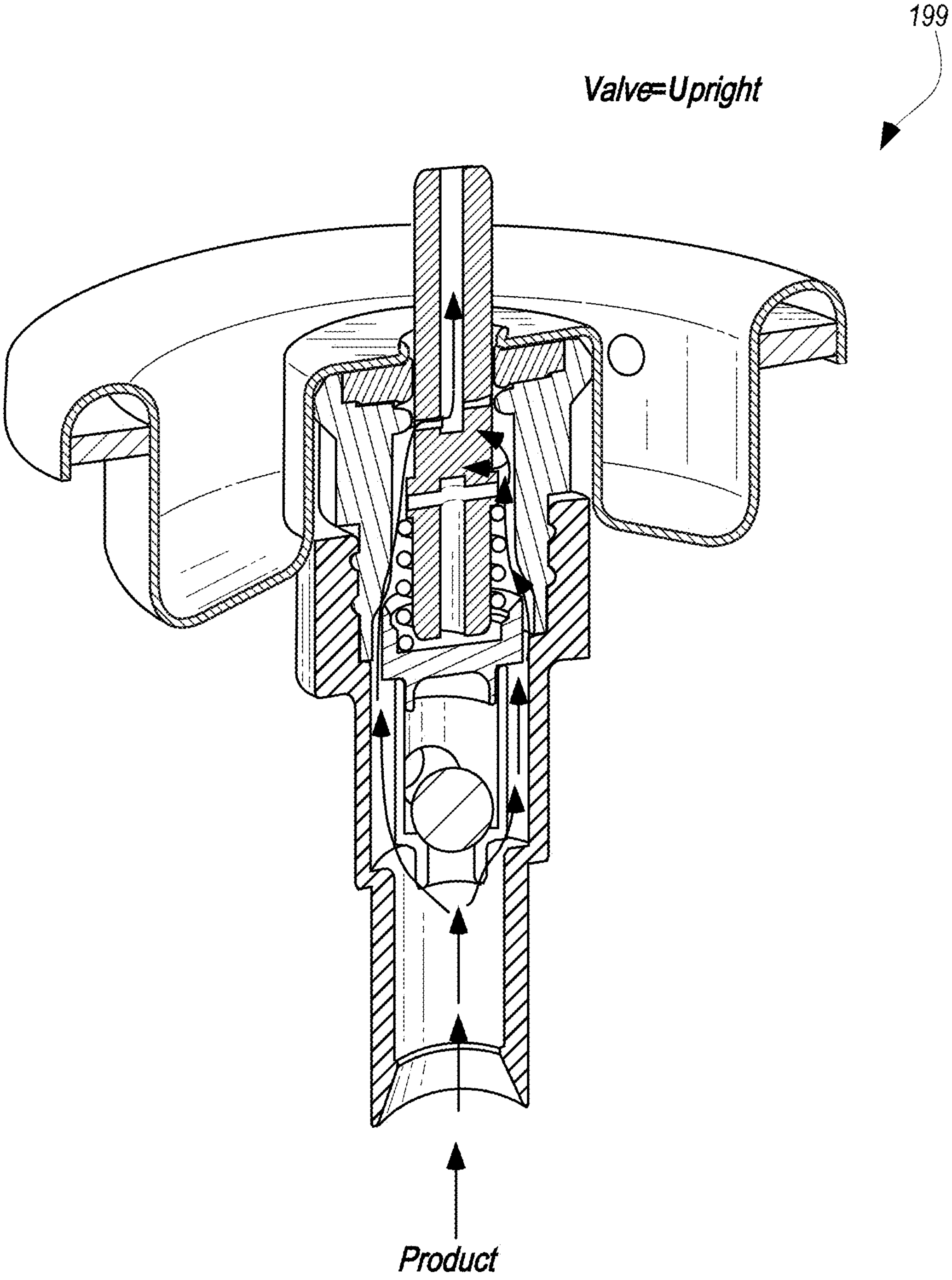
FIG. 6 illustrates a different perspective cross sectional view of the valve arrangement when the fluid dispensing device is in an upright orientation.

FIG. 6 illustrates a different perspective view of a partial section the valve arrangement 199 of FIGS. 5*a* and 5*b* when the fluid dispensing device 100 of FIG. 1 is arranged in the upright orientation 305, 370 shown in FIGS. 3*a* and 3*j*. The arrows shown in FIG. 6 help illustrate the liquid fluid flow path for liquid to be dispensed when the fluid dispensing device 100 is in an upright position or orientation 305, 370.

It will be appreciated the speed of the product (liquid fluid) coming up through the dip-tube is relatively slow due to the product smallest orifice, which is the stem fluid inlet (or alternatively the inner stem channel) being smaller than the dip-tube. Optionally the stem fluid inlet has a diameter of around 0.50 mm. Optionally the dip-tube has an inner diameter of around 3.45 mm. Optionally any other suitable dimensions may be utilised. Using these exemplary dimensions, the velocity of the fluid coming up the dip tube can be shown to be around $9.348\ mm^2 \div 0.785\ mm^2$ and is thus 11.90 times slower than that flowing through the stem orifice.

It will be appreciated that gravity and the density of the sealing ball is enough (or almost enough) to hold the ball on the seat even if the pressure differential (between the inside of the can of the fluid dispensing device and outside of the fluid dispensing device) is not evident after opening the valve.

Figure 7A:
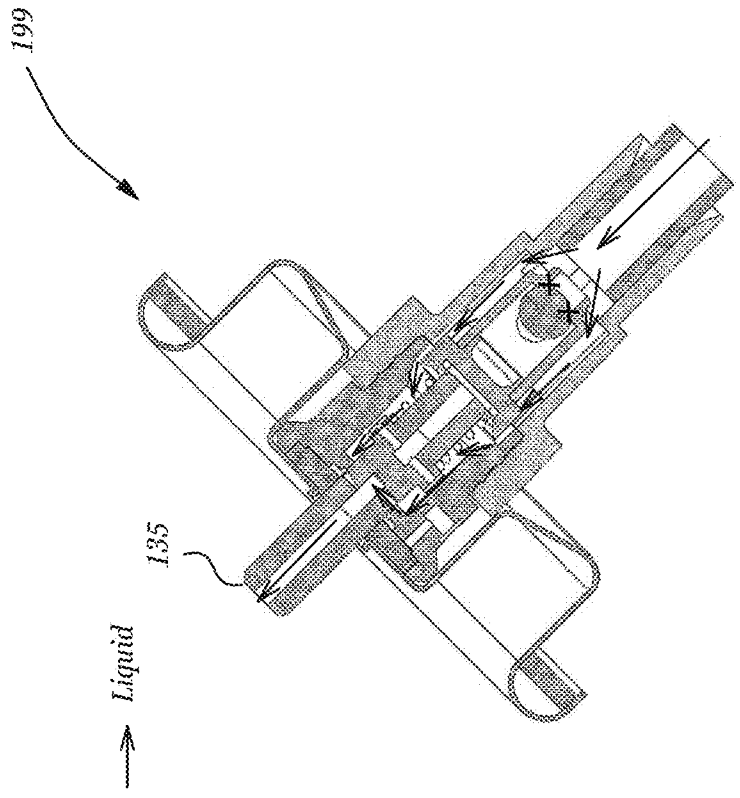
FIG. 7*a* illustrates liquid fluid flow through the valve arrangement when the fluid dispensing device is in the orientation shown in FIGS. 3*b* and 3*i;*

FIG. 7*a* illustrates the valve arrangement 199 of FIG. 2 in cross section and in the orientation 310, 360 shown in FIGS. 3*b* and 3*i*. The valve arrangement 199 shown in FIG. 7*a* is thus arranged in a diagonally tilted, but substantially upright, orientation 310, 360 where the axis associated with the valve stem 135 is offset from the primary valve stem axis 140 shown in FIG. 1 by 45 degrees. That is to say that the angle of the primary stem axis of the fluid dispensing device of FIG. 7*a* makes an of around 45 degrees with the primary stem axis 140 of the upright orientation shown in FIG. 1. That is to say that, in the position shown in FIG. 7*a*, the fluid dispensing device 100 has been tilted by an angle of around 45 degrees with respect to the upright position or orientation 305 270 shown in FIGS. 3*a* and 3*j*. The arrows of FIG. 7 indicate liquid flow through the valve arrangement 199 when the stem 135 is depressed into an open configuration, shown in FIG. 7*a*. As is shown in FIG. 7, with similarity to the orientation 305, 370 of the valve arrangement 199 discussed with respect to FIGS. 5*a* and 5*b*, the flow path of liquid through the valve arrangement 199 is substantially the same as that described with respect to FIG. 5*a*.

Figure 7B:
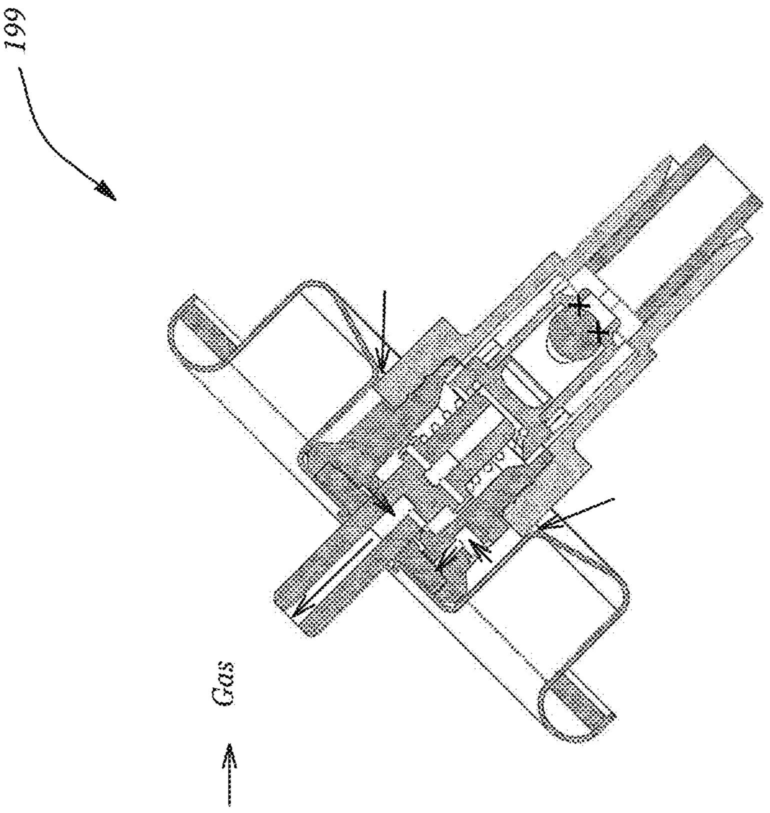
FIG. 7*b* illustrates gas flow through the valve arrangement when the fluid dispensing device is in the orientation shown in FIGS. 3*b* and 3*i;*

FIG. 7*b* illustrates how gas flow occurs through the valve arrangement 199 of FIG. 7*a*. FIG. 7*b* shown the valve arrangement 199 in cross section. The arrows of FIG. 7*b* indicate gas flow through the valve arrangement 199. As illustrated in FIG. 7*b*, gas flow through the valve arrangement 199 when the fluid dispensing device is arranged in the diagonally tilted, but substantially upright, orientation 310, 360 shown is substantially the same as that discussed with respect to FIG. 5*b*.

It will be understood that, alongside illustrating the valve assembly 199 when the fluid dispensing device 100 is tilted away from the upright orientation 305, 370 by 45 degrees, FIGS. 5*a* and 5*b* also illustrate the valve assembly 199 when the fluid dispensing device is tilted away from an inverted orientation 325, 330 (shown in FIGS. 3*e* and 3*f*) by 135 degrees as per the orientation 360 of the fluid dispensing device 100 shown in FIG. 3*i*.

Figure 8:
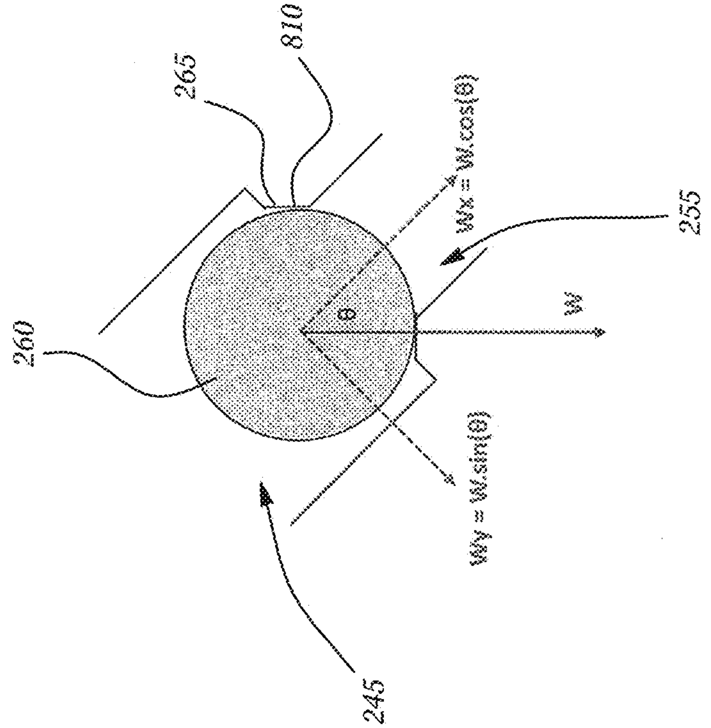
FIG. 8 illustrates a schematic view of a sealing ball of the valve arrangement abutting against a valve seat region located in an inner chamber region of the valve arrangement.

FIG. 8 illustrates a schematic view of the sealing ball 260 and valve seat 265 of the fluid dispensing device in more detail. It will be understood that the sealing ball 260 and valve seat 265 shown in FIG. 8 are in a position that corresponds with the orientation 310, 360 of the fluid dispensing device shown in FIGS. 3*b*, 3*i*. As shown in FIG. 8, the sealing ball 260 sits flush against the valve seat 265 to fluidly seal, or substantially fluidly seal, the region around the valve seat 265. It will be appreciated that the sealing ball 260 thus acts to fluidly disconnect, or substantially fluidly disconnect, the inner chamber region 245 from the inner fluid port 255 of the valve arrangement 199 of FIG. 2.

As is illustrated in FIG. 8, when the valve seat 265 is tilted (such as in the position shown in FIG. 8) relative to the position of the valve seat 265 when the fluid dispensing device 100 is in the upright position 305, 370 (as is shown in FIGS. 1, 3*a* and 3*j*) the weight of the sealing ball 260 acts in a direction that is oblique with respect to the axis along which the stem extends, that is a stem axis, when the fluid dispensing device 100 is in the orientation 310, 360. It will be understood that this axis makes an angle of 45 degrees with the primary stem axis shown in FIG. 1. It will also be understood that the inner chamber region 245 and valve seat 265 are arranged around the axis along which the stem extends. It will be appreciated that the weight of the sealing ball 260 extends along the primary stem axis 140 shown in FIG. 1 (which is the stem axis 140 when then fluid dispensing device 100 is disposed in an upright orientation 305, 370) pointing downwards (towards the ground) when the sealing ball 260 is sealingly engaged with the valve seat 265.

Respective force components of the weight of the sealing ball 160 (which act along the stem axis ($W_x$) at a given orientation of the fluid dispensing device 100 upon which the centre of mass of the sealing ball 260 is located when the sealing ball 260 sits on the valve seat 265, and act perpendicular to the stem axis ($W_y$)) can thus be resolved. The force components of the weight of the sealing ball are Wx=W cos(θ) (extending along the stem axis) and Wy=W sin(θ) (extending perpendicular to the stem axis).

It will be understood that various orientations of the fluid dispensing device 100 impact the position of the sealing ball 260 relative to the valve seat 265. Various force components and the associated position of the sealing ball 260 are indicted in Table 1 when the orientation of the fluid dispensing device 100 is such that the stem axis (along which force component $W_x$ extends) makes an angle of θ with a directly downward direction that is the direction in which the weight of the sealing ball 160 acts by gravity. It will be appreciated that the orientations described in Table 1 relate to rotating the fluid dispensing device 100 away from an upright orientation 305, 370 and towards an inverted orientation 325, 330.

TABLE 1

| θ (°) | $W_x$ | $W_y$ | Comments |
|---|---|---|---|
| 15 | 0.97 W | 0.26 W | Wx > Wy thus the sealing ball, by gravity, sits against the valve seat. |
| 30 | 0.87 W | 0.50 W | Wx > Wy thus the sealing ball, by gravity, sits against the valve seat. |
| 44 | 0.72 W | 0.69 W | Wx > Wy thus the sealing ball, by gravity, sits against the valve seat. |
| 45 | 0.71 W | 0.71 W | Wx = Wy thus the sealing ball will move away from its sealing position fully against the valve seat if angle θ is increased by rotating the fluid dispensing arrangement. |
| 46 to 90 | 0.69 W | 0.72 W | Wx < Wy thus the sealing ball starts moving in the inner chamber region away from its sealing position on fully against the valve seat. |

Force components relating to the weight of the sealing ball 260 and comments regarding the position of the sealing ball 260 relative to the valve seat 265 at a variety of orientations of the fluid dispensing device 100 of FIG. 1 where the stem axis of the fluid dispensing device 100 makes an angle θ with a downward direction in which the weight of the sealing ball 260 acts.

As can be seen from Table 1, when the fluid dispensing device 100 is rotated at an angle of around 45 degrees from the upright position 305, 370 (as is shown in FIGS. 1, 3*a* and 3*j*), the fluid dispensing device 100 reaches a threshold position at which point any further rotation of the fluid dispensing device 100 relating to the upright position 305, 370 to increase the angle of rotation past 45 degrees will act to unseat the sealing ball 260 from the sealed position against the valve seat that is shown in FIGS. 1, 2, 5*a*, 5*b*, 7*a* and 7*b*. Thus, when the stem axis is rotated away from the upright orientation 305, 370 at an angle of greater than 45 degrees, the sealing ball 260 does not fully abut against the valve seat 265. If the sealing ball 260 is sized so as to block fluid flow through the wall fluid ports 270 when the sealing ball 260 is sat in a sealing position on the valve seat 265, rotating the fluid dispensing device 100 away from the upright orientation 305, 310 by greater than 45 degrees will act to effectively open the wall side ports 270.

It will be appreciated that the position of the sealing ball 260 relative to the valve seat 265 is responsive to gravity and optionally buoyancy.

FIG. 8 also shows how the valve seat 265 includes an annular abutment surface 810 against which sealing ball 260 abuts when the sealing ball 260 is disposed in a sealing position against the valve seat 265. It will be understood that the abutment surface 810 surrounds circular opening that is the inner fluid port 255. As is shown in FIG. 8, the annular abutment surface 810 is oblique with respect to the stem axis. That is to say that annular abutment surface 810 is sloped or slanted. Thus, when the sealing ball 260 sits in a sealing position on the valve seat 265, the sealing ball 260 partly intrudes through the valve seat 265 so that a portion of the sealing ball 260 is located in the inner fluid port 255. Aptly the oblique valve seat 810 makes an angle of between around 25 to 55 degrees with the stem axis. Aptly this angle is between 30 and 50 degrees. Aptly this angle is around 45 degrees. Aptly this angle is around 48 degrees. It will be appreciated that the angle of the valve seat may help increase sealing provided by the sealing ball and the valve seat (by allowing the sealing ball to intrude partly through the valve seat (partly into the inner fluid port) and also may help in allowing he sealing ball to fall off the valve seat at a desired orientation of the fluid dispensing device.

Figure 9A:
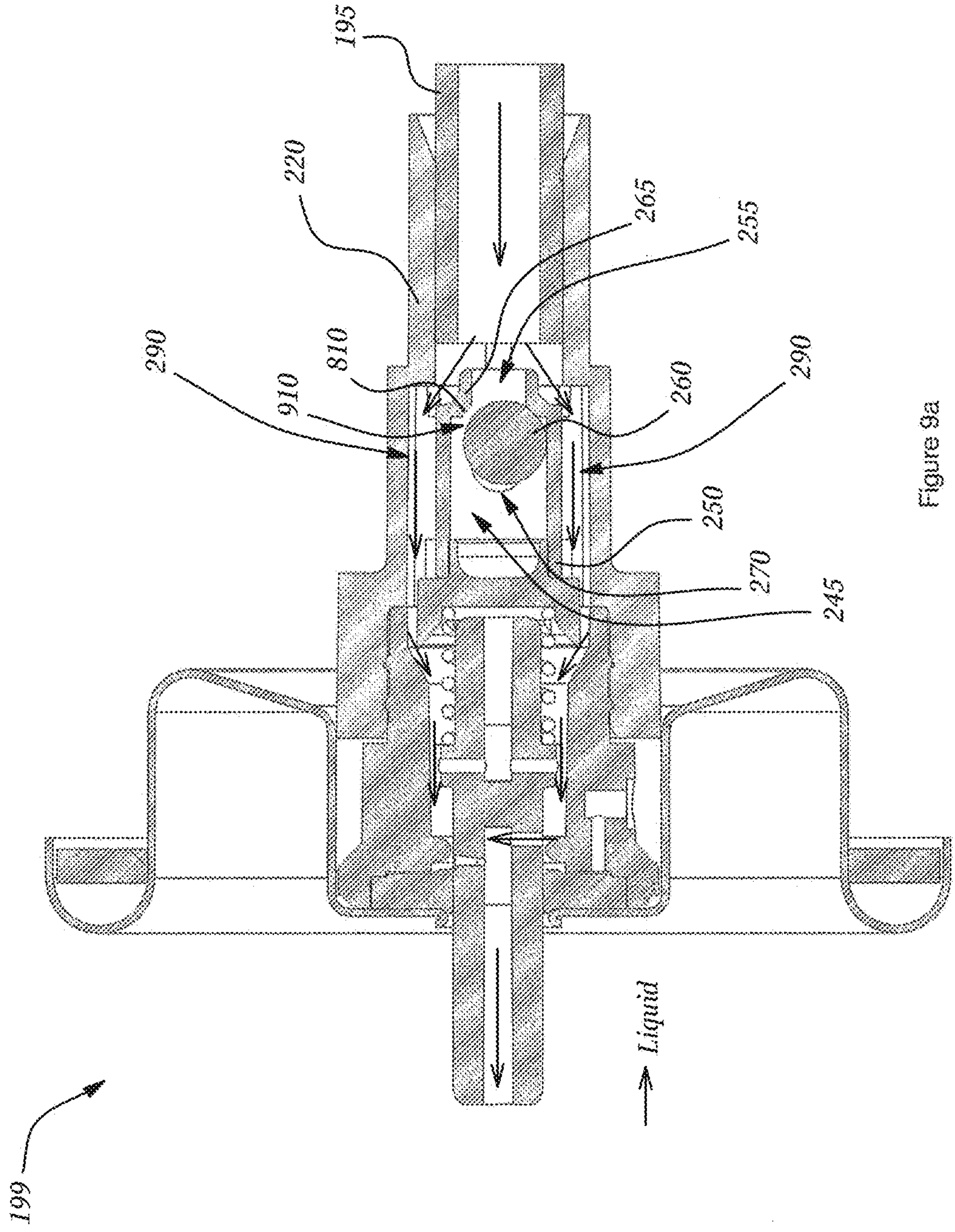
FIG. 9*a* illustrates liquid fluid flow through the valve arrangement when the fluid dispensing device is in the orientation shown in FIG. 3*c;*

FIG. 9*a* illustrates the valve arrangement 199 of FIG. 2 in cross section when the fluid dispensing device 100 of FIG. 1 is arranged in the substantially sideways orientation 315 shown in FIG. 3*c*. It will be understood that the sideways or lateral orientation 315 of the fluid dispensing device 100 is an orientation 315 in which the fluid dispensing device 100 is rotated at 90 degrees relative to the upright position 305, 370 illustrated in FIGS. 1, 3*a*, and 3*j*. FIG. 9*a* illustrates liquid fluid flow through the valve arrangement 199 in the sideways orientation 315. Fluid flow through the valve arrangement 199 is illustrated by the arrows in FIG. 9*a*. As is shown in FIG. 9*a*, liquid fluid flow through the valve arrangement 199 is substantially the same as the fluid flow path described with respect to FIG. 5*a*.

As can be seen from FIG. 9*a*, the sealing ball 260 has moved away from its sealing position against the valve seat 265. That is to say that the sealing ball 260 is not fully seated against the annular abutment surface 810 of the valve seat 265 in a sealing manner. This is due to rotation of the fluid dispensing device by more than 45 degrees away from the upright orientation 305, 370. It can be seen in FIG. 9*a* that the sealing ball 260 has instead moved to be in contact with the inner wall 250 of the fluid flow valve housing 220 and is now only in contact with a portion of the valve seat 265. Thus, a gap 910 is present at the remaining portion the valve seat 265 against which the sealing ball 260 is no longer abutting. It will be appreciated that if the wall fluid port 270 is located below a liquid fluid reservoir 125 level when the fluid dispensing device 100 is arranged in a so-called sideways position 315 as is illustrated in FIG. 9*a*, liquid fluid may ingress into the inner chamber region 245 and may escape from the inner chamber region 245 through the inner fluid port 255 via the gap 910 between the valve seat 265 and the sealing ball 260. Thus, even if the dip-tube 195 is wholly or intermediately located out of the fluid reservoir 125 due to a curvature of the dip-tube 195 or the like, some fluid may still be able to ingress into the fluid communication pathways 290 of the fluid flow valve housing 220, via the gap 910, and thus may be able to be dispensed in a similar manner as will be described with respect to the inverted orientation 325, 330 of the fluid dispensing device 100 that will be described below.

Figure 9B:
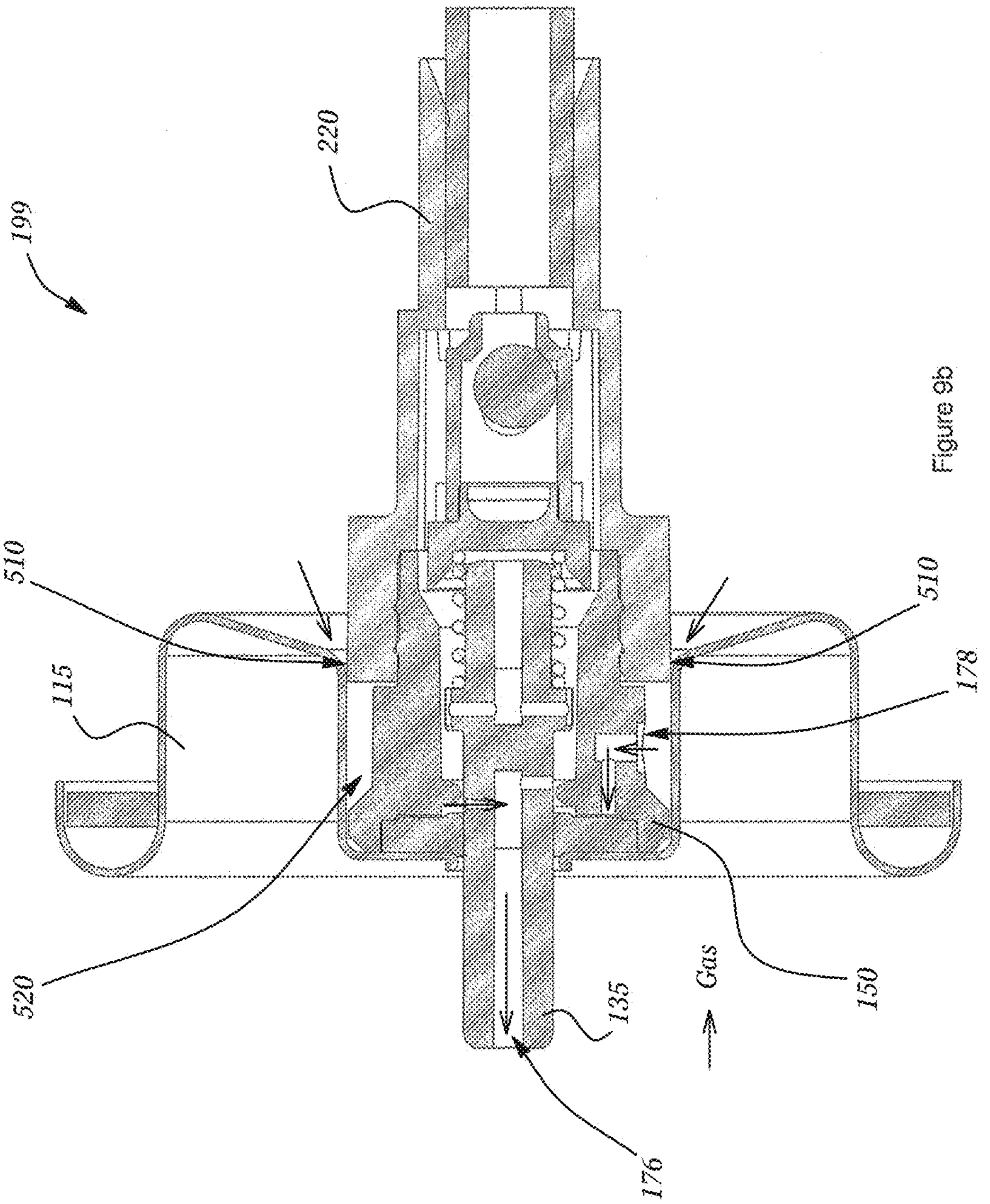
FIG. 9*b* illustrates gas flow through the valve arrangement when the fluid dispensing device is in the orientation shown in FIG. 3*c;*

FIG. 9*b* illustrates how gas flow occurs through the valve arrangement 199 of FIG. 2 when the fluid dispensing device 100 is arranged in the sidewise orientation 315 shown in FIG. 3*c*. It will be understood that FIG. 9*b* illustrates the valve arrangement 199 in cross section. The arrows included in FIG. 9*b* illustrate gas flow through the valve arrangement 199. As is shown in FIG. 9*b*, gas flow through the valve arrangement 199 occurs in substantially the same manner as is described with respect to FIG. 5*a*. It is noted that liquid fluid cannot pass through the gas inlet region 510, or does not easily pass through the gas inlet region 510, between the mounting cup 115 and the fluid flow valve housing 220. Thus, even when the valve arrangement 199 is disposed sideways as shown in FIG. 9*b*, gas can enter the gas communication region 520 at the upmost portion of the gas inlet region 510 (from the sideways perspective view of the valve assembly illustrated in FIG. 10*a*) that would be outside of the fluid reservoir 125 and in the headspace 130 in the can, and can pass around the stem valve assembly housing 150 to access the gas flow passageway 178 in the stem valve assembly housing 150 and enter into the stem channel 176 to mix with liquid fluid when the stem 135 is depressed.

Figure 10A:
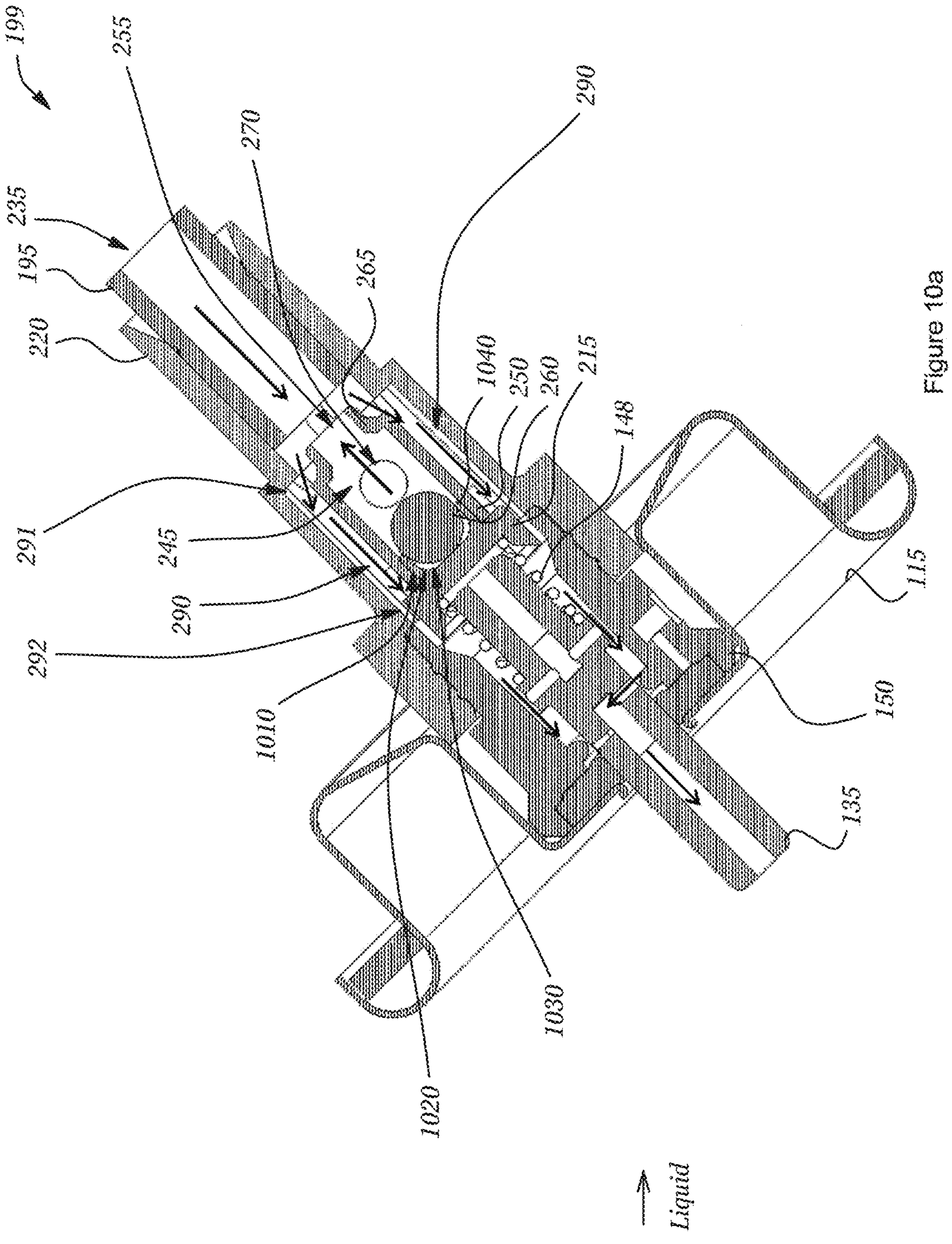
FIG. 10*a* illustrates liquid fluid flow through the valve arrangement when the fluid dispensing device is in the orientation shown in FIGS. 3*d* and 3*g;*

FIG. 10*a* illustrates the valve arrangement 199 of FIG. 2 in cross section when the fluid dispensing device 100 of FIG. 1 is in a tilted, but substantially downward facing, orientation 320, 340. The orientation of the valve arrangement 199 shown in FIG. 10*a* is thus the orientation of the valve arrangement 199 when the fluid dispensing device 100 is in the orientation 320, 340 shown in FIGS. 3*d* and 3*g*. It will thus be understood that the orientation of the valve arrangement 199 shown in FIG. 10*a* is a position when the fluid dispensing device 100 is tilted away from the upright orientation 305, 370 by an angle of 135 degrees so that the stem axis makes an angle of around 135 degrees with the primary stem axis 140 (that is the stem axis when the fluid dispensing device 100 is in an upright orientation 305, 370) shown in FIG. 1. when the fluid dispensing device is in an upright orientation 305, 370. That is to say that the position shown in FIG. 10*a* shows the valve arrangement 199 when the fluid dispensing device is tilted around 135 degrees from the upright position as shown in FIG. 3*e*. It will also be understood that the position of the valve arrangement 199 shown in FIG. 10 is the position when the fluid dispensing device 100 is tilted away from an inverted orientation 325, 330 by 45 degrees as shown in Fight 3*i*. In particular, FIG. 10*a* illustrates how fluid flow occurs through the valve arrangement 199 when the fluid dispensing device 100 is in the orientation 320, 240 shown.

As shown in FIG. 10*a*, the sealing ball 260 is in a different position relative to the position of the sealing ball 260 shown in FIGS. 5*a*, 5*b*, 5*c*, 7*a* and 7*b*, and also in FIGS. 9*a* and 9*b*. As is shown in FIG. 10*a*, instead of being located proximate to the valve seat 265, the sealing ball 260 is located at the further end 1010 of the inner chamber region 245 against a rear surface 1020 of the spring seat 215 that is an opposite side of the spring seat 215 to the side that the spring 148 abuts against. That is to say that the sealing ball 260 is located against the rear surface 1020 of the spring seat 215 that forms a surface of the inner chamber region 245 at the further end 1010 of the chamber. It will be appreciated that the rear surface 1020 of the spring seat 215 is an example of a closure member support region. It will be appreciated that the rear surface 1020 of the spring seat 215 includes a generally concave central region 1030 around which an annular lip 1040 extends. As shown in the cross-sectional view shown in FIG. 10*a*, the generally concave 1030 region has a generally arcuate cross section which extends between projecting cross sectional regions which correspond to the annular lip 1040.

FIG. 10*a* shows how the annular lip 1040 on the rear surface 1020 of the spring seat 215 is sized to cooperate with the cylindrical inner surface 250 of the fluid flow valve housing 220 so that the annular lip 1040 sits inside an end region of the cylindrical inner surface 250. Outer walls of the annular lip region 1040 of the spring seat 215 thus abut against a portion of the cylindrical inner surface 250. It will be appreciated that the diameter of the outer surface of the annular lip 1040 is similar to the diameter of the inner cylindrical surface 250 so that the annular lip 1040 forms an interference fit with the inner surface 250 and thus connects the spring seat 215 to the fluid flow valve housing 220. As shown, an annular abutment surface is arranged radially outside of the annular lip 1040 which abuts against the inner cylindrical surface 250. The spring seat 215 and inner surface 250 thus partly surround the inner chamber region 245.

As is shown in FIG. 10*a* the concave region 1030 on the rear surface 1020 of the spring seat 215 results in the inner chamber region 245 having a concave end region at the further end 1010 of the chamber. It will be understood that the sealing ball 260 is sized so that the sealing ball diameter is around the same size, or less than, the size of a diameter of the annular lip 1040 of the spring seat 215. The sealing ball 260 can therefore sit within the annular lip 1040 and can intrude into the concave end region, that is the concave region 1030 of the spring seat 215, when the sealing ball 215 is disposed at the further end 1010 of the inner chamber region 245. It will be understood that when the sealing ball 260 is disposed at the further end 1010 of the inner chamber region 245, within the annular lip 1040 and concave region 1030 of the rear surface 1020 of the spring seat 215, the sealing ball 260 is disposed away from the inner fluid port 255 and thus does not prevent fluid flow through said port. Similarly, the sealing ball 260 is distal to the wall ports 270 and thus does not prevent, or reduce, fluid flow through the wall ports 270.

It will be appreciated that the sealing ball 260 can be located in the position shown in FIG. 10*a* by gravity. As previously discussed, when the fluid dispensing device 100 is tilted 45 degrees from the upright position as is shown in FIG. 3*c*, the sealing ball 260 falls away from its sealing position against the valve seat 265 but remains in contact with a portion of the seat 265 (the portion of the seat closest to the ground) by gravity. It will be understood that the position of the valve arrangement 199 shown in FIG. 3*c* is a threshold orientation where any further rotation of the fluid dispensing device 100 away from the upright orientation (and towards the inverted orientation), from the position of FIG. 3*c* causes the sealing ball 260 to roll away from the valve seat 265 along a lower portion of the inner wall 250 by gravity. Thus, the sealing ball 260 rolls towards the further end 1010 of the inner chamber region 245 (towards the spring seat 215) and into the concave region 1030 of the rear surface 1020 of the spring seat 215 by gravity.

As shown in FIG. 10*a*, the fluid flow path through the valve arrangement differs from the fluid flow path described with respect to FIGS. 5*a*, 5*b*, 5*c*, 7*a*, 7*b*, 9*a* and 9*b*. When the fluid dispensing device 100 is arranged in the orientation 320, 340 shown in FIGS. 3*d* and 3*g*, the fluid reservoir 125 settles substantially towards the upper end on the can (the end upon which the mounting cup 115 is secured). The wall fluid ports 270 of the fluid flow valve housing 220 are thus arranged beneath the level of liquid fluid in the can. Thus, liquid fluid from outside of the fluid flow valve housing 220, at a fluid communication region of the can that is outside of the fluid flow valve housing 220, flows through the wall fluid ports 270 into the inner chamber region 245. Liquid can then pass from the inner chamber region 245 through the inner fluid port 255, which is open as the sealing ball 260 is located at the further end 1010 of the inner chamber region 245 and into a first end 291 of each fluid communication passageway 290. The first end 291 of each fluid communication passageway 290 is located proximate to the open region 235 of the fluid flow valve housing 220. Liquid fluid thus can then pass through the fluid communication passageways 290 towards the further end 292 of the fluid communication passageways 290 (each disposed proximate to stem valve assembly housing 150). Liquid fluid then passes around the stem valve assembly housing 150 and into the stem 135 as has been described with respect to FIG. 5*a*.

It will be appreciated that when sealing ball 260 is arranged towards the further end 1010 of the inner chamber region 245, the sealing ball 260 does not act to block or reduce fluid flow into the inner chamber region 245 via the wall fluid ports 270.

As shown by the arrows in FIG. 10*a*, if the end of the dip-tube (that is not connected to the fluid flow valve assembly 220) is still immersed in the fluid reservoir 125 when the valve arrangement 199 is in the position shown in FIG. 10*a* (which depends on the length and shape of the dip-tube 195 as well as how much liquid fluid is left in the can) some fluid may travel through the dip-tube 195 into the fluid flow valve housing 220 and thus may pass through the valve arrangement 199 as has been described with respect to FIG. 5*a*. If however the end of the dip-tube 195 (that is not connected to the fluid flow valve assembly 220 and is distal to the fluid flow valve assembly 220) is not immersed in the fluid reservoir when the valve arrangement 199 is arranged in the position shown in FIG. 10*a* (as is the case with respect to the fluid dispensing device 200 illustrated in FIGS. 3*d* and 3*g*), it will be understood that no fluid will pass into the fluid flow valve housing 220 via the dip tube 195.

Figure 10B:
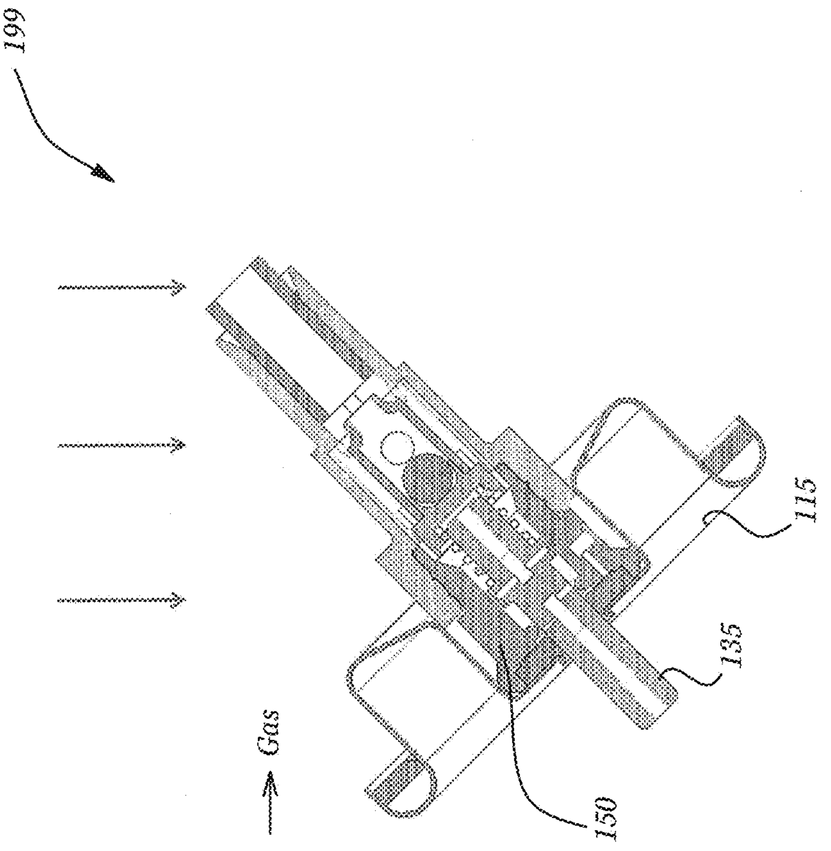
FIG. 10*b* illustrates gas behaviour in the valve arrangement when the fluid dispensing device is in the orientation shown in FIGS. 3*d* and 3*g;*

FIG. 10*b* illustrates how the propellant gas in the can headspace 130 acts when the valve arrangement 199 is arranged in the orientation shown in FIG. 10*a*. FIG. 10*b* shows the valve arrangement 199 in cross section. As shown with respect to FIGS. 3*d* and 3*g*, when the fluid dispensing device 100 is in the oblique or tilted and substantially downward facing orientation 320, 340 (relative to the upright orientation 305, 370), the liquid fluid reservoir 125 settles towards the top of the can (where the mounting cup 115 is arranged) and the headspace 130 which contains the propellant gas is arranged above the fluid reservoir 125 (as the propellant gas is less dense than the liquid fluid) towards the bottom end of the can (which from the perspective view shown in FIGS. 3*d* and 3*g* is in a substantially upward direction). The propellant gas thus provides a pressure on the fluid reservoir 125 and forces liquid fluid to flow through the valve arrangement 199 as described above with reference to FIG. 10*a*. The gas provides a substantially equal pressure on the fluid reservoir 125 across the surface of the settled liquid fluid reservoir 125. Gas however is separated from the stem valve assembly housing 150 in the orientation of the valve arrangement 199 shown in FIG. 10*b*. Thus no gas enters the stem 135 or is dispensed from the device 100 when the stem 135 is depressed (or urged towards the stem valve assembly housing 150) when the fluid dispensing device 100 is in the orientation 320, 340 shown in FIGS. 3*d* and 3*g*. Thus, in the orientation of the valve arrangement 199 shown in FIG. 10*b* no gas is dispensed when the device is actuated, only liquid is dispensed.

Figure 11:
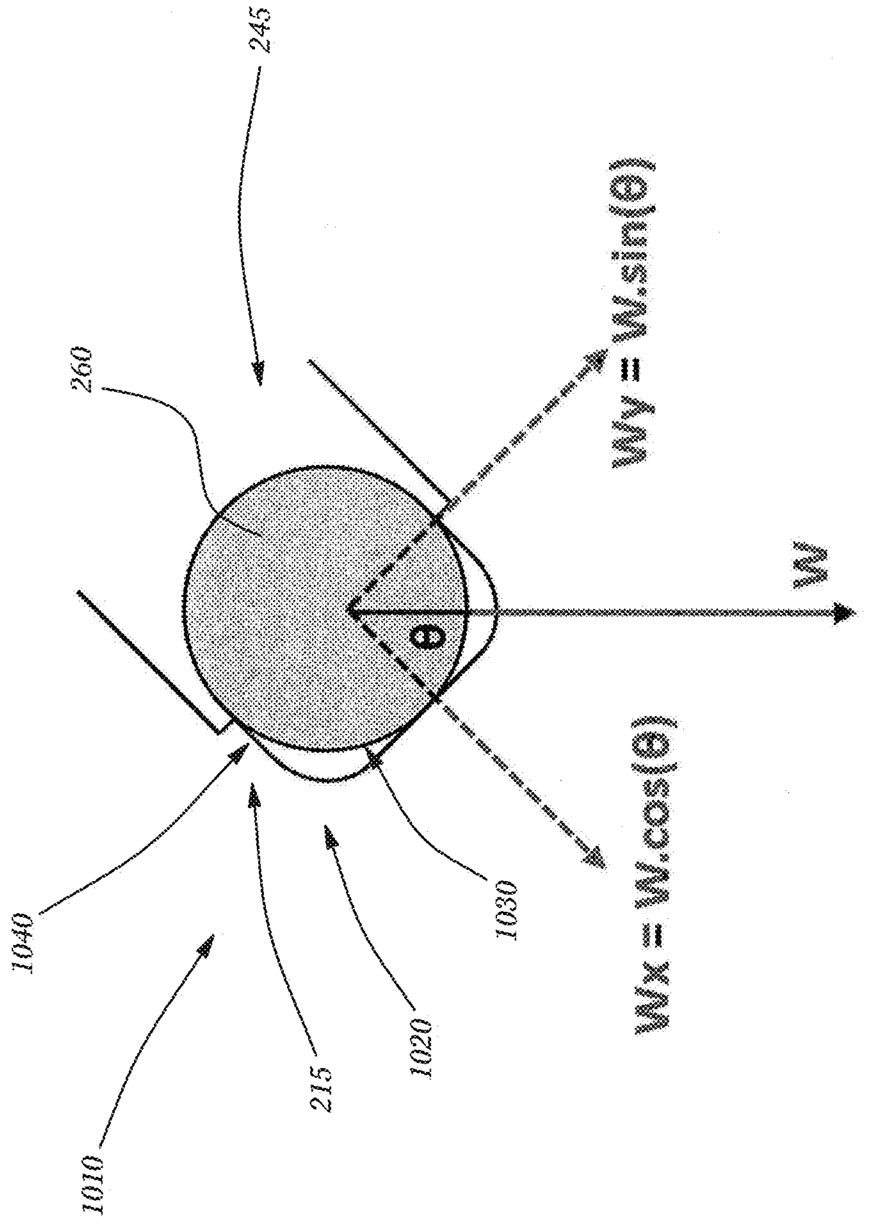
FIG. 11 illustrates a schematic view of the sealing ball when disposed against a closure element support region located in the inner chamber region.

FIG. 11 illustrates how the sealing ball 260 sits against the rear surface 1020 of the spring seat 215 when the valve arrangement 199 is arranged in the orientation shown in FIGS. 10*a* and 10*b*. FIG. 11 illustrates the sealing ball 260 and sealing ball support surface of the spring seat 215 in more detail. It will be understood that the sealing ball 260 and spring seat shown in FIG. 11 are in a position that corresponds with the orientation of the fluid dispensing device 100 shown in FIGS. 3*d*, 3*g*. FIG. 11 thus illustrates how the sealing ball 260 sits against the rear surface 1020 of the spring seat 215 when the valve arrangement 199 is arranged in the orientation shown in FIGS. 10*a* and 10*b*. As shown in FIG. 11, the sealing ball 260 sits within the annular lip 1040 of the spring seat rear surface 1020 and intrudes into the concave region 1030 of the spring seat rear surface 1020 at the further end 1010 of the inner chamber region 245. The sealing ball 260 is thus disposed distal to the inner fluid port 255 and the wall fluid ports 270. It will be appreciated that this acts to fluidly connect the inner chamber region 245 with the inner fluid port 255 (and wall fluid ports 270 should the sealing ball be sized to effectively close the wall fluid ports 270 from the inner chamber region 245 when the sealing ball is disposed against the valve seat 265).

As is illustrated in FIG. 11, in the orientation 320, 340 of the fluid dispensing device 100 shown in FIGS. 3*d* and 3*g*, the weight of the sealing ball 260 acts in a direction that is oblique with respect to the stem axis along which the stem extends in this particular orientation of the device It will be understood that the inner chamber region 245 and spring seat 215 are arranged on, and are substantially symmetrical around, this stem axis. Respective force components which act along the stem axis ($W_x$, upon which the centre of mass of the sealing ball is located when the sealing ball is arranged within the annular lip 1040 of the spring seat rear surface 1020), and act along an axis that is extends through the centre of mass of the sealing ball and is perpendicular to the stem axis ($W_y$) can thus be resolved. The force components of the weight of the sealing ball are $Wx=W\cos(\theta)$ (extending along the stem axis) and $Wy=W\sin(\theta)$ (extending perpendicular to the stem axis).

It will be understood that various orientations of the fluid dispensing device 100 impact the position of the sealing ball 260 relative to the spring seat support surface. Various force components and the associated position of the sealing ball 260 are indicted in Table 2 wherein the orientation of the fluid dispensing device 100 is such that the stem axis (along which force component $W_x$ extends) makes an angle of θ with a directly downward direction that is the direction in which the weight of the sealing ball acts by gravity. It will be appreciated that the orientations in Table 2 relate to rotating a fluid dispensing device away from an inverted orientation 325, 330 and towards an upright orientation 305, 370.

TABLE 2

| θ (°) | $W_x$ | $W_y$ | Comments |
|---|---|---|---|
| 15 | 0.97 W | 0.26 W | Wx > Wy thus the sealing ball, by gravity, sits against closure element support surface in the annular lip. |
| 30 | 0.87 W | 0.50 W | Wx > Wy thus the sealing ball, by gravity, sits against closure element support surface in the annular lip. |
| 44 | 0.72 W | 0.69 W | Wx > Wy thus the sealing ball, by gravity, sits against closure element support surface in the annular lip. |
| 45 | 0.71 W | 0.71 W | Wx = Wy thus the sealing ball will move away from the closure element support surface by falling out of the annular lip if angle θ is increased by rotating the fluid dispensing arrangement towards the upright position. |
| 46 to 90 | 0.69 W | 0.72 W | Wx < Wy thus the sealing ball moves away from the closure element support surface and falls out of the annular lip. |

Force components relating to the weight of the sealing ball 260 and comments regarding the position of the sealing ball 260 relative to the sealing ball support region at a variety of orientations of a fluid dispensing device 100 where a stem axis of the fluid dispensing device 100 makes an angle θ with a downward direction in which the weight of the sealing ball 260 is directed.

As can be seen from Table 2, when the fluid dispensing device 100 is rotated at an angle of around 45 degrees from an inverted orientation the fluid dispensing device 100 reaches a threshold position at which point any further rotation of the fluid dispensing device from the inverted orientation 325 330 towards the upright position 305, 370 will act to move the sealing ball 260 away from the closure element support surface so that the sealing ball falls out of the annular lip 1040 if the spring seat 215.

Figure 12A:
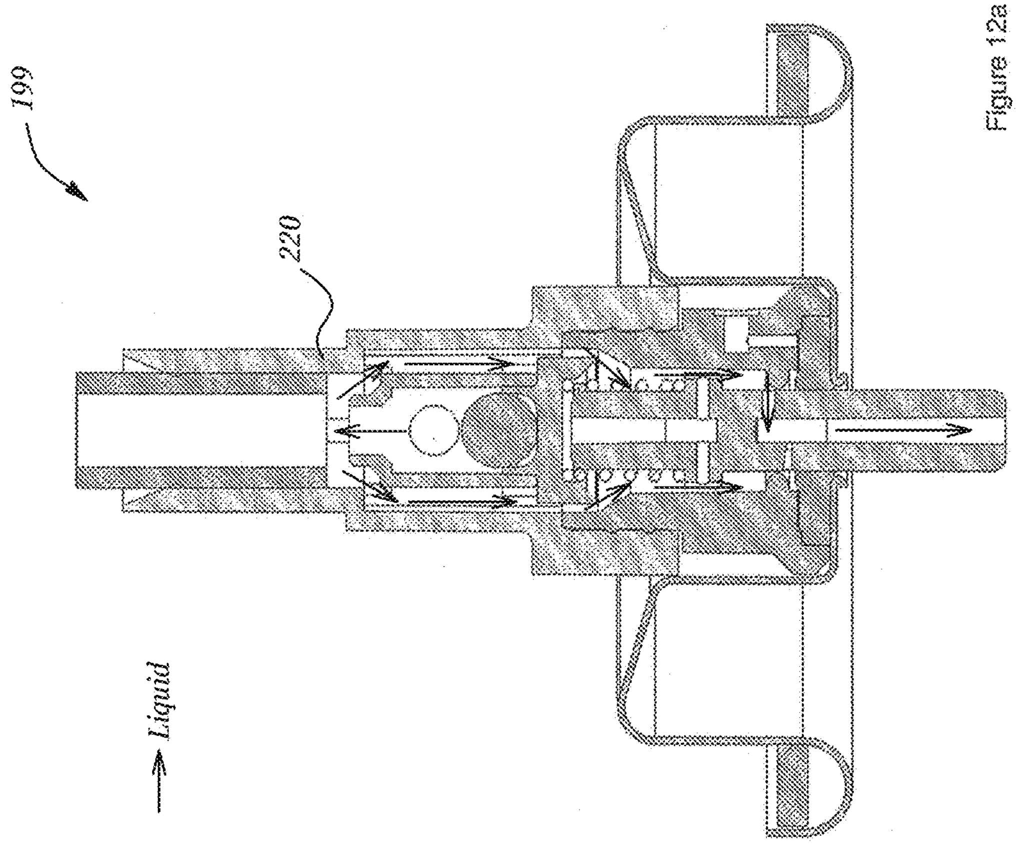
FIG. 12*a* illustrates liquid fluid flow through the valve arrangement when the fluid dispensing device is in the orientation shown in FIGS. 3*e* and 3*f;*

FIG. 12*a* illustrates the valve arrangement 199 of FIG. 2 in cross section when the fluid dispensing device 100 of FIG. 1 is arranged in an inverted orientation 325, 330. It will be understood that the inverted position is shown in FIGS. 3*e* and 3*f*. In particular, FIG. 12*a* illustrates fluid flow through the valve arrangement 199 when the fluid dispensing device 100 is arranged in an inverted orientation 325, 330. The arrows in FIG. 12*a* indicate how fluid flow occurs through the valve arrangement 199. As can be seen in FIG. 12*a*, liquid fluid flow through the valve arrangement 199 in the inverted orientation shown is substantially the same as liquid flow described with respect to FIG. 10*a*.

It is noted that, in the inverted orientation 325, 330 the dip-tube 195 is arranged outside of the fluid reservoir 125 and in the headspace 135. This can be seen in FIGS. 3*e* and 3*f*. Thus, no liquid fluid flows through the dip-tube 195 and into the fluid flow valve assembly 199.

Figure 12B:
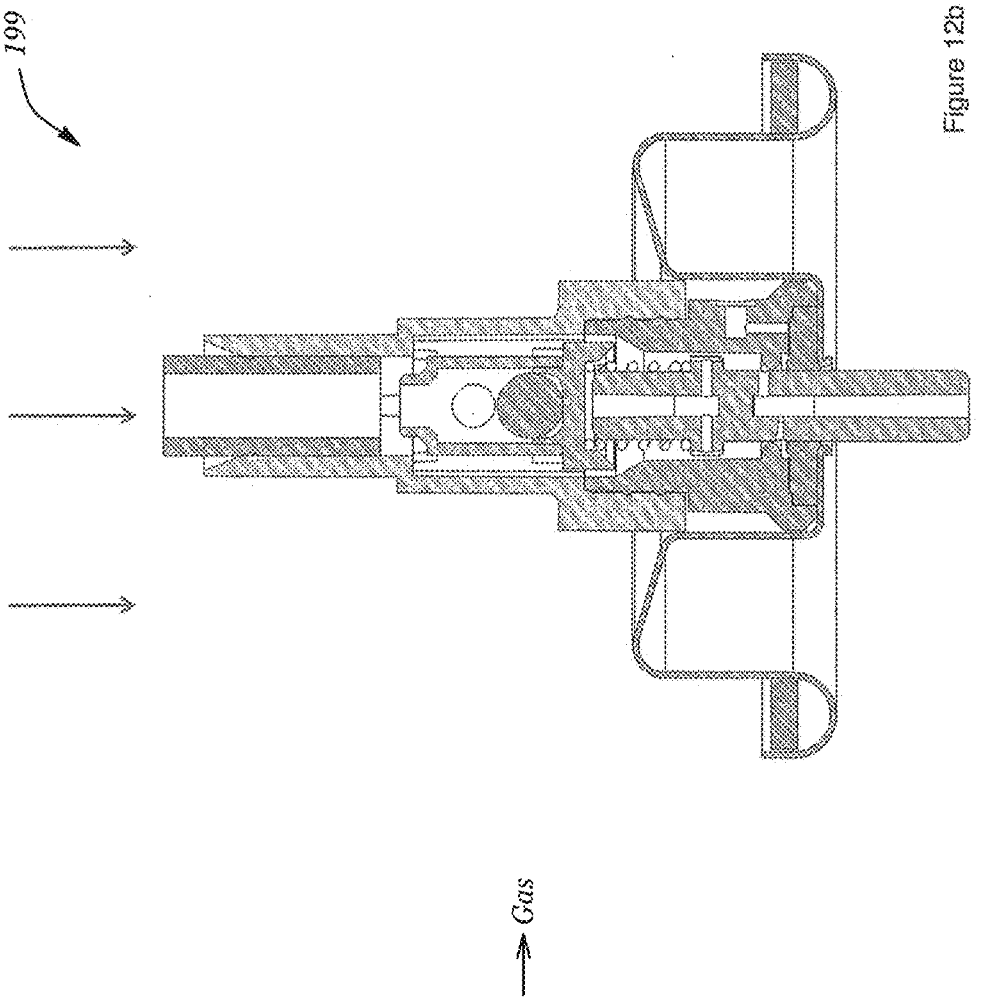
FIG. 12*b* illustrates gas behaviour in the valve arrangement when the fluid dispensing device is in the orientation shown in FIGS. 3*e* and 3*f;*

FIG. 12*b* illustrates propellant gas behaviour when the fluid dispensing device 100 is arranged in the inverted orientation 325, 330 as shown in FIGS. 3*e* and 3*f*. FIG. 12*b* illustrates the valve arrangement 199 in cross section in the position shown in FIG. 12*a*. As is shown in FIG. 12*b*, the propellant gas behaves in substantially the same manner as is described with respect to FIG. 10*b*.

Figure 13:
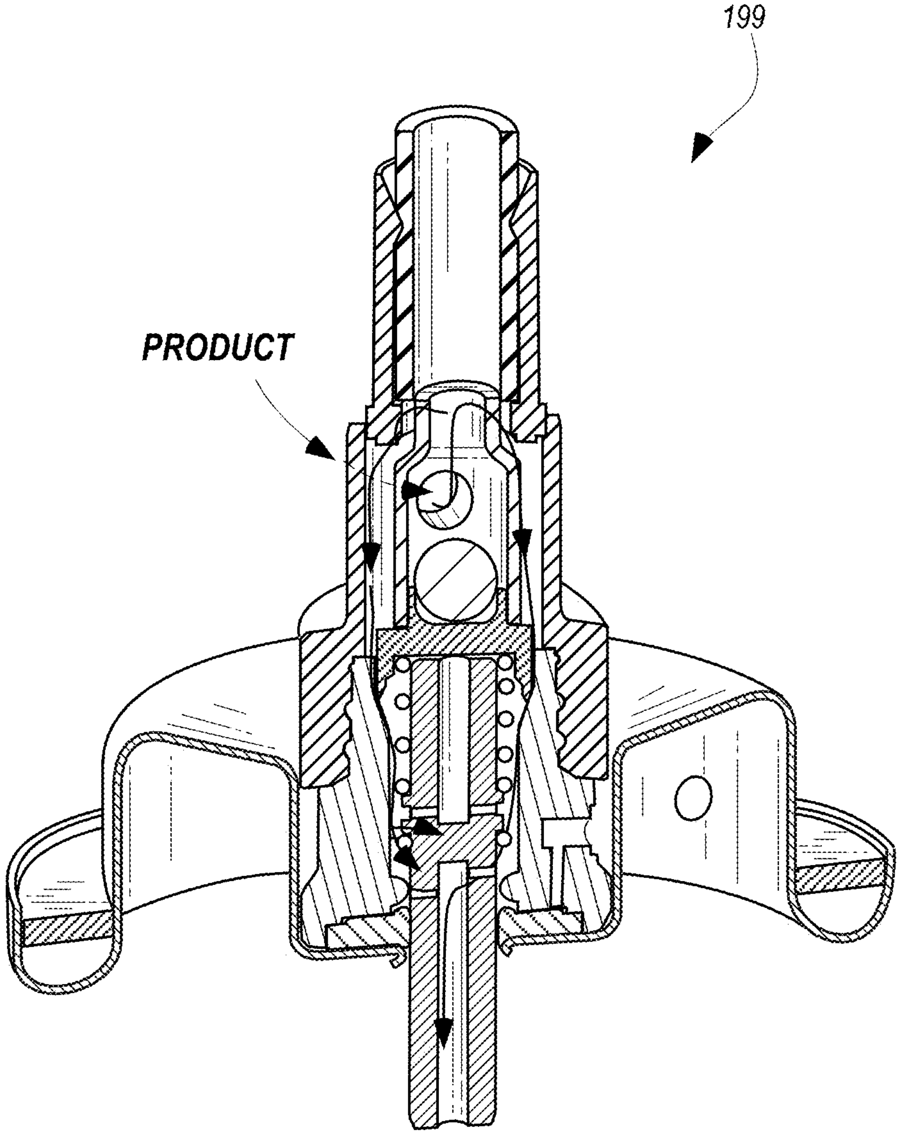
FIG. 13 illustrates a different perspective cross sectional view of the valve arrangement in an inverted orientation.

FIG. 13 illustrates a different perspective partial section view of the valve arrangement 199 of FIG. 2 when the fluid dispensing device of FIG. 1 is in an inverted orientation 325, 330. The arrows in FIG. 13 help illustrate liquid fluid flow through the valve arrangement 199 when the fluid dispensing device 100 is in the inverted orientation.

It will be appreciated that the can may have an inner pressure of 8.0 bar or 4.0 bar or 2.0 bar, for example. It will be understood that the pressure, when the can (or fluid dispensing device) is inverted is operating on all regions of the surface of the fluid reservoir equally including any residual liquid in the dip-tube, the liquid in the can breast and the liquid in the wall fluid ports until the stem urged into an open position and a pressure drop occurs. Thus, this pressure allows liquid which ingresses into the inner chamber region via the wall fluid ports (when the fluid dispensing device is in an inverted orientation) to effectively travel upwards against gravity to pass through the inner fluid port and reach the fluid communication pathways.

It will be appreciated that fluid flow through the valve arrangement in an upright orientation, that is a first orientation, corresponds to a first mode of operation of the valve arrangement. It will be appreciated that fluid flow through the valve arrangement in an inverted orientation, that is a further orientation, corresponds to a further mode of operation of the valve arrangement.

Figure 14A:
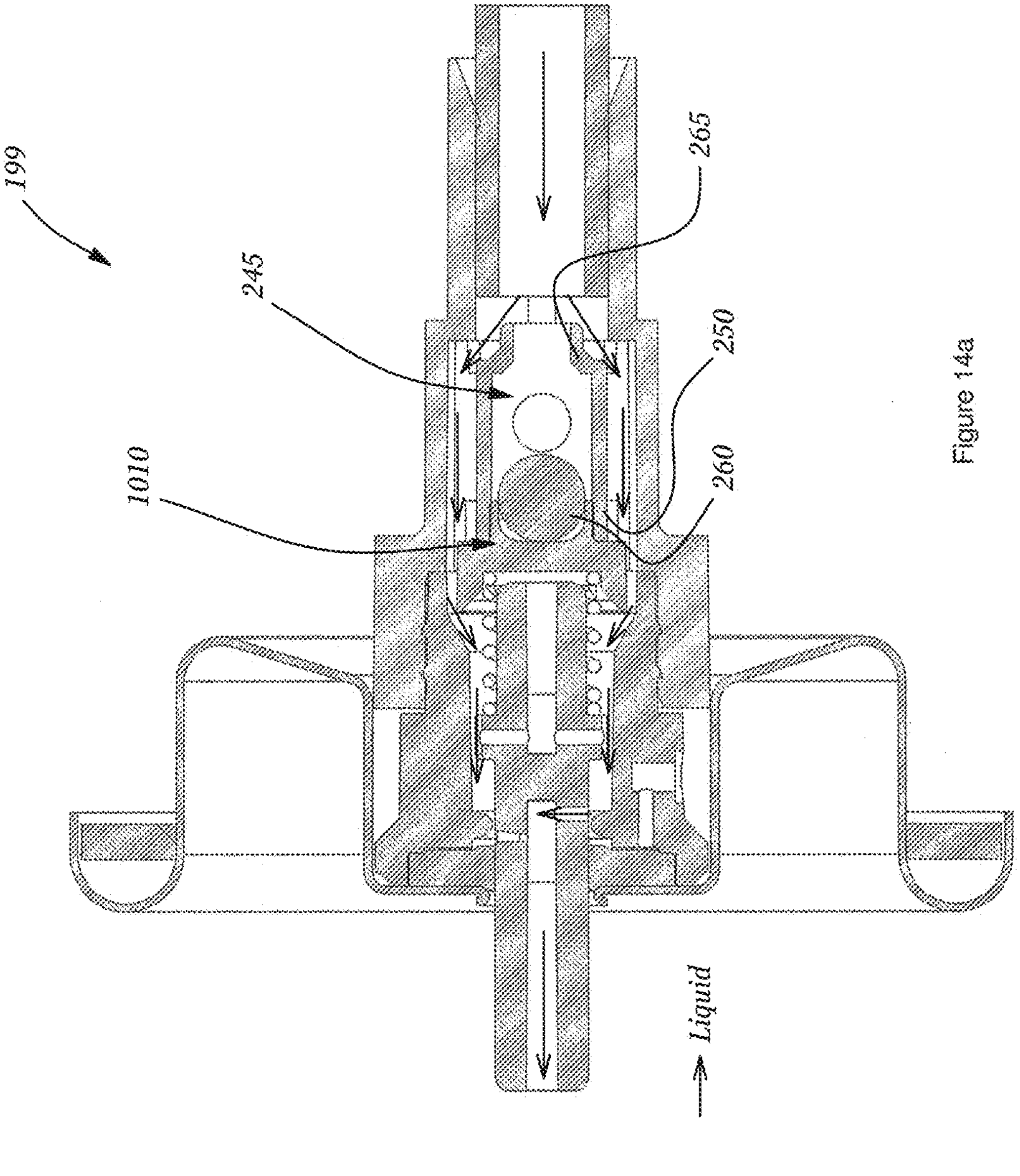
FIG. 14*a* illustrates liquid fluid flow through the valve arrangement when the fluid dispensing device is in the orientation shown in FIG. 3*h;*

FIG. 14*a* illustrates the valve arrangement 199 of FIG. 2 in cross section when the fluid dispensing device 100 of FIG. 1 is in the substantially sideways or lateral orientation 350 shown in FIG. 3*h* . . . . In particular, FIG. 10*a* illustrates how liquid fluid flow occurs through the valve arrangement 199 when the fluid dispending device 100 is in the sideways orientation 350 of FIG. 3*h*. The arrows in FIG. 14*a* illustrate fluid flow. It will be appreciated that the orientation of the valve arrangement 199 shown in FIG. 14*a* is substantially the same as the orientation shown in FIGS. 9*a* and 9*b* however, the sealing ball 260 in the arrangement shown in FIG. 14*a* is different position that in the orientation shown in FIGS. 9*a* and 9*b*. As is shown in FIG. 14*a*, instead of being located proximate to the valve seat 265 the sealing ball 260 is located at the further end 1010 of the inner chamber region 245 against the closure element support surface. It will be understood that the sealing ball 260 may alternatively fall out of the annular lip 1040 and be disposed against a lower portion of inner wall 250. This may depend on the pressure incident on the sealing ball and may depend on the weight of the sealing ball or the buoyancy of the sealing ball and the like. This may also depend on the amount of fluid and/or gas located in the inner chamber region 245. It will be understood that the sideways orientation of FIG. 14*a* occurs when the fluid dispensing device 100 is tilted from the inverted orientation 325, 330 towards the upright orientation 305, 370 by 90 degrees.

FIG. 14*a* illustrates how liquid fluid flow occurs through the valve arrangement 199. The arrows in FIG. 14*a* illustrate liquid fluid flow through the valve arrangement. It will be understood that liquid fluid flow through the valve arrangement 199 in the orientation shown in FIG. 14*a* is substantially the same as is described with respect to FIG. 5*a*.

Figure 14B:
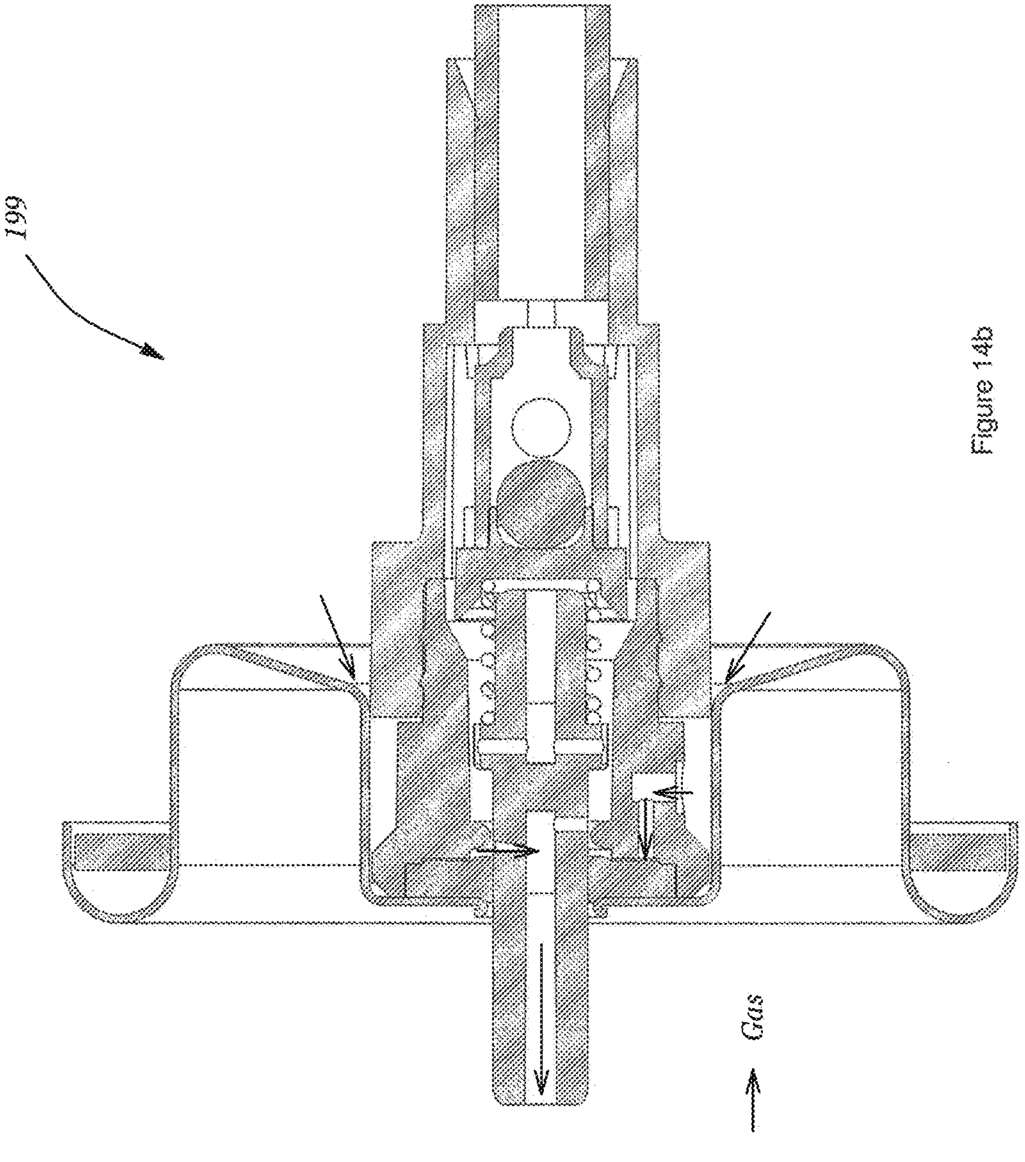
FIG. 14*b* illustrates gas flow through the valve arrangement when the fluid dispensing device is in the orientation shown in FIG. 3*h;*

FIG. 14*b* illustrates how gas flow occurs through the valve arrangement 199 of FIG. 2 in the sideways orientation shown in FIG. 14*a*. The valve arrangement is shown in cross section in FIG. 14*b*. The arrows in FIG. 14*b* illustrate gas flow through the valve arrangement 199. It will be understood that gas flow through the valve arrangement 199 in the orientation shown in FIG. 14*a* is substantially the same as described with respect to FIG. 5*a*.

Figure 15C:
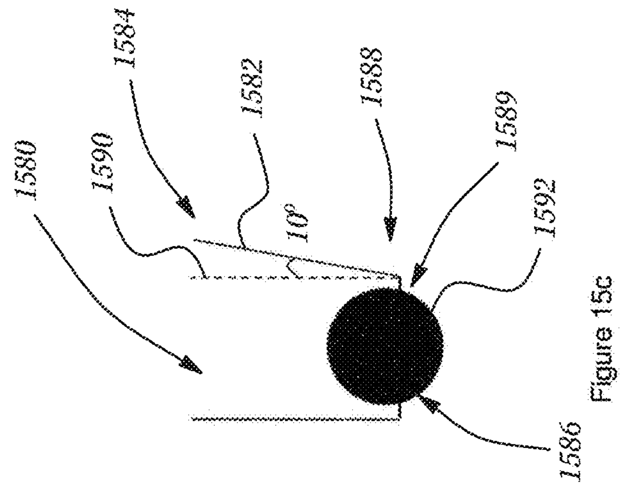
FIG. 15*c* illustrates a schematic view of a further alternative inner chamber region which includes a sloped wall region.
Figure 15B:
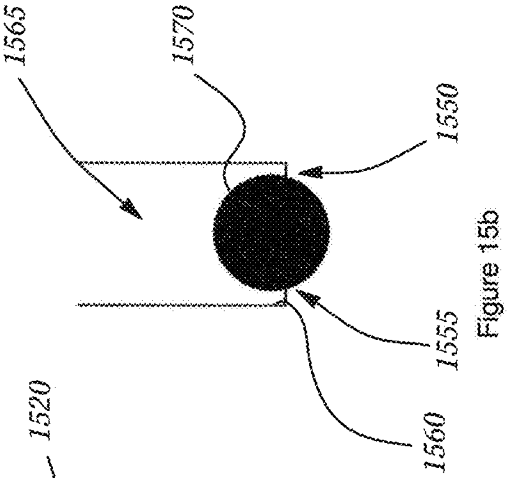
FIG. 15*b* illustrates a schematic view of an alternative valve seat region.
Figure 15A:
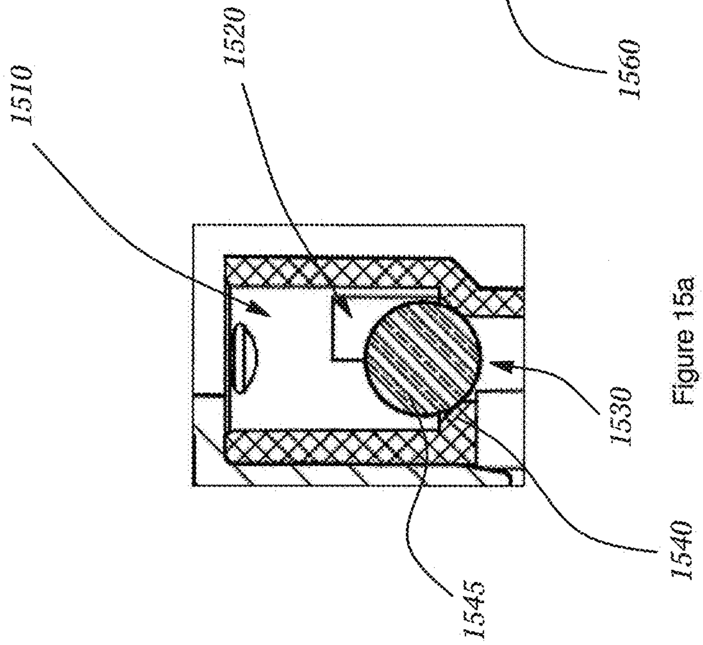
FIG. 15*a* illustrates an alternative inner chamber region.

FIG. 15*a* illustrates an alternative inner chamber region 1510 in cross section that may be utilised in the valve arrangement 199 of FIG. 2 of the fluid dispensing device 100 of FIG. 1. As is shown in FIG. 15*a*, the alternative inner chamber region 1510 includes a wall side port 1520 with a substantially rectangular cross section and an inner fluid port 1530 (and valve seat 540 in which a sealing ball 1545 can sit) that is off-centre with respect to the inner chamber region 1510.

FIG. 15*b* illustrates a schematic view of an alternative valve seat 1550 that may be utilised in the valve arrangement 199 of FIG. 2 of the fluid dispensing device 100 of FIG. 1. As shown in FIG. 15*b*, the valve seat 1550 does not include an abutment surface that is oblique to a stem axis. Instead, the valve seat 1550 includes a through hole 1555 through a substantially square bottom wall 160 of an inner chamber region 1565 that is sized to be slightly smaller than a diameter of a sealing ball 1570 that can sit within the hole 1555. It will be understood that the hole 1555 though the bottom wall 1560 of the inner chamber region 1565 is an inner fluid port. Thus, when the sealing ball 1570 is disposed in a sealing position against the valve seat 1550, the sealing ball 1570 sits in the hole 1555 and blocks fluid flow through the inner fluid port.

FIG. 15*c* illustrates schematic view of an alternative inner chamber region that may be utilised in the valve arrangement 199 of FIG. 2 of the fluid dispensing device 100 of FIG. 1. As is shown in FIG. 15*c*, an inner wall region 1582, or a portion of an inner wall, of the inner chamber region 1580 is oblique with respect to the major axis associated with the inner chamber region 1580. Thus, this inner wall region 1582, that is a slanted wall region, is oblique with respect to a respective stem axis in a valve assembly. As shown in FIG. 15*c*, the slanted wall region 1582 is flared out towards an upper end 1584 of the inner chamber region 1580 (distal to an inner fluid port 1586 in a bottom end of the inner chamber region) so that the inner chamber region 1580 is narrower towards an end 1588 of the inner chamber region 1580 that includes the inner fluid port 1586 (and a valve seat 1589), and widens towards the upper end 1584 of the inner chamber region 1584. The slanted wall region 1582 shown in FIG. 15*c* is oblique to an axis 1590 that is parallel with the stem axis and that touches the innermost part of the slanted wall region 1582 (at the lowest end of the slanted wall region) so that the slanted wall region 1582 makes an angle of 10 degrees with the axis 1590. Alternatively, any angle between 0 and 10 degrees could be utilised. It will be understood that such a slanted wall region 1582 results in a sealing ball 1592 rolling towards the upper end 1584 of the inner chamber region 1580 when a fluid dispensing device is tilted at an angle that is less than 90 degrees from the upright orientation. Although FIG. 15 illustrates the valve seat 1586 of FIG. 15*b* being utilised alongside the slanted wall region 1582, it will be appreciated that a slanted wall region could be utilised in the inner chamber region 245 of the valve arrangement 199 shown in FIGS. 1 to 14.

Figure 16:
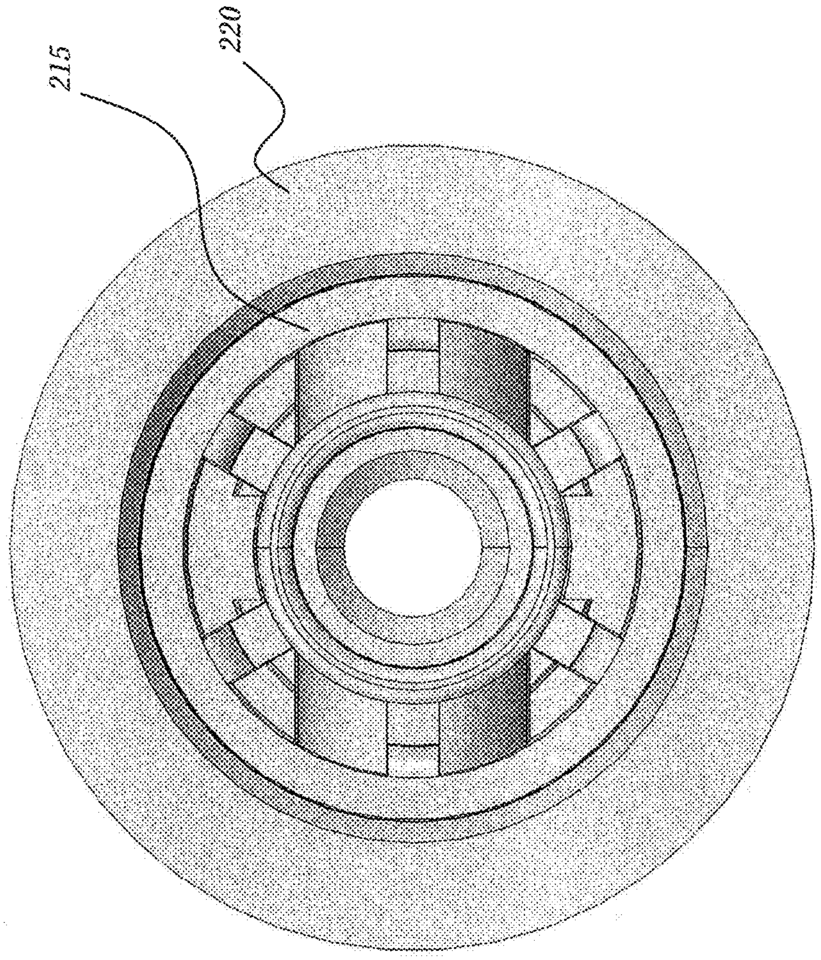
FIG. 16 illustrates a top-down perspective view of a spring seat and fluid flow valve housing of the valve arrangement.

FIG. 16 illustrates a top-down perspective view of the fluid flow valve housing 220 and the spring seat 215 of the valve arrangement 199 of FIG. 2. FIG. 16 helps illustrate how the spring seat is mounted in the fluid flow valve housing 220.

Figure 17:
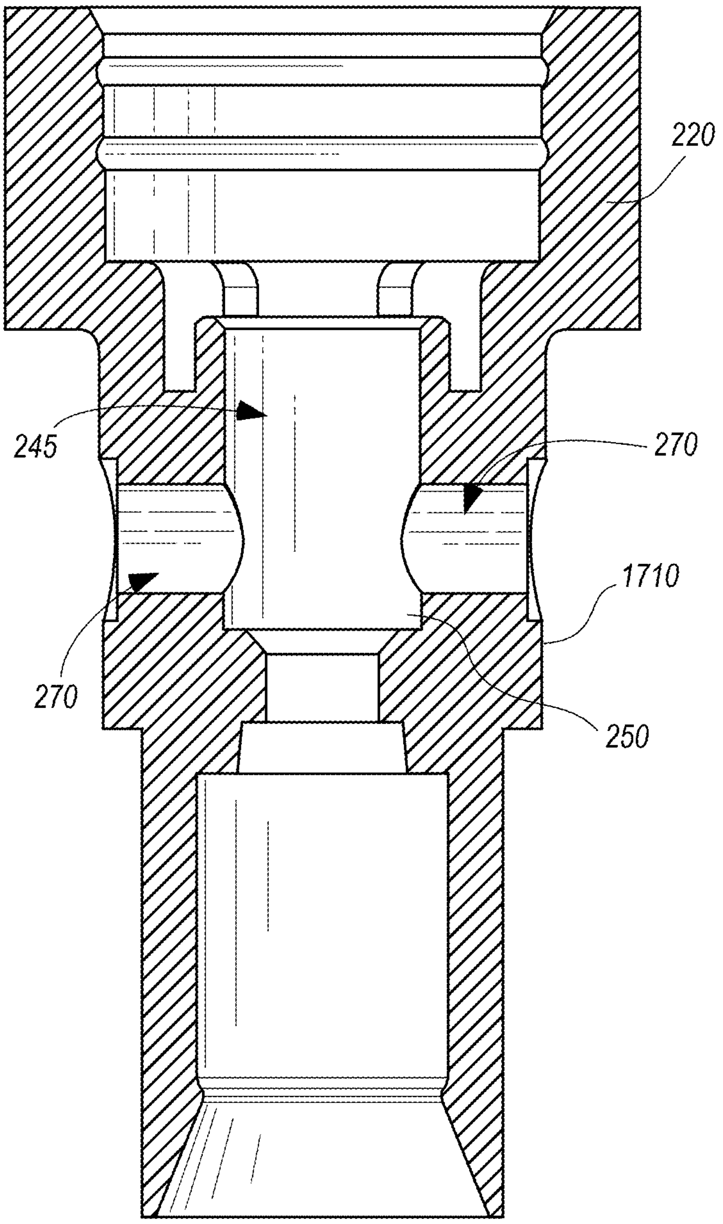
FIG. 17 illustrates a side-on perspective cross sectional view of the fluid flow valve housing.

FIG. 17 illustrates a side-on perspective view of the fluid flow valve housing 220 of the valve arrangement 199 of FIG. 2 in cross section. FIG. 17 helps illustrate how the wall side ports 270 extend wholly through a portion of the fluid flow valve housing 220 from (and through) the inner surface 250, that at least partly boundaries the inner chamber region 245 to (and through) an outer surface 1710 if the fluid flow valve housing 220. FIG. 17 also indicates how the fluid communication passageways 290 do not intersect the wall side ports 270. FIG. 17 helps illustrate how the two wall fluid ports 270 are each arranged at substantially opposite sides of the fluid flow valve housing 220.

Figure 18:
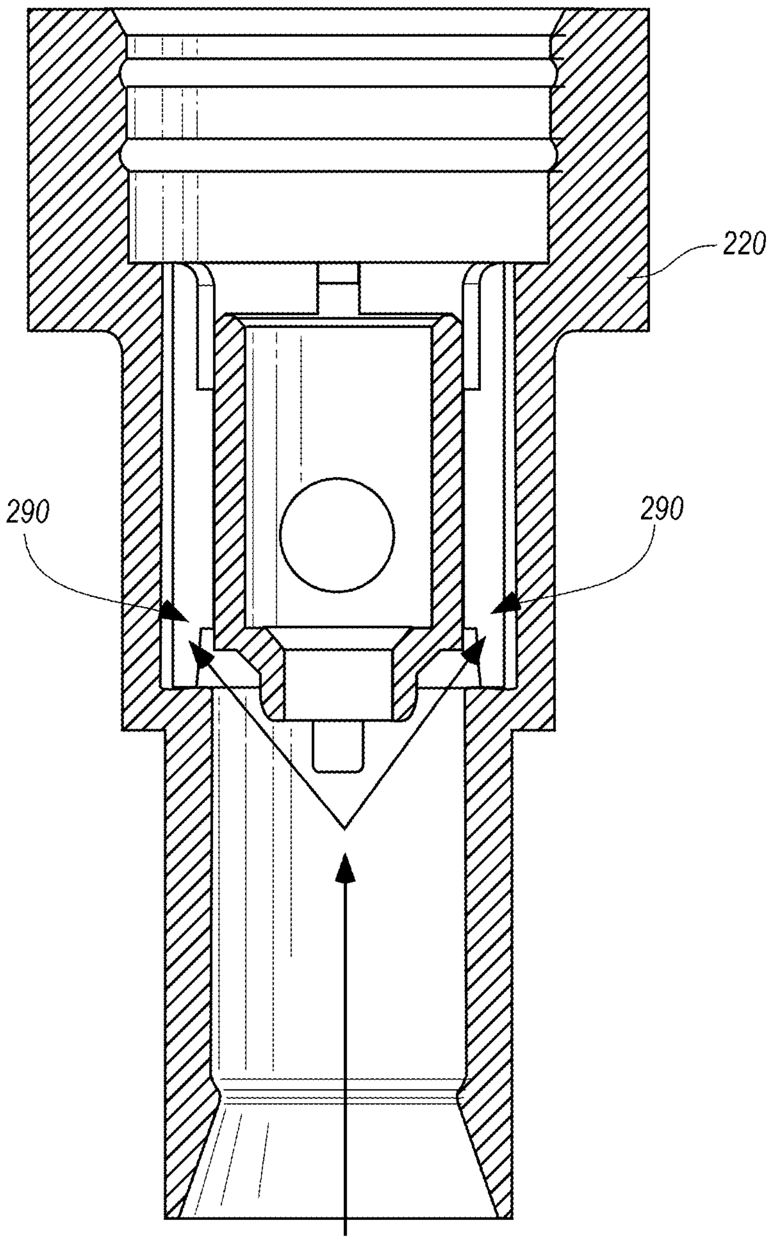
FIG. 18 illustrates a different side-on perspective cross sectional view of the fluid flow valve housing.

FIG. 18 illustrates a different perspective view of the fluid flow valve housing 220 of the valve arrangement 199 of FIG. 2 in cross section. It will be appreciated that the perspective view shown in FIG. 18 is a 45 degree rotation (about a major axis of the fluid flow valve housing that corresponds with the primary stem axis 140 shown in FIG. 1) of the fluid flow valve housing 220 relative to the perspective view of FIG. 17. FIG. 18 helps illustrate how the two fluid communication passageways 290 are arranged at substantially opposite sides of the fluid flow valve housing 220. The arrows in FIG. 18 illustrate how liquid fluid flow occurs through the fluid flow valve 220 housing when the fluid dispensing device 100 is in a substantially upright orientation 305, 370.

Figure 19:
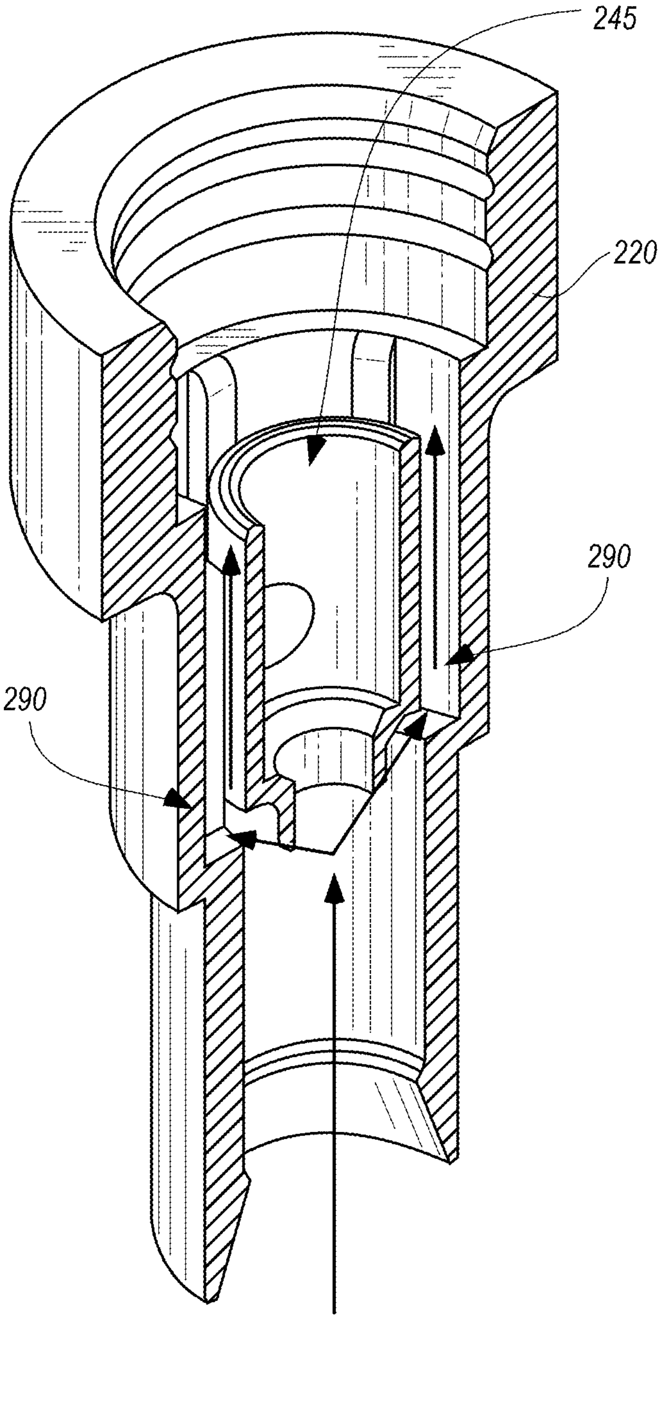
FIG. 19 illustrates a different perspective cross sectional view of the fluid flow valve housing.

FIG. 19 illustrates a still further perspective view of the fluid flow valve housing 220 of the valve arrangement 199 of FIG. 2. FIG. 19 helps illustrate how the fluid communication passageways 290 extends through the housing 220 and are radially outside of the inner chamber region 245. The arrows in FIG. 19 illustrate how liquid fluid flow occurs through the fluid flow valve housing 220 when the fluid dispensing device 100 is in a substantially upright orientation 305, 370.

Figure 20:
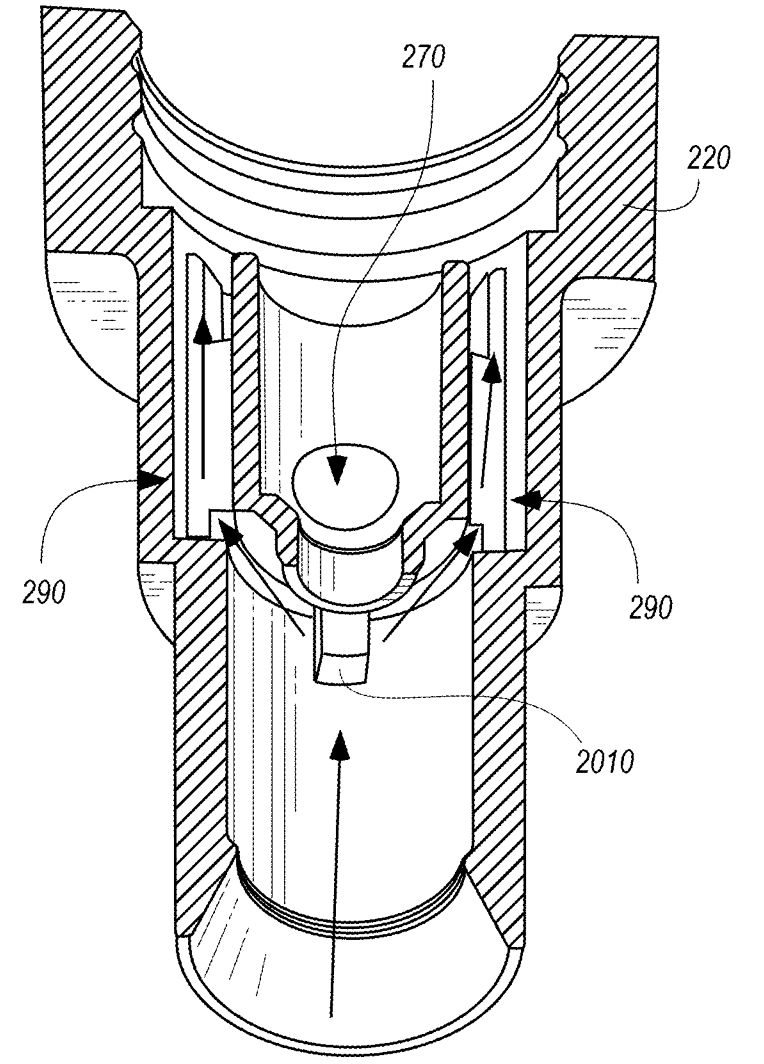
FIG. 20 illustrates a different perspective cross sectional view of the fluid flow valve housing.

FIG. 20 illustrates another perspective view of the fluid flow valve housing 220 of the valve arrangement 199 of FIG. 2. FIG. 20 illustrates how the fluid communication passageways 290 extend around respective wall port blocks 2010 that are solid parts of the fluid flow valve housing 220 through which the respective wall fluid ports 270 extend. The arrows in FIG. 20 illustrate how liquid fluid flow occurs through the fluid flow valve housing 220 when the fluid dispensing device 100 is in a substantially upright orientation 305, 370.

Figure 21:
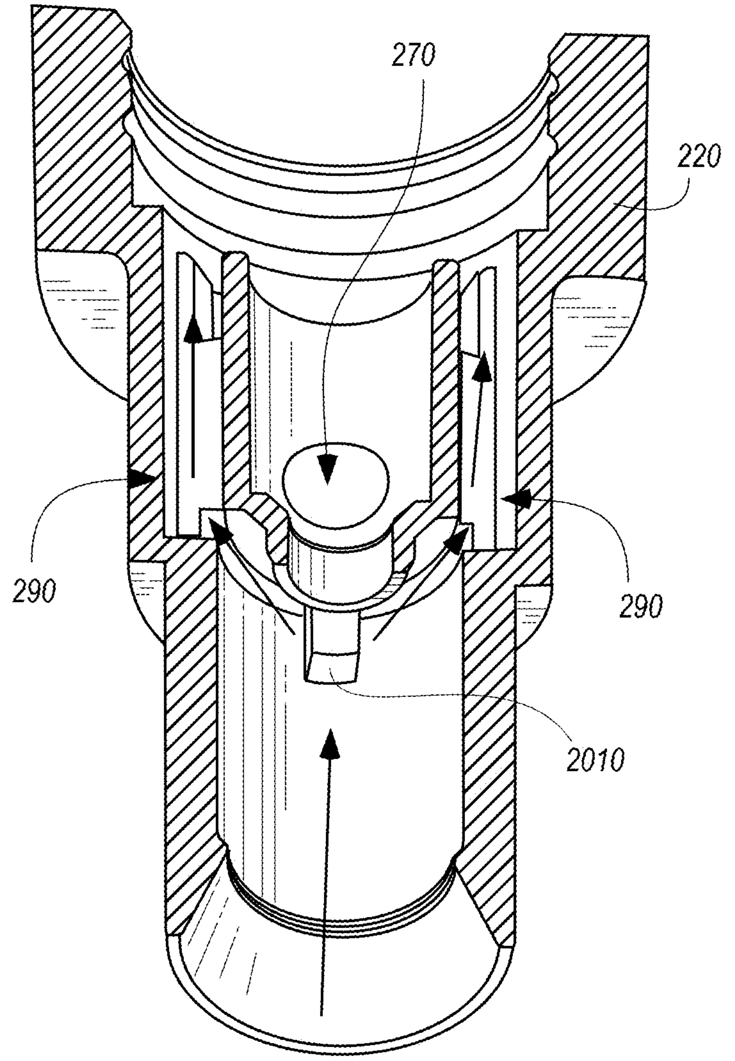
FIG. 21 illustrates a different perspective cross sectional view of the fluid flow valve housing.

FIG. 21 illustrates a different perspective view of the fluid flow valve housing 220 of the valve arrangement 199 of FIG. 2. FIG. 21 illustrates how the fluid communication passageways 290 extend around respective wall port blocks 2010 that are solid parts of the fluid flow valve housing 110 through which the respective wall fluid ports extend 270. The arrows in FIG. 21 illustrate how liquid fluid flow occurs through the fluid flow valve housing 220 when the fluid dispensing device 100 is in a substantially upright orientation 305, 370.

Figure 22:
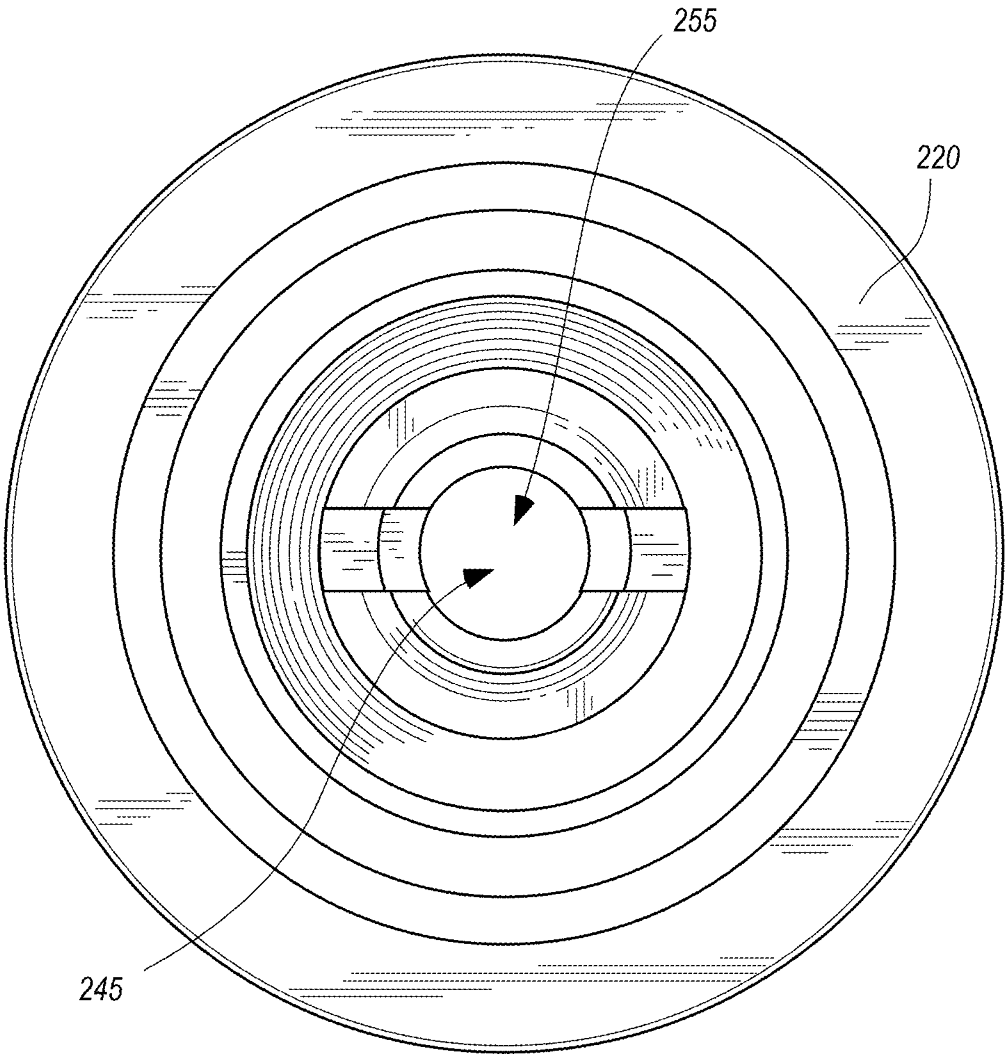
FIG. 22 illustrates a perspective bottom-up view of the fluid flow valve housing.

FIG. 22 illustrates a bottom-up perspective view of the fluid flow valve housing 220 of the valve arrangement 199 of FIG. 2. FIG. 22 helps illustrate how the inner fluid port 255 is arranged at the first end, that is a bottom end, of the inner chamber region 245.

Figure 23:
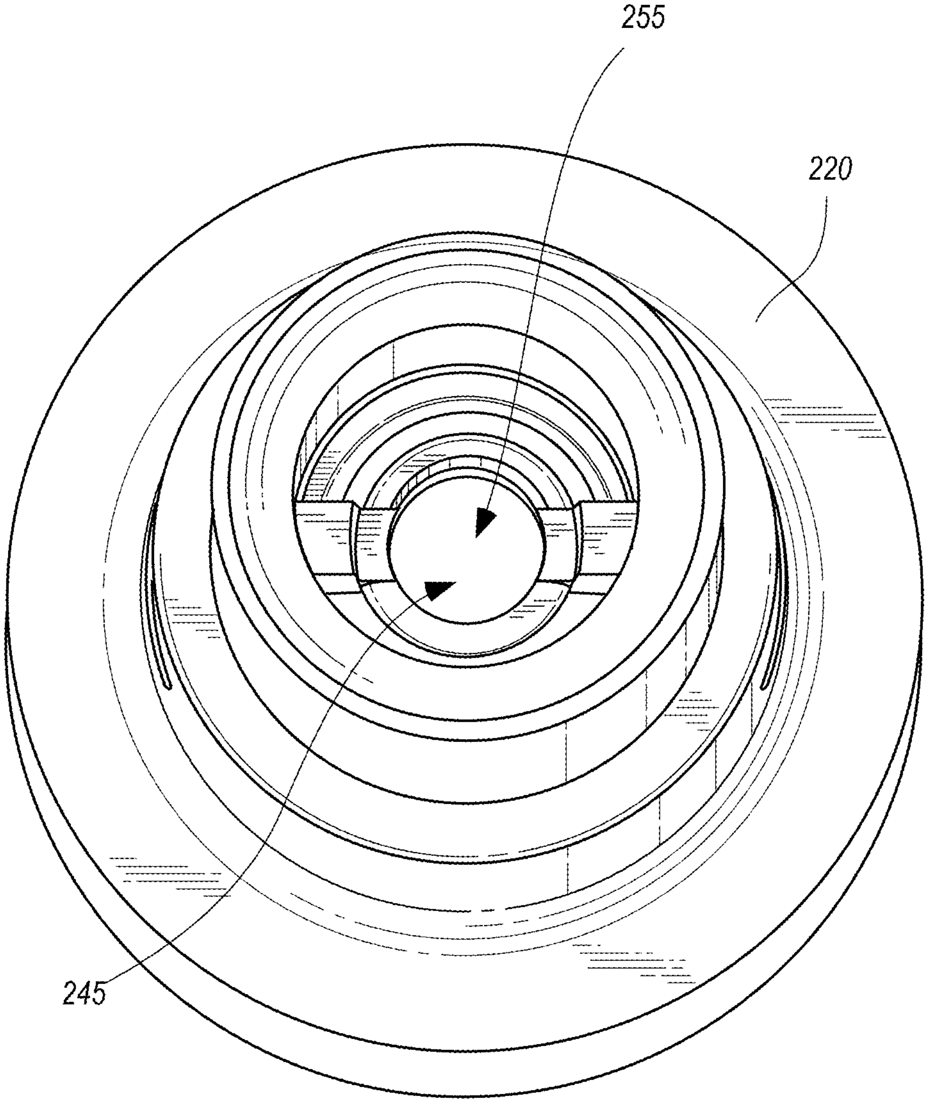
FIG. 23 illustrates a different perspective substantially bottom-up view of the fluid flow valve housing.

FIG. 23 illustrates a different bottom-up perspective view of the fluid flow valve housing 220 of the valve arrangement 199 of FIG. 2. FIG. 23 helps illustrate how the inner fluid port 255 is arranged at the first end, that is a bottom end, of the inner chamber region 245.

Figure 24:
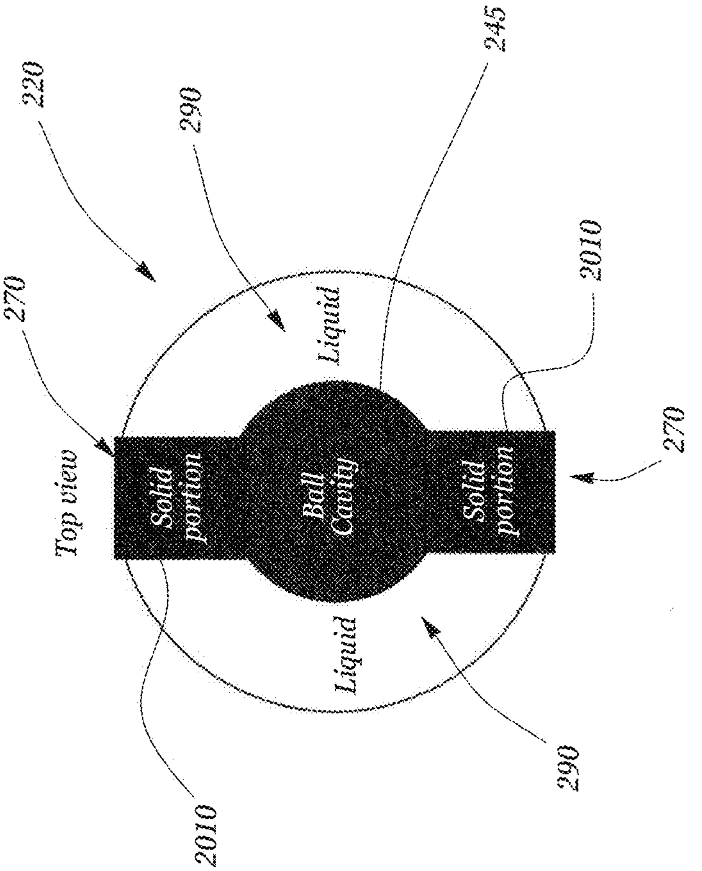
FIG. 24 illustrates a schematic top-down view of how fluid communication pathways and wall fluid ports are arranged in the fluid flow valve housing.

FIG. 24 illustrates a schematic top-down view of the two fluid communication passageways 290, the inner chamber region 245 and the two wall ports 270 that are disposed in the fluid flow valve housing 220. FIG. 24 helps illustrates how the two fluid communication passageways 290 are arranged at substantially opposite sides of the fluid flow valve housing 220 and are generally arcuate in cross section. FIG. 24 also helps illustrate how the two fluid flow passageways 290 are not disposed on the same sides of the fluid flow valve housing 220 as the wall fluid ports 270. The fluid flow passageways thus do not intersect the wall fluid ports 270. The two wall fluid ports 270 are instead disposed in respective wall fluid port blocks 2010 that are each arranged on substantially opposite sides of the fluid flow valve housing 220.

Figure 25C:
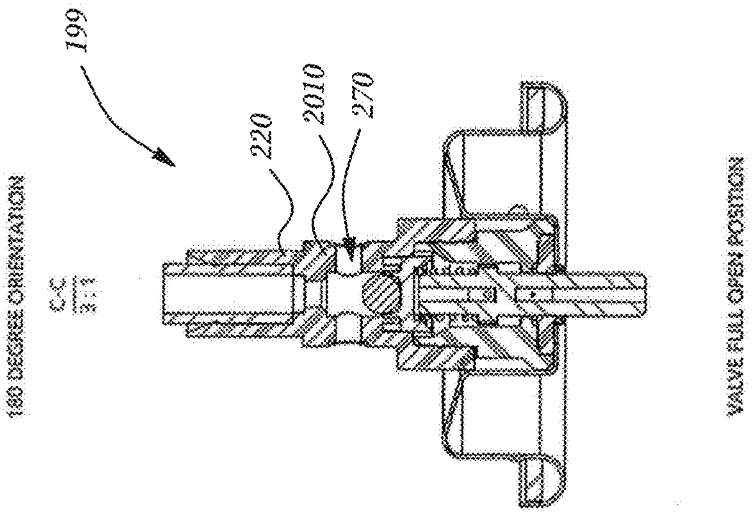
FIG. 25*c* illustrates a cross sectional view of the valve arrangement in an open position and in an inverted orientation.
Figure 25B:
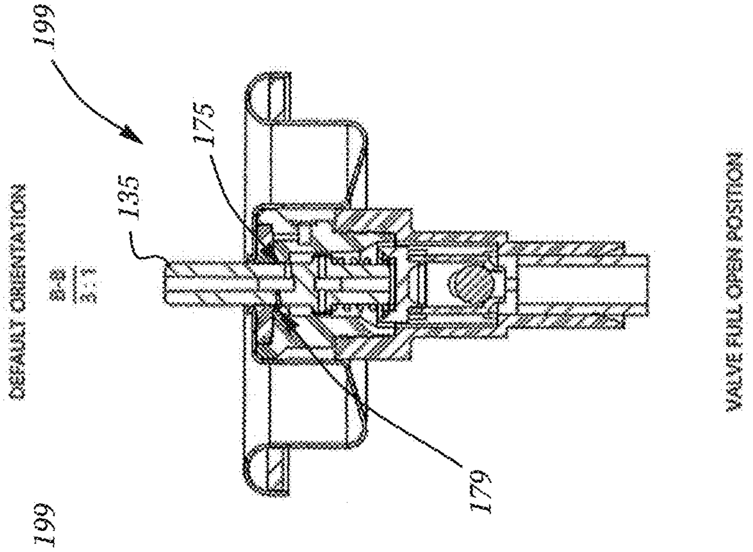
FIG. 25*b* illustrates a cross sectional view of the valve arrangement in an open position and in an upright orientation.
Figure 25A:
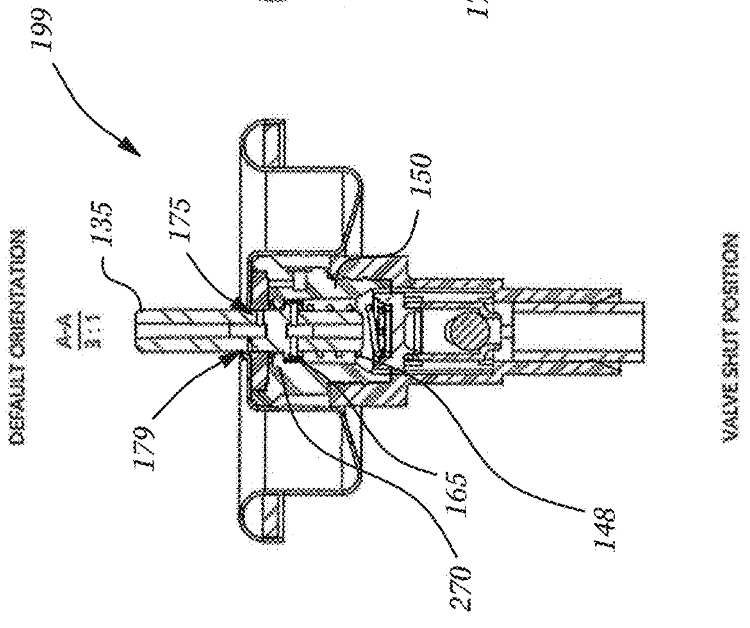
FIG. 25*a* illustrates a cross sectional view of the valve arrangement in a closed position and in an upright orientation.

FIG. 25*a* illustrates a schematic view of the valve arrangement 199 of FIG. 2 in cross section that is in a substantially upright orientation. It will be understood that the valve arrangement 199 illustrated in FIG. 25*a* is in a closed configuration. That is to say the stem 135 is biased upwards by the spring 148 so that the stem shoulder 165 abuts against the inner lip 270 of the stem valve assembly housing 150. FIG. 25*a* helps illustrate how the stem fluid inlet 175 and the stem gas inlet 179 are fluidly disconnected from the fluid flow path and gas flow path respectively when the stem 135 is in a closed configuration.

FIG. 25*b* illustrates a schematic view in cross section of the valve arrangement 199 of FIG. 2 in an upright position and in an open configuration. It will be understood that an external force has urged the stem 135 downwards. FIG. 25*b* helps illustrate how the stem fluid inlet 175 and stem gas inlet 179 are fluidly connected to the fluid flow path and gas flow path respectively when the stem is in the open configuration.

FIG. 25*c* illustrates a schematic view of the valve arrangement 199 of FIG. 2 in cross section in an inverted orientation. It will be understood that, as well as being inverted, the perspective view of FIG. 25*c* is a 45 degree rotation about the primary stem axis 140 shown in FIG. 1 relative to the perspective view shown in FIG. 25*b*. FIG. 25*c* helps illustrate how the two wall fluid flow ports 270 extends through valve blocks 2010 that are disposed on opposite sides of the fluid flow valve housing 220.

Figure 26B:
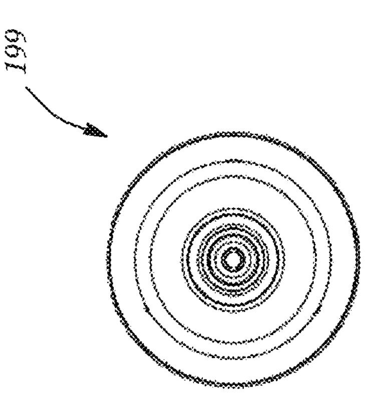
FIG. 26*b* illustrates a top-down perspective view of the valve arrangement.
Figure 26C:
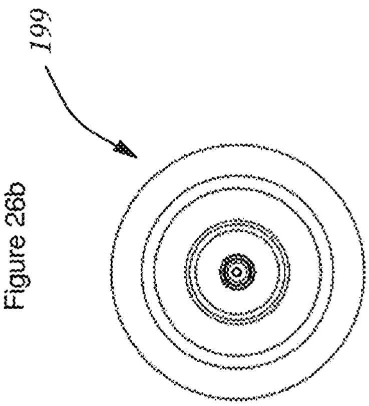
FIG. 26*c* illustrates a bottom-up perspective view of the valve arrangement.
Figure 26A:
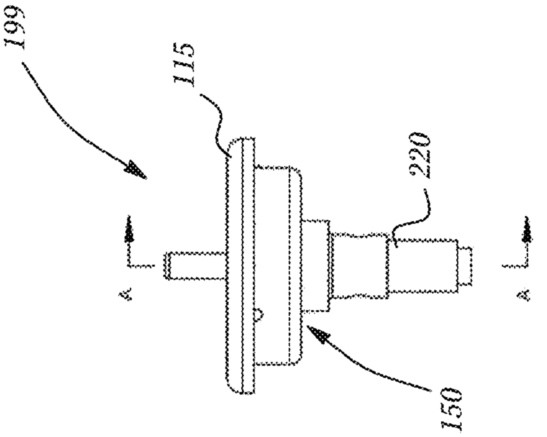
FIG. 26*a* illustrates a side-on perspective view of the valve arrangement.

FIG. 26*a* illustrates a perspective view of the assembled valve arrangement 199 of FIG. 2. FIG. 26*a* helps illustrate how the fluid flow valve housing 220 is connected below a stem valve assembly housing 150 around which a mounting cup 115 is arranged.

FIG. 26*b* illustrates a top-down perspective view of the valve arrangement 199 of FIG. 2.

FIG. 26*c* illustrates a bottom-up perspective view of the valve arrangement 199 of FIG. 2.

FIG. 26*a* illustrates a top-down perspective view of the spring seat 215 of the valve arrangement 199 of FIG. 2. FIG. 26*a* helps illustrate how the spring seat 215 includes a spring cavity 2710 in which the spring 148 is arranged. A number of spring support elements 2720 help support the spring in the correct position.

FIG. 26*b* illustrates a side-on perspective view of the spring seat 215 of the valve arrangement 199 of FIG. 2. FIG. 26*b* helps illustrate how the spring seat includes an annular lip 1040 on its rear surface for receiving the sealing ball 260.

FIG. 26*c* illustrates bottom-up perspective view of the spring seat 215 of the valve arrangement 199 of FIG. 2.

FIG. 26*d* illustrates a perspective view of the spring seat 215 of the valve arrangement 199 of FIG. 2 in cross section. FIG. 26*d* helps illustrate how the rear surface 1020 of the spring seat includes a concave region 1030 into which the sealing ball 260 can intrude in use.

FIG. 26*e* illustrates a further perspective view of the spring seat 215 of the valve arrangement 199 of FIG. 2. FIG.

26*e* helps illustrate the spring cavity 2710 on the top region 2730 of the spring seat 215 into which the spring 148 can be arranged.

Figures 27A, 27B, 27C, 27D, 27E:
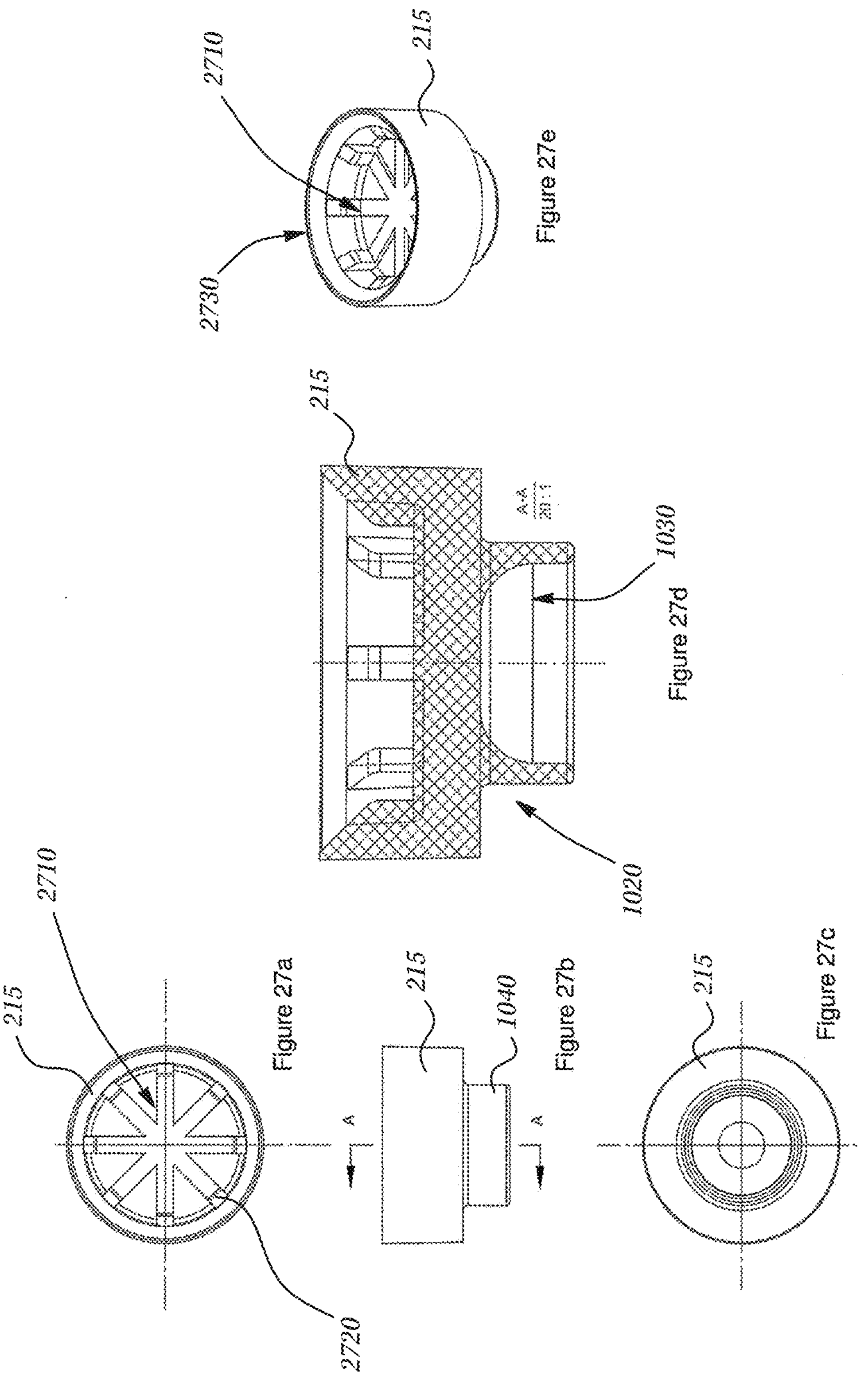
FIG. 27*a* illustrates a top-down perspective view of the spring seat.
FIG. 27*b* illustrates a side-on perspective view of the spring seat.
FIG. 27*c* illustrates a bottom-up perspective view of the spring seat.
FIG. 27*d* illustrates the spring seat in cross section.
FIG. 27*e* illustrates a different perspective view of the spring seat.

FIG. 27*a* illustrates a top-down perspective view of the stem valve assembly housing 150 of the valve arrangement 199 of FIG. 2.

FIG. 27*b* illustrates a side on perspective view of the stem valve assembly housing 150 of the valve arrangement 199 of FIG. 2. FIG. 27*b* helps illustrate how a gas flow passageway 178 is arranged in the stem valve assembly housing 150 that forms part of a gas flow path between the headspace region 130 of the can and the stem channel 176.

FIG. 27*c* illustrates a bottom-up perspective view of the stem valve assembly housing 150 of the valve arrangement 199 of FIG. 2.

FIG. 27*d* illustrates the stem valve assembly housing 150 of the valve arrangement 199 of FIG. 2 in cross section. FIG. 27*d* helps illustrate how the stem valve assembly housing 150 includes a bore 2810 in which the stem 135 is arranged in use. FIG. 27*d* also includes two circled regions denoted by B and C respectively.

FIG. 27*e* illustrates a cross sectional view of the circled region denoted by C in more detail. FIG. 27*e* helps illustrate how a connecting portion 2820, that is a narrowed lower portion, of the stem valve assembly housing 150 includes a number of outwardly extending circumferential ribs or ridges 232 that help secure the stem valve assembly housing to the open mouth 225 of the fluid flow valve housing 220 that has corresponding grooves 233.

FIG. 27*f* illustrates a cross sectional view of the circled region denoted by B in more detail. FIG. 27*f* helps illustrate how the stem valve assembly housing 150 includes an inwardly facing lip 170 that helps fluidly disconnect the stem channel 176 from the stem valve assembly housing. FIG. 27*f* also helps illustrate how a gas flow region 530 is located underneath in the space where the inner sealing gasket 120 is arranged in use. This gas flow region 530 helps transport gas from the gas flow passageway 178 to the stem channel 176 when the stem 135 is in an open configuration.

Figures 28A, 28B, 28C, 28D, 28E, 28F, 28G:
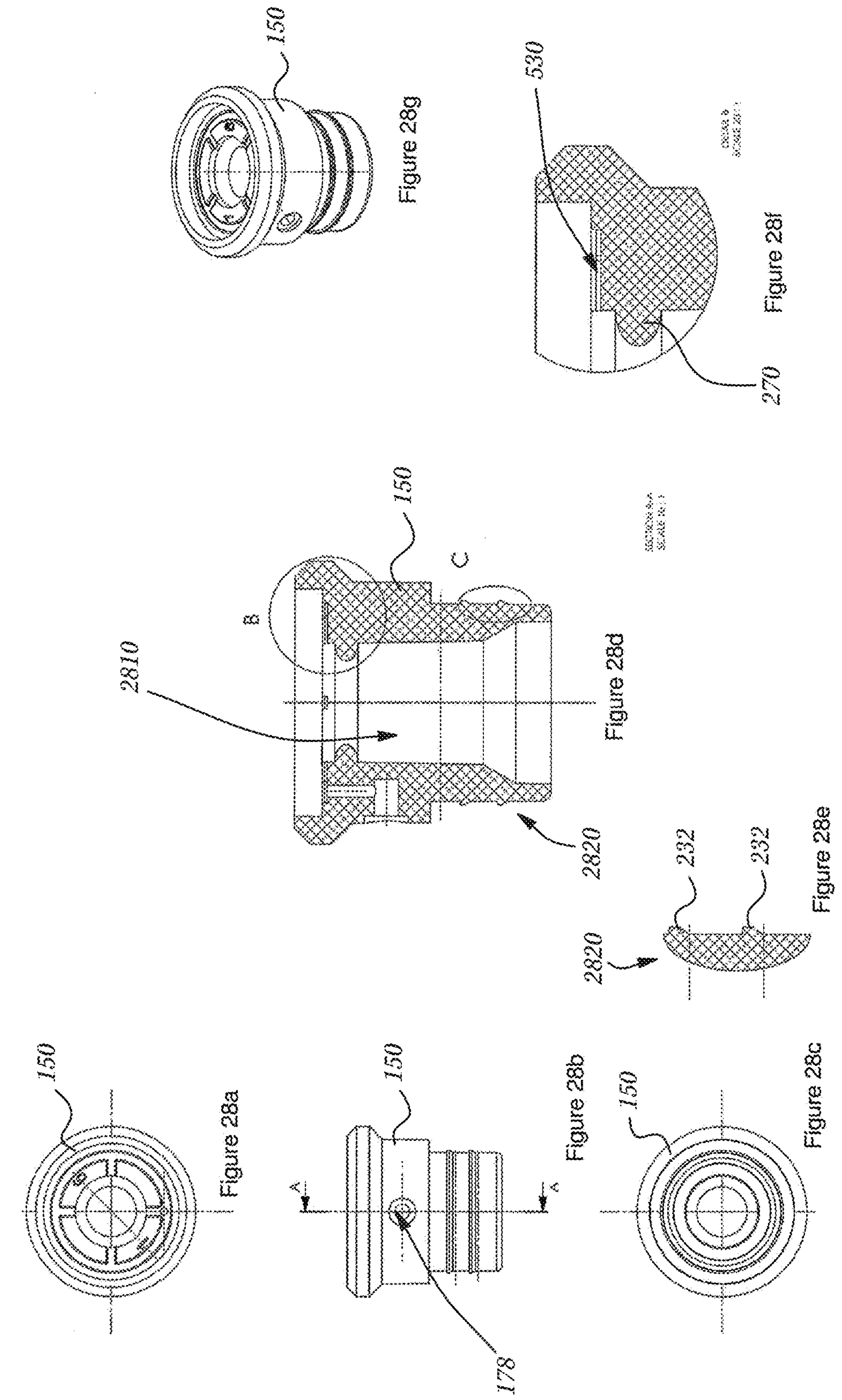
FIG. 28*a* illustrates a top-down perspective view of a stem valve assembly housing of the valve arrangement.
FIG. 28*b* illustrates a side-on perspective view of the stem valve assembly housing.
FIG. 28*c* illustrates a bottom-up perspective view of the stem valve assembly housing.
FIG. 28*d* illustrates the stem valve assembly housing in cross section.
FIG. 28*e* illustrates a portion of the stem valve assembly housing in more detail.
FIG. 28*f* illustrates a further portion of the stem valve assembly housing in more detail.
FIG. 28*g* illustrates a different perspective view of a stem valve assembly housing.

FIG. 28*g* illustrates a different perspective view of the stem valve assembly housing 150 of the valve arrangement 199 of FIG. 2.

Figures 29A, 29B, 29C, 29D:
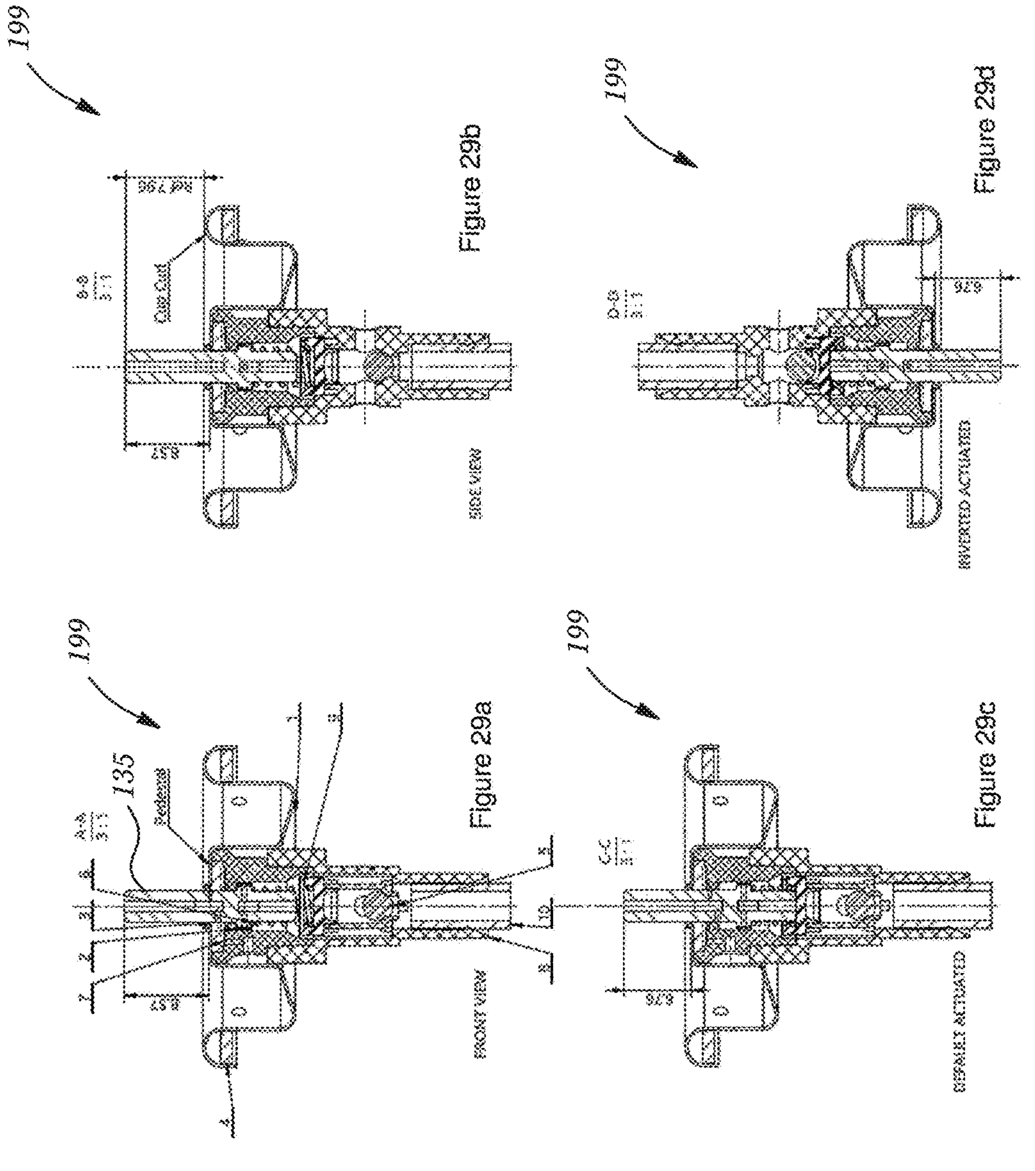
FIG. 29*a* illustrates a cross sectional view of the valve assembly in an upright orientation.
FIG. 29*b* illustrates a further cross sectional view of the valve arrangement in an upright orientation.
FIG. 29*c* illustrates a still further cross sectional view of the valve arrangement in an upright orientation.
FIG. 29*d* illustrates a cross sectional view of the valve arrangement in an inverted orientation.

FIG. 29*a* illustrates a cross sectional view of the valve arrangement 199 of FIG. 2 in an upright orientation when the stem 135 is arranged in a closed configuration.

FIG. 29*b* illustrates a cross sectional view of the valve arrangement 199 of FIG. 2 in an upright orientation when the stem 135 is arranged in a closed configuration. It will be appreciated that the viewpoint shown in FIG. 29*b* is a 45 degree rotation about the stem axis 140 relative to the valve assembly shown in FIG. 29*a*.

FIG. 29*c* illustrates a cross sectional view of the valve arrangement 199 of FIG. 2 in an upright orientation when the stem 135 is in an open configuration. It will be appreciated that, other than the valve arrangement 199 being in an open configuration, the viewpoint shown in FIG. 29*c* is the same viewpoint shown in FIG. 29*a*.

FIG. 29*d* illustrates a cross sectional view of the valve arrangement 199 of FIG. 2 in an invented orientation when the stem is in a closed configuration. It will be appreciated that, other than the valve assembly being inverted, the viewpoint shown in FIG. 29*c* is the same viewpoint shown in FIG. 29*b*.

Figure 30D:
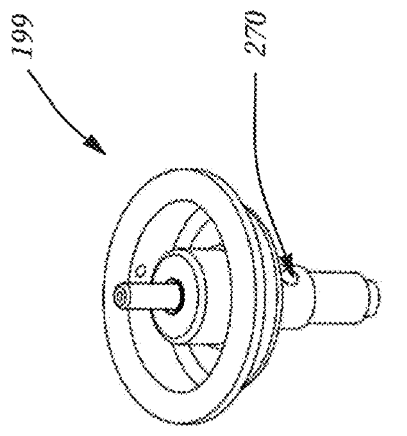
FIG. 30*d* illustrates a different perspective view of the valve arrangement.
Figure 30B:
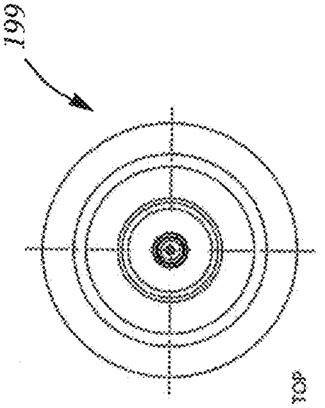
FIG. 30*b* illustrates a bottom-up perspective view of the valve arrangement.
Figure 30C:
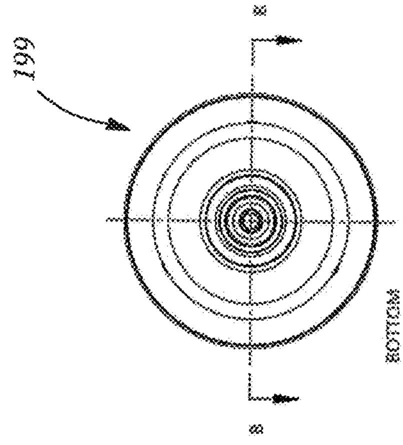
FIG. 30*c* illustrates a top-down perspective view of the valve arrangement.
Figure 30A:
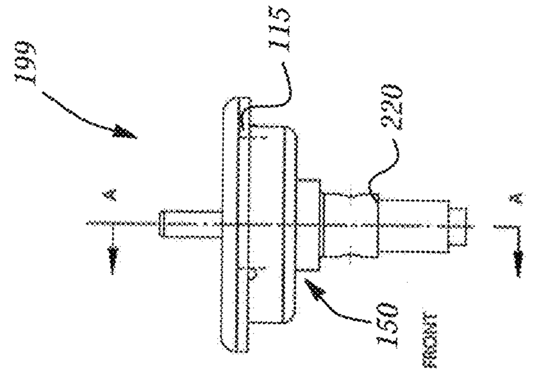
FIG. 30*a* illustrates a side-on perspective view of the valve arrangement.

FIG. 30*a* illustrates a perspective view of the assembled valve arrangement 199 of FIG. 2. FIG. 26*a* helps illustrate how the fluid flow housing is connected below a stem valve assembly housing around which a mounting cup is arranged.

FIG. 30*b* illustrates a bottom-up perspective view of the valve arrangement 199 of FIG. 2.

FIG. 30*c* illustrates a top-down perspective view of the valve arrangement 199 of FIG. 2.

FIG. 30*d* illustrates a different perspective view of the valve arrangement f FIG. 2. FIG. 30*d* helps illustrate how the wall fluid ports 270 extend through the outer surface of the fluid flow valve housing 220.

Figure 31A:
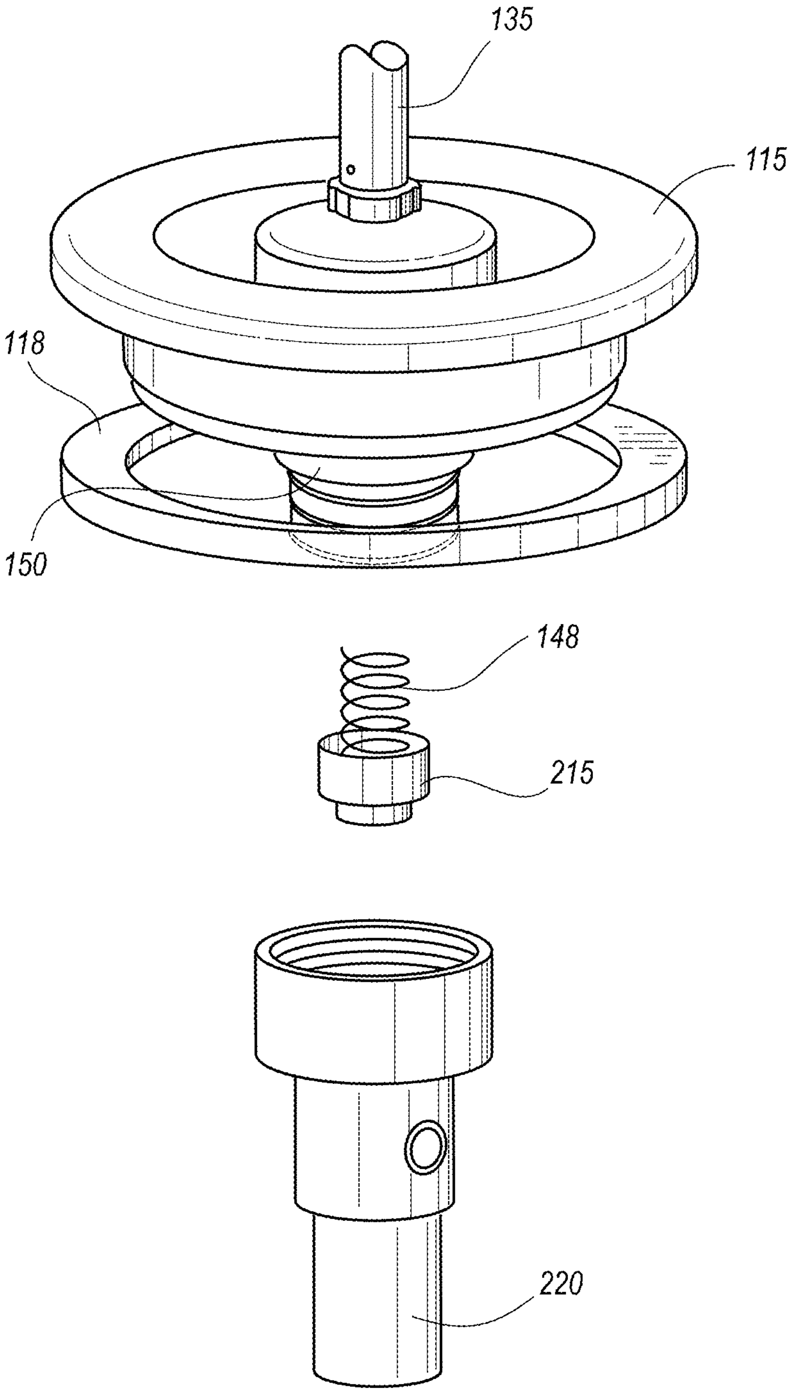
FIG. 31*a* illustrates a perspective view of how the valve arrangement can be assembled.

FIG. 31*a* helps illustrate how the valve arrangement 199 of FIG. 2 can be assembled. As shown in FIG. 31*a*, the spring seat 215, which includes a spring cavity on the top surface of the spring seat 215 in which the spring 148 is arranged, is provided through the open mouth region of the fluid flow valve housing 220 so that the spring seat 215 closes the top end, which is the further end, of the inner chamber region 245 located in the main body portion of the fluid flow valve housing 220. It will be appreciated that the annular rib located on the rear surface of the spring seat 215 is arranged to be within an end portion of the cylindrical inner surface of the fluid flow valve housing 220 that partly surrounds the inner chamber region. It will also be understood that prior to arranging the spring seat 215 in the fluid flow valve housing 220, the sealing ball 160 is provided through the upper end, that is the further end, of the inner chamber region 245 so that the sealing ball 260 is disposed within the inner chamber region 245.

An outer sealing gasket 218 is arranged inside an outer circumferential wall of a mounting cup 115 that is crimped into the top of the stem valve assembly housing 150. The stem valve assembly, that is surrounded by the mounting cup 115, is connected to the open mouth of the fluid flow valve housing 220 via a connecting portion of the stem valve assembly housing 250. This is done either before or after or simultaneously with the outer gasket 218 being provided to the mounting cup 115.

Figure 31B:
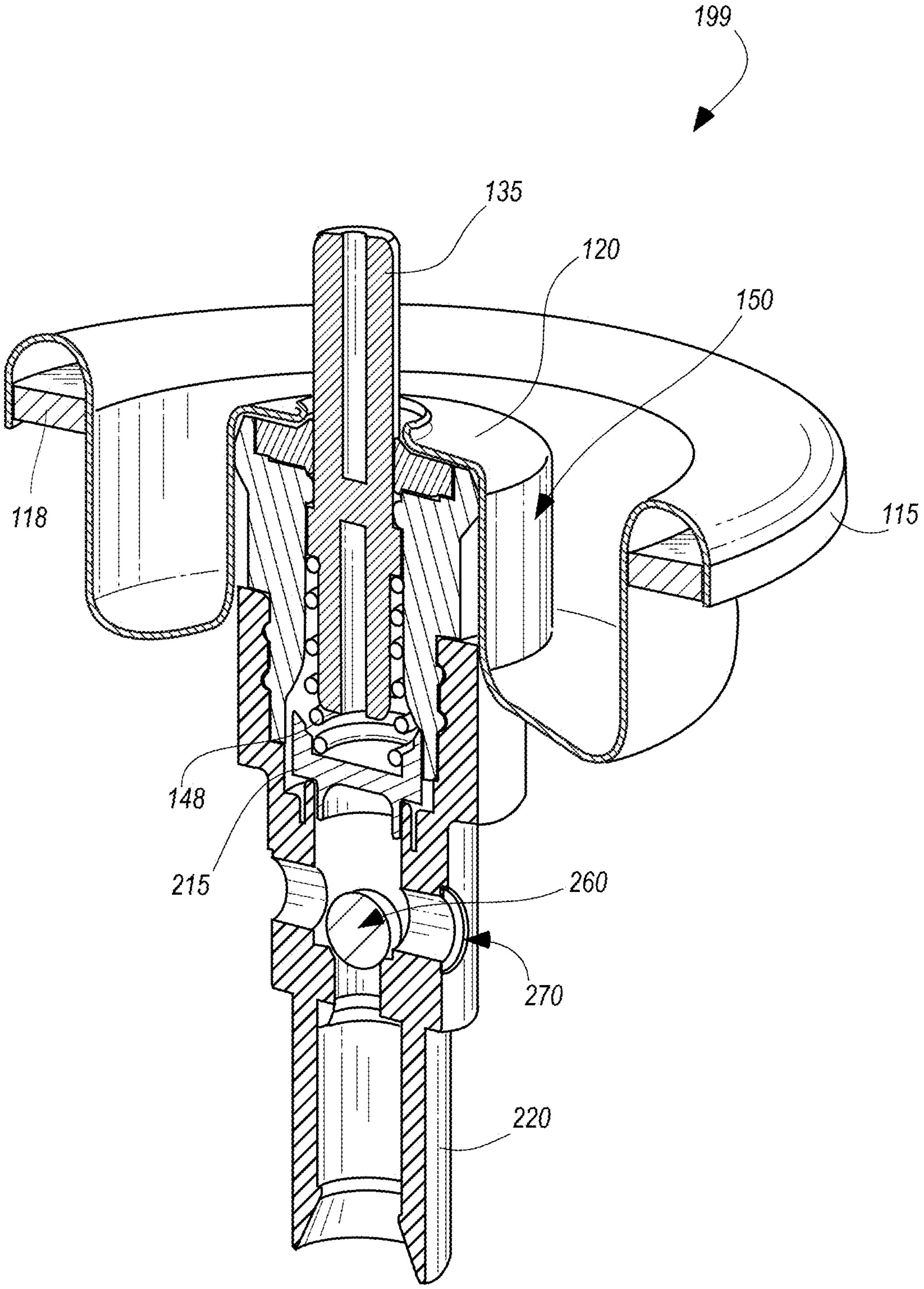
FIG. 31*b* illustrates the assembled valve arrangement in cross section.

FIG. 31*b* illustrates a perspective view of the assembled valve arrangement 199 in cross section. It will be understood that the assembled stem valve arrangement 199 shown in FIG. 31*b* is thus described above with reference to FIG. 2.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The present disclosure is not restricted to any details of any foregoing embodiments. The present disclosure extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

The invention claimed is:

1. Apparatus for dispensing fluid, comprising:

a valve arrangement comprising an outer wall;

a housing member comprising at least one inner wall, wherein the outer wall of the valve arrangement at least partly surrounds the inner wall of the housing member, wherein the at least one inner wall of the housing member at least partly surrounds an inner chamber region that is disposed within a main body portion of the housing member, the housing member further comprising an inner fluid port being disposed at a first end region of the inner chamber region and in fluid communication with an open region of the housing member disposed at a first end region of the housing member;

at least one fluid communication passageway disposed within the main body portion and comprising:

a first end proximate to and in fluid communication with the open region; and a remaining end proximate to a further end of the housing member, that is spaced apart from the first end region of the housing member;

wherein the at least one fluid communication passageway is disposed radially outside the inner chamber region between the at least one inner wall of the housing member and the outer wall of the valve arrangement at least one wall fluid port extending through the inner wall of the housing member and through the outer wall of the valve arrangement to fluidly connect a fluid communication region located outside of the housing member and the inner chamber region; and a closure element disposed in, and movable within, the inner chamber region to selectively limit fluid flow through the inner fluid port; wherein the housing member is connected to, or is integrally formed with, a valve assembly that includes an elongate valve stem associated with a respective stem axis and a stem housing that radially surrounds at least a portion of the elongate valve stem, the stem housing comprising at least one stem housing fluid communication region that is in fluid communication with the at least one fluid communication passageway and is fluidly connectable to an inner stem channel disposed along at least a portion of the elongate valve stem, the stem housing further comprising at least one gas communication region that is fluidly connectable to the inner stem channel so that at least one fluid and at least one gas are mixable in the inner stem channel.

2. The apparatus as claimed in claim 1, wherein the elongate valve stem comprises a fluid inlet in fluid communication with the inner stem channel (176) and selectively connectable with the stem housing fluid communication region, and a stem gas inlet in fluid communication with the inner stem channel and selectively connectable with the at least one gas communication region, the fluid inlet being disposed to be fluidly connected with the stem housing fluid communication region at the same time as the stem gas inlet is fluidly connected with the at least one gas communication region to provide a fine spay in the inner stem channel by two fluid atomisation.

3. The apparatus as claimed in claim 2, further comprising:

a first fluid flow path extends from the open region, through the at least one fluid communication passageway, through the stem housing fluid communication region and into the inner stem channel via the fluid inlet.

4. The apparatus as claimed in claim 3, wherein in a first valve stem position the fluid inlet is closed to prevent fluid flow into the inner stem channel to thereby block the first fluid flow path or the further fluid flow path, and in a further valve stem position the fluid inlet is open to permit fluid flow into the inner stem channel to thereby permit fluid flow through the first fluid flow path or the further fluid flow path.

5. The apparatus as claimed in claim 4, further comprising:

at least one biasing element that urges the elongate valve stem towards the first valve stem position.

6. The apparatus as claimed in claim 3, wherein the first valve stem position is an equilibrium position, and the further valve stem position is a position in which the elongate valve stem is urged towards the housing member along the stem axis.

7. The apparatus as claimed in claim 2, further comprising:

a further fluid flow path that extends from the fluid communication region located outside of the housing member and the inner chamber region to the inner chamber region via the at least one wall fluid port and, via the inner fluid port from the inner chamber region through the at least one fluid communication passageway and into the inner stem channel via the fluid inlet.

8. The apparatus as claimed in claim 1, further comprising:

a valve seat region disposed within the inner chamber region proximate to the inner fluid port, the closure element being locatable against the valve seat region for preventing fluid flow through the inner fluid port when the housing member is disposed in a first orientation.

9. The apparatus as claimed in claim 8, wherein:

the valve seat region comprises an annular abutment surface for abutting against the closure element that is oblique relative to the stem axis.

10. The apparatus as claimed in claim 1, further comprising:

a closure element support region disposed at a further end region of the inner chamber region that is spaced apart from the first end region of the inner chamber region, the closure element being locatable against the closure element support region to permit fluid flow through the inner fluid port when the housing member is disposed in a further orientation.

11. The apparatus as claimed in claim 1, wherein the inner chamber region, the inner fluid port and an open mouth region are disposed on the stem axis.

12. The apparatus as claimed in claim 1, wherein the at least one wall fluid port is oriented along an axis that is substantially perpendicular to the stem axis.

13. The apparatus as claimed in claim 1, further comprising:

a sloped wall region of the inner wall that is offset from an axis that touches the radially innermost part of the sloped wall region and is parallel with the stem axis so that the sloped wall region makes an angle of 10 degrees or less with the axis.

14. A fluid dispensing device, comprising:

the apparatus as claimed in claim 1; and a canister that is connected to the valve assembly via a mounting cup through which the elongate valve stem extends and that comprises at least one fluid to be dispensed and at least one propellant.

15. A method for dispensing fluid, comprising the steps of:

providing a fluid at a first end of a fluid communication passageway, wherein said fluid communication passageway is disposed within a main body portion of a housing member and proximate an open region that is located at a first end region of the housing member;

transporting the fluid from the first end of the fluid communication passageway to a further end of the fluid communication passageway located at a further end region of the housing member that is spaced apart from the first end region;

transporting the fluid from the further end of the fluid communication passageway end to a stem housing fluid communication region that is located in a stem housing that surrounds at least a portion of an elongate valve stem that is associated with a stem axis;

providing at least one gas at a gas communication region that is fluidly connectable to an inner stem channel that extends along at least a portion of the elongate valve stem and is connectable to the stem housing fluid communication region; and transporting the fluid from the first end of the fluid communication passageway to the further end of the fluid communication passageway; and wherein the fluid communication passageway is disposed radially outside an inner chamber region between at least one inner wall of the housing member and an outer wall of a valve arrangement, wherein the inner chamber region is disposed within the main body portion of the housing member and is at least partly surrounded by the at least one inner wall of the housing member, and wherein the outer wall of the valve arrangement at least partly surrounds the inner wall of the housing member.

16. The method as claimed in claim 15, further comprising the steps of:

fluidly connecting the stem housing fluid communication region to the inner stem channel and simultaneously fluidly connecting the gas communication region to the inner stem channel.

17. The method as claimed in claim 15, further comprising the steps of:

in a first mode of operation, prior to providing the fluid at the first end of the fluid communication passageway, urging a closure element disposed within the inner chamber region against a valve seat region that is located proximate to a first end region of the inner chamber region to thereby prevent fluid flow through an inner fluid port that is in fluid communication with the open region and is disposed proximate to the first end region of the inner chamber region;

providing the fluid at the open region; and transporting the fluid from the open region to the first end of the fluid communication passageway.

18. The method as claimed in claim 17, further comprising the steps of:

in a further mode of operation, prior to providing the fluid at the first end of the fluid communication passageway, urging a closure member disposed within the inner chamber region against a closure member support region that is disposed at a further end region of the inner chamber region that is spaced apart from the inner fluid port disposed proximate to the first end region of the inner chamber region to thereby permit fluid flow through the inner fluid port;

via at least one wall fluid port extending through the inner wall and through the outer wall of the valve arrangement, transporting fluid from a fluid communication region that is outside of the housing member to the inner chamber region; and transporting fluid from the fluid communication region to the first end of the fluid communication passageway via the inner fluid port.

19. The method as claimed in claim 18, further comprising the steps of:

orienting the housing member in a substantially inverted configuration to locate the open region at a substantially upward position relative to the further end region of the housing member, and simultaneously urging the closure element against the closure element support region.

20. The method as claimed in claim 15, further comprising the steps of:

transporting, via the stem housing fluid communication region, the fluid from the further end of the fluid communication passageway at least partly around a valve assembly that is connected to the further end region of the housing member and comprises the elongate valve stem and the stem housing; and transporting the fluid into the inner stem channel via at least one fluid inlet.

* * * * *